United States Patent
Kato et al.

(10) Patent No.: US 6,654,730 B1
(45) Date of Patent: Nov. 25, 2003

(54) NEURAL NETWORK ARITHMETIC APPARATUS AND NEUTRAL NETWORK OPERATION METHOD

(75) Inventors: Noriji Kato, Nakai-machi (JP); Hirotsugu Kashimura, Nakai-machi (JP); Hitoshi Ikeda, Nakai-machi (JP); Nobuaki Miyakawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 547 days.

(21) Appl. No.: 09/703,921

(22) Filed: Nov. 1, 2000

(30) Foreign Application Priority Data

Dec. 28, 1999 (JP) .............................. 11-372761

(51) Int. Cl.$^7$ ......................... G06F 15/18; G06G 7/00
(52) U.S. Cl. ....................... 706/22; 706/15; 706/33; 706/39
(58) Field of Search ..................... 706/10, 15, 41, 706/42, 43, 33, 34, 31, 35, 37, 39, 22

(56) References Cited

U.S. PATENT DOCUMENTS

| | | | | |
|---|---|---|---|---|
| 5,142,666 A | * | 8/1992 | Yoshizawa et al. | 706/38 |
| 5,165,009 A | * | 11/1992 | Watanabe et al. | 706/41 |
| 5,283,855 A | * | 2/1994 | Motomura et al. | 706/25 |
| 5,319,738 A | * | 6/1994 | Shima et al. | 706/34 |
| 5,343,555 A | * | 8/1994 | Yayla et al. | 706/35 |
| 5,532,938 A | * | 7/1996 | Kondo et al. | 708/524 |
| 5,542,054 A | * | 7/1996 | Batten, Jr. | 706/26 |
| 5,608,844 A | * | 3/1997 | Gobert | 706/42 |
| 5,636,326 A | * | 6/1997 | Stork et al. | 706/25 |
| 5,636,327 A | * | 6/1997 | Nakahira et al. | 706/41 |
| 5,675,713 A | * | 10/1997 | Batten, Jr. | 706/26 |
| 5,696,883 A | * | 12/1997 | Arima | 706/38 |
| 5,768,478 A | * | 6/1998 | Batten, Jr. | 706/43 |
| 5,875,347 A | * | 2/1999 | Watanabe et al. | 712/1 |
| 6,389,404 B1 | * | 5/2002 | Carson et al. | 706/18 |
| 2002/0059152 A1 | * | 5/2002 | Carson et al. | 706/20 |

FOREIGN PATENT DOCUMENTS

JP 5-197707 8/1993 ........... G06F/15/18

OTHER PUBLICATIONS

Khaparde et al., "Application of Artificial Neural Network in Protective Relaying of Transmission Lines", Proceedings of the 1st International Forum on Applications of Neural Networks to Power Systems, pp. 122–125, Jul. 1991.*

Dayhoff, J., "Pattern Mapping in Pulse Transmission Neural Networks", Proceedings of the Conference on Analysis of neural Network Applications, pp. 146–159, 1991.*

Wyler, K., "Self–Organizing Process Mapping in a Multiprocessor System", World Congress on Neural Networks, pp. 562–566, 1993.*

Triantafyllidis et al., "Mesh Density Prediction for Open Boundary Faulted Power Transmission Line Problems Using Artificial Neural Networks", NEC Research Index, Retrieved online http://citeseer.nj.nec.com/268213, 1999.*

(List continued on next page.)

Primary Examiner—Paul P. Gordon
Assistant Examiner—Kelvin Booker
(74) Attorney, Agent, or Firm—Oliff & Berridge, PLC

(57) ABSTRACT

When neuron operations are computed in parallel using a large number of arithmetic units, arithmetic units for neuron operations and arithmetic units for error signal operations need not be provided separately, and a neural network arithmetic apparatus that consumes the bus band less is provided for updating of synapse connection weights. Operation results of arithmetic units and setting information of a master node are exchanged between them through a local bus. During neuron operations, partial sums of neuron output values from the arithmetic units are accumulated by the master node to generate and output a neuron output value, and an arithmetic unit to which neuron operations of the specific neuron are assigned receives and stores the neuron output value outputted from the master node.

17 Claims, 30 Drawing Sheets

OTHER PUBLICATIONS

Fregene et al., "Control of a High–Order Power System by Neural Adaptive Feedback Linearization", Proceedings of IEEE International Symposium on Intelligent Control, pp. 34–39, 1999.*

Gupta et al., "Constrained Multivariable Optimization of Transmission Lines With General Topologies", International Conferenc on Computer Aided Design, pp. 130–137, 1995.*

Barkatullah et al., "A Transmission Line Simulator for GaAs Integrated Circuits", 28th ACM/IEEE Design Automation Conference, pp. 746–751, 1991.*

Gura et al., "Improved Methods of Simulating RLC Coupled and Uncoupled Transmission Lines Based on the Method of Characteristics", 25th ACM/IEEE Design Automation Conference, 1988.*

Webb et al., "A 4×4 MQW Modulator Array in a Parallel Interconnect Demonstration", IEE Colloquium on Applications in Quantum Wells in Optoelectronics, pp. 6/1–6/3, Jun. 1990.*

Yasunaga et al., "A Self–Learning Digital Neural Network Using Wafer–Scale LSI", IEEE Journal of Solid–State Circuits, vol., 28, No. 2, Feb. 1993.

Matsumoto et al., "Brain Computing", Methodologies for the Conception, Design, and Application of Intelligent Systems Proceedings of IIZUKA, 1996, pp. 15–24.

* cited by examiner

FIG.4

| Address | Value |
|---|---|
| ADDRESS 0 | $Y_1$ |
| ADDRESS 1 | $Y_2$ |
| ADDRESS 2 | $Y_3$ |
| ⋮ | ⋮ |
| ADDRESS n-1 | $Y_n$ |
| ADDRESS n | $Y_{n+1}$ |
| ADDRESS n+1 | $Y_{n+2}$ |
| ⋮ | ⋮ |
| ADDRESS n+m-1 | $Y_{n+m}$ |
| ADDRESS n+m | $Y_{n+m+1}$ |
| ⋮ | ⋮ |
| ADDRESS n+m+p-1 | $Y_{n+m+p}$ |

FIG.9A $$\begin{pmatrix} 0 & 0 & 0 \\ 0 & I & 0 \\ 0 & II & 0 \end{pmatrix}$$

FIG.9B $$I = \begin{array}{|c|c|c|} \hline
\begin{array}{l} W_{n+1,1} \sim W_{n+1,N1} \\ W_{n+2,1} \sim W_{n+2,N1} \\ W_{n+3,1} \sim W_{n+3,N1} \\ \vdots \\ W_{n+L1,1} \sim W_{n+L1,N1} \end{array} &
\begin{array}{l} W_{n+1,N1+1} \sim W_{n+1,N2} \\ W_{n+2,N1+1} \sim W_{n+2,N2} \\ W_{n+3,N1+1} \sim W_{n+3,N2} \\ \vdots \\ W_{n+L1,N1+1} \sim W_{n+L1,N2} \end{array} &
\begin{array}{l} W_{n+1,N2+1} \sim W_{n+1,n} \\ W_{n+2,N2+1} \sim W_{n+2,n} \\ W_{n+3,N2+1} \sim W_{n+3,n} \\ \vdots \\ W_{n+L1,N2+1} \sim W_{n+L1,n} \end{array} \\
\text{I-1} & \text{I-2} & \text{I-3} \\ \hline
\begin{array}{l} W_{n+L1+1,1} \sim W_{n+L1+1,N1} \\ W_{n+L1+2,1} \sim W_{n+L1+2,N1} \\ W_{n+L1+3,1} \sim W_{n+L1+3,N1} \\ \vdots \\ W_{n+m,1} \sim W_{n+m,N1} \end{array} &
\begin{array}{l} W_{n+L1+1,N1+1} \sim W_{n+L1+1,N2} \\ W_{n+L1+2,N1+1} \sim W_{n+L1+2,N2} \\ W_{n+L1+3,N1+1} \sim W_{n+L1+3,N2} \\ \vdots \\ W_{n+m,N1+1} \sim W_{n+m,N2} \end{array} &
\begin{array}{l} W_{n+L1+1,N2+1} \sim W_{n+L1+1,n} \\ W_{n+L1+2,N2+1} \sim W_{n+L1+2,n} \\ W_{n+L1+3,N2+1} \sim W_{n+L1+3,n} \\ \vdots \\ W_{n+m,N2+1} \sim W_{n+m,n} \end{array} \\
\text{I-4} & \text{I-5} & \text{I-6} \\ \hline
\end{array}$$

FIG.9C $$II = \begin{array}{|c|c|c|} \hline
\begin{array}{l} W_{n+m+1,n+1} \sim W_{n+m+1,n+N3} \\ W_{n+m+2,n+1} \sim W_{n+m+2,n+N3} \\ W_{n+m+3,n+1} \sim W_{n+m+3,n+N3} \\ \vdots \\ W_{n+m+L2,n+1} \sim W_{n+m+L2,n+N3} \end{array} &
\begin{array}{l} W_{n+m+1,n+N3+1} \sim W_{n+m+1,n+N4} \\ W_{n+m+2,n+N3+1} \sim W_{n+m+2,n+N4} \\ W_{n+m+3,n+N3+1} \sim W_{n+m+3,n+N4} \\ \vdots \\ W_{n+m+L2,n+N3+1} \sim W_{n+m+L2,n+N4} \end{array} &
\begin{array}{l} W_{n+m+1,n+N4+1} \sim W_{n+m+1,n+m} \\ W_{n+m+2,n+N4+1} \sim W_{n+m+2,n+m} \\ W_{n+m+3,n+N4+1} \sim W_{n+m+3,n+m} \\ \vdots \\ W_{n+m+L2,n+N4+1} \sim W_{n+m+L2,n+m} \end{array} \\
\text{II-1} & \text{II-2} & \text{II-3} \\ \hline
\begin{array}{l} W_{n+m+L2+1,n+1} \sim W_{n+m+L2+1,n+N3} \\ W_{n+m+L2+2,n+1} \sim W_{n+m+L2+2,n+N3} \\ W_{n+m+L2+3,n+1} \sim W_{n+m+L2+3,n+N3} \\ \vdots \\ W_{n+m+p,n+1} \sim W_{n+m+p,n+N3} \end{array} &
\begin{array}{l} W_{n+m+L2+1,n+N3+1} \sim W_{n+m+L2+1,n+N4} \\ W_{n+m+L2+2,n+N3+1} \sim W_{n+m+L2+2,n+N4} \\ W_{n+m+L2+3,n+N3+1} \sim W_{n+m+L2+3,n+N4} \\ \vdots \\ W_{n+m+p,n+N3+1} \sim W_{n+m+p,n+N4} \end{array} &
\begin{array}{l} W_{n+m+L2+1,n+N4+1} \sim W_{n+m+L2+1,n+m} \\ W_{n+m+L2+2,n+N4+1} \sim W_{n+m+L2+2,n+m} \\ W_{n+m+L2+3,n+N4+1} \sim W_{n+m+L2+3,n+m} \\ \vdots \\ W_{n+m+p,n+N4+1} \sim W_{n+m+p,n+m} \end{array} \\
\text{II-4} & \text{II-5} & \text{II-6} \\ \hline
\end{array}$$

FIG.24

$$\begin{pmatrix} & 0 & 0 \\ \boxed{\begin{array}{c|c} \text{I} & \text{IV} \\ \hline \text{III} & \text{II} \end{array}} & 0 \\ \end{pmatrix}$$

FIG.25

| A-1 | A-2 | A-3 |
|---|---|---|
| $W_{n+1,1}, W_{n+1,2}, \ldots\ldots\ldots\ldots W_{n+1,T}$<br>$W_{n+2,1}, W_{n+2,2}, \ldots\ldots\ldots\ldots W_{n+2,T}$<br>$W_{n+3,1}, W_{n+3,2}, \ldots\ldots\ldots\ldots W_{n+3,T}$<br>$\vdots$<br>$W_{n+L1,1}, W_{n+L1,2}, \ldots\ldots\ldots\ldots W_{n+L1,T}$ | $W_{n+1,T+1}, W_{n+1,T+2} \ldots\ldots\ldots\ldots W_{n+1,2T}$<br>$W_{n+2,T+1}, W_{n+2,T+2} \ldots\ldots\ldots\ldots W_{n+2,2T}$<br>$W_{n+3,T+1}, W_{n+3,T+2} \ldots\ldots\ldots\ldots W_{n+3,2T}$<br>$\vdots$<br>$W_{n+L1,T+1}, W_{n+L1,T+2} \ldots\ldots W_{n+L1,2T}$ | $W_{n+1,2T+1}, W_{n+1,2T+2} \ldots\ldots W_{n+1,n+1} \ldots\ldots W_{n+1,n+m}$<br>$W_{n+2,2T+1}, W_{n+2,2T+2} \ldots\ldots W_{n+2,n+1} \ldots\ldots W_{n+2,n+m}$<br>$W_{n+3,2T+1}, W_{n+3,2T+2} \ldots\ldots W_{n+3,n+1} \ldots\ldots W_{n+3,n+m}$<br>$\vdots$<br>$W_{n+L1,2T+1}, W_{n+L1,2T+2} \ldots W_{n+L1,n+1} \ldots W_{n+L1,n+m}$ |
| A-4 | A-5 | A-6 |
| $W_{n+L1+1,1}, W_{n+L1+1,2}, \ldots\ldots W_{n+L1+1,T}$<br>$W_{n+L1+2,1}, W_{n+L1+2,2}, \ldots\ldots W_{n+L1+2,T}$<br>$W_{n+L1+3,1}, W_{n+L1+3,2}, \ldots\ldots W_{n+L1+3,T}$<br>$\vdots$<br>$W_{n+m,1}, W_{n+m,2}, \ldots W_{n+m,n} \ldots W_{n+m,T}$<br>$W_{n+m+1,1}, W_{n+m+1,n+1}, \ldots\ldots W_{n+m+1,T}$<br>$W_{n+m+2,1}, W_{n+m+2,n+1}, \ldots\ldots W_{n+m+2,T}$<br>$W_{n+m+p,n+1}, \ldots W_{n+m+p,T}$    0 | $W_{n+L1+1,T+1}, W_{n+L1+1,T+2}, \ldots W_{n+L1+1,2T}$<br>$W_{n+L1+2,T+1}, W_{n+L1+2,T+2}, \ldots W_{n+L1+2,2T}$<br>$W_{n+L1+3,T+1}, W_{n+L1+3,T+2}, \ldots W_{n+L1+3,2T}$<br>$\vdots$<br>$W_{n+m,T+1}, W_{n+m,T+2}, \ldots\ldots\ldots W_{n+m,2T}$<br>$W_{n+m+1,T+1}, W_{n+m+1,T+2}, \ldots\ldots W_{n+m+1,2T}$<br>$W_{n+m+2,T+1}, W_{n+m+2,T+2}, \ldots\ldots W_{n+m+2,2T}$<br>$W_{n+m+p,T+1}, W_{n+m+p,T+2} \ldots\ldots W_{n+m+p,2T}$ | $W_{n+L1+1,2T+1}, W_{n+L1+1,2T+2} \cdot W_{n+L1+1,n+1} \cdot W_{n+L1+1,n+m}$<br>$W_{n+L1+2,2T+1}, W_{n+L1+2,2T+2} \cdot W_{n+L1+2,n+1} \cdot W_{n+L1+2,n+m}$<br>$W_{n+L1+3,2T+1}, W_{n+L1+3,2T+2} \cdot W_{n+L1+3,n+1} \cdot W_{n+L1+3,n+m}$<br>$\vdots$<br>$W_{n+m,2T+1}, W_{n+m,2T+2}, \ldots\ldots\ldots\ldots W_{n+m,n+m}$<br>$W_{n+m+1,2T+1}, W_{n+m+1,2T+2}, \ldots\ldots W_{n+m+1,n+m}$<br>$W_{n+m+2,2T+1}, W_{n+m+2,2T+2}, \ldots\ldots W_{n+m+2,n+m}$<br>$W_{n+m+p,2T+1}, W_{n+m+p,2T+2}, \ldots\ldots W_{n+m+p,n+m}$ |

FIG.27

$$\begin{pmatrix} & 0 & 0 & \\ \boxed{\begin{array}{c|c} VI & VII \\ \hline VIII & IX \end{array}} & 0 & \end{pmatrix}$$

NEURAL NETWORK ARITHMETIC APPARATUS AND NEUTRAL NETWORK OPERATION METHOD

BACKGROUND OF THE INVENTION

1. Field of the Invention

The present invention relates to a neural network arithmetic apparatus and a neural network operation method, and more particularly to a neural network arithmetic apparatus and neural network operation method that perform neuron operations in parallel by plural arithmetic units.

2. Description of the Prior Art

A neural network built by imitating information processing in a brain-based nervous system finds application in information processing such as recognition and knowledge processing. Such a neural network is generally configured by connecting a large number of neurons, which transmit their output signals to each other.

An individual neuron j first calculates the sum of a neuron output value $Y_i$ from another neuron i, which is weighed by a synapse connection weight $W_{ji}$. Then the a neuron output value $Y_j$ is generated by converting the summation by a sigmoid function f. The operation is represented as shown by an equation (1) below, where i and j are any integer.

$$Y_j = f\left(\sum_i W_{ji} \cdot Y_i\right) \quad (1)$$

This operation is called a neuron operation. In a learning process by back propagation generally used, for a given input, an expected output value $d_j$ (that is, a teacher signal) is afforded from the outside and synapse connection weights $w_{ji}$ are updated so that an error $\delta_j(=d_j-Y_j)$ from an actual output value becomes small. The update amount is calculated by an equation (2) below.

$$\Delta W_{ji} = \eta \cdot \delta_j \cdot Y_i \quad (2)$$

$\eta$ is a learning coefficient and $\delta_j$ is a learning error. In an output layer, operations are performed using an equation (3) below.

$$\delta_j = (d_j - Y_j) \cdot f'(u_j) \quad (3)$$

In a hidden layer, operations are performed using an equation (4) below.

$$\delta_j = \left(\sum_k W_{kj} \delta_k\right) \cdot f'(u_j) \quad (4)$$

To perform these operations in a large-scale neural network having thousands to tens of thousands of neurons, an enormous amount of operation is required, requiring dedicated hardware.

As a prior art, the following information processing system is proposed in Japanese Published Unexamined Patent Application No. Hei 5-197707. In this system, as shown in FIG. 29, plural arithmetic units $60_1$ to $60_x$ having synapse connection weights $62_1$ to $62_x$ (x is an integer) respectively are coupled in parallel by a time-shared bus 64 connected to a controller 66.

In the information processing system, the arithmetic units $60_1$ to $60_x$ are responsible for processing specific neurons and one arithmetic unit (a second arithmetic unit $60_2$ in FIG. 29) selected by the controller 66 outputs a neuron output value to the time-shared bus 64.

The arithmetic units $60_1$ to $60_x$ which hold synapse connection weights between outputting arithmetic unit (the second arithmetic unit $60_2$ in FIG. 29) and their own in their memory, accumulates a value inputted from the time-shared bus 64 weighted by the corresponding synapse connection weight in their memory.

An arithmetic unit (the second arithmetic unit $60_2$ in FIG. 29) selected by the controller 66 converts a value resulting from the accumulative additions by, e.g., a sigmoid function f (the above equation (1)) and outputs the result to the time-shared bus 64. Output from all the arithmetic units $60_1$ to $60_x$ to the time-shared bus 64 means that all the arithmetic units $60_1$ to $60_x$ have performed the equation (1).

The invention disclosed in Japanese Published Unexamined Patent Application No. Hei 5-197707 constitutes a large-scale neural network by a parallel operation algorithm formed as described above.

However, since the prior art system has a large number of arithmetic units connected to the time-shared bus, a clock of the time-shared bus cannot be increased, which means neuron output values cannot be rapidly supplied to the arithmetic units. That is, the inability to speed up a bus transfer clock causes a bottleneck in the speed of transmitting neuron output values, posing the problem that a remarkable increase in processing speed is not achieved.

Since data is simultaneously supplied to all the arithmetic units, unnecessary data is also received. These facts cause the arithmetic units to be limited in data supply rate, posing the problem that operations cannot be performed rapidly.

To solve the above problems, it is conceivable to provide all necessary neuron output values as well as synapse connection weights in the memory of the arithmetic units. However, a limited capacity of the memory makes it impossible to store all neuron output values in the event that the scale of the neural network becomes larger. The other approach to solve the problem is to hold all the neuron output values distributively in plural arithmetic units. Also in this case, there is the problem that transmission speed of neuron output values causes a bottleneck, because a neuron arithmetic unit needs neuron output values stored in memories within other arithmetic units to perform neuron operations.

SUMMARY OF THE INVENTION

The present invention has been made in view of the above circumstances and provides a neural network arithmetic apparatus and a neural network operation method that, when a neural network is computed in parallel using a large number of arithmetic units, enable the arithmetic units to operate independently and rapidly, and do not cause reduction in processing speed by the number of arithmetic units increased to meet the scale of a network.

To solve the above circumstances, a neural network arithmetic apparatus according to an aspect of the present invention performs neuron operations in parallel by plural arithmetic elements, connected over at least one transmission line, to each of which a predetermined number of neurons of plural neurons making up a neural network are assigned. In the apparatus each of the plural arithmetic elements includes: a synapse connection weight storage memory that stores synapse connection weights of at least part of all synapses of one neuron for a predetermined number of assigned neurons; and an accumulating part that, during a neuron operation, successively selects the predetermined number of neurons and successively selects synapses of the selected neuron, multiplies the synapse connection weight of the selected synapse by the neuron output value of a neuron of a preceding stage connected with the synapse, accumulates the result for an identical neuron, and outputs an obtained value as a partial sum of neuron operation value. Each of the plural arithmetic elements further includes a neuron output value generating part that generates a neuron output value by accumulating partial sums of neuron operation values outputted by the plural arithmetic elements until the values of all synapses of one neuron are added.

That is, since each of plural arithmetic elements, connected over at least one transmission line, to each of which a predetermined number of neurons of plural neurons making up a neural network are assigned, has a synapse connection weight storage memory that stores synapse connection weights of at least part of all synapses of one neuron, and an accumulating part, neuron operations on a predetermined number of assigned neurons can be performed independently in units of operation elements.

Each arithmetic element can be utilized to calculate not only a partial sum of neuron operation value but also a partial sum of error signal operations.

Therefore, unlike a conventional approach, arithmetic elements for neuron operations and arithmetic elements for error signal operations need not be provided separately, and operations of a neural network can be performed using fewer arithmetic elements than have been conventionally required. Consequently, a neural network arithmetic apparatus is obtained which can perform operations of a large-scale neural network without decreasing operation speed by using almost the same number or fewer arithmetic elements that have conventionally been used.

Since operations are performed using synapse connection weights and neuron output values held by each of plural arithmetic elements, each of plural arithmetic elements outputs only a partial sum to the bus, whose data rate is less than conventionally. Consequently, operations of a large-scale neural network can be performed without reduction in operation speed due to an insufficient transmission line band.

The neural network arithmetic apparatus according to another aspect of the present invention further includes: an intermediate partial sum accumulating part that accumulates, for an identical neuron, at least one of the partial sum of neuron operation value and a partial sum obtained by accumulating the partial sum of neuron operation value for an identical neuron, and outputs the result as an intermediate partial sum of neuron operation value. The neuron output value generating part accumulates at least one of the partial sum of neuron operation value and the intermediate partial sum until the values of all synapses of one neuron are added.

That is, partial sums of neuron operation values are accumulated in multilayer structure in a way that accumulates the plural partial sums of neuron operation values to generate an intermediate partial sum of neuron operation value, accumulates the partial sum of neuron operation value to obtain a partial sum (that is, an intermediate partial sum) of neuron operation values and further accumulates the result to generate an intermediate partial sum of neuron operation value, or adds at least one of the partial sums of neuron operation values and at least one of the intermediate partial sums of neuron operation values to generate an intermediate partial sum of neuron operation value, whereby the present invention is applicable to a large-scale neural network made up of an enormous number of neurons without causing shortage of a transmission line band.

Preferably, according to another aspect of the present invention, the plural arithmetic elements are split into plural groups each containing a predetermined number of arithmetic elements and the neuron output value generating part is provided in each of the groups. The amount of information transferred to and from the outside of the arithmetic elements is decreased and operations of a large-scale neural network can be performed without decreasing operation speed.

As such a neural network arithmetic apparatus, according to another aspect of the present invention, a configuration is possible in which a predetermined number of arithmetic elements making up one of the plural groups are split and formed on plural semiconductor elements, the plural semiconductor elements on which the predetermined number of arithmetic elements are formed are mounted on an identical circuit substrate, and the intermediate partial sum accumulating part is provided for each of the semiconductor elements on which the predetermined number of arithmetic elements are split and formed. According to another aspect of the present invention, a configuration is also possible in which a predetermined number of arithmetic elements making up one of the plural groups are split and formed on plural semiconductor elements on plural circuit substrates, the plural circuit substrates are mounted on an identical mounting substrate, and the intermediate partial sum accumulating part is provided at least for each of the semiconductor elements or on the circuit substrates.

Another aspect of the present invention is the neural network arithmetic apparatus, in which the arithmetic elements further include a data storage memory in which neuron output values at least related with the arithmetic elements are stored. This further reduces the amount of data exchanged, thereby contributing to reduction in the amount of use of transmission lines and enabling application to operations of a larger-scale neural network.

Furthermore, according to another aspect of the present invention, the data storage memory has at least two memories so that one memory stores data to be used for operations and another stores results obtained by the operations, whereby necessary data has been held in the arithmetic elements in a stage where operations on the next arithmetic layer are started, eliminating the need to re-supply data to each arithmetic element and enabling quicker initiation to the next operation processing.

Another aspect of the present invention is the neural network arithmetic apparatus, further including a connection weight updating part that updates each of synapse connection weights of a selected neuron stored in the storage memory.

Thereby, since the arithmetic elements can perform neuron operations and synapse connection weight updating on respectively independently assigned neurons, unlike a conventional approach, arithmetic elements for neuron operations and arithmetic elements for updating synapse connection weights need not be provided separately, and operations of a neural network can be performed using fewer arithmetic elements than have been conventionally required. Consequently, a neural network arithmetic apparatus is obtained which can perform operations of a large-scale neural network without decreasing operation speed by using almost the same number or fewer arithmetic elements that have conventionally been used.

During operations on error signals by back propagation, synapse connection weights are updated using error signals propagated backward. In the present invention, however, since plural neurons making up one operation layer are split and assigned equally to a group of a predetermined number of arithmetic elements, a value outputted from the predetermined number of arithmetic elements is a partial sum of error signal.

Therefore, another aspect of the present invention is the neural network arithmetic apparatus, in which the accumulating part further includes an error signal generating part that, during operations on error signals, successively selects the predetermined number of synapses receiving output signals from a specific neuron, multiplies the connection weight of a selected synapse by the error signal of a neuron having the selected synapse, accumulates the result for the predetermined number of synapses, outputs an obtained value as a partial sum of error signal, accumulates the obtained partial sum of error signal for all synapses connected with the specific neuron, and outputs an obtained value, as the error signal of the specific neuron, to an arithmetic element to which the specific neuron is assigned.

In this case, the connection weight updating part updates synapse connection weights stored in the storage memory, using an error signal generated by the error signal generating part.

Thereby, synapse connection weight updating on neurons assigned to each arithmetic element can be performed using error signals obtained in the arithmetic element.

A neural network arithmetic apparatus according to another aspect of the present invention further includes: plural first transmission lines that connect a predetermined number of arithmetic elements making up one group; and at least one second transmission line that is smaller in band width than the first transmission lines and connects plural groups. In the apparatus, fewer number of plural groups than the predetermined number of arithmetic elements making up a group are provided.

Another aspect according to the present invention is a neural network operation method that is suitable for the neural network arithmetic apparatus and performs neuron operations in parallel for a predetermined number of neurons, of plural neurons making up the neural network. The method includes the steps of: storing the synapse connection weights of at least part of all synapses of one neuron for a predetermined number of assigned neurons; successively selecting the predetermined number of neurons during neuron operations; successively selecting synapses of the selected neuron; multiplying the synapse connection weight of the selected synapse by the neuron output value of a neuron of a preceding stage connected with the synapse; accumulating the result for an identical neuron to generate a partial sum of neuron operation value; and accumulating the partial sum of neuron operation value until the values of all synapses of one neuron are added, to generate a neuron output value.

Another aspect of the present invention is the neural network operation method including the steps of: when accumulating the partial sum of neuron operation value to generate a neuron output value, accumulating, for an identical neuron, at least one of the partial sum of neuron operation value and a partial sum obtained by accumulating the partial sum of neuron operation value for an identical neuron to generate an intermediate partial sum of neuron operation value; and accumulating at least one of the partial sum of neuron operation value and the intermediate partial sum of neuron operation value until the values of all synapses of one neuron are added, to generate a neuron output value.

Another aspect of the present invention is the neural network operation method including the steps of: splitting the number of synapses to operate on, of neuron operations of an identical neuron into plural groups; and generating the intermediate partial sum of neuron operation value for each of the groups.

When splitting the number of synapses to plural groups, by equally splitting the number of the synapses to operate on, according to another aspect of the present invention, a time lag caused by the difference of time required for individual operations can be prevented to improve efficiency.

As described above, during learning by back propagation, a value outputted from a predetermined number of arithmetic elements is a partial sum of error signal. Therefore, another aspect of the present invention is the neural network operation method including the steps of: during error signal operations, successively selecting synapses receiving output signals from a specific neuron; multiplying the connection weight of a selected synapse by the error signal of a neuron having the selected synapse; accumulating the result for the predetermined number of neurons; outputting an obtained value as a partial sum of error signal; accumulating the partial sum of error signal for all synapses receiving output signals from the specific neuron; and outputting an obtained value as an error signal of the specific neuron to an arithmetic element to which the specific neuron is assigned. In this case, preferably, synapse connection weights are updated using an error signal obtained by accumulating the partial sum of error signal.

BRIEF DESCRIPTION OF THE DRAWINGS

Preferred embodiments of the present invention will be described in detail based on the followings, wherein:

FIG. 4 is a memory map of neuron output values stored in a program memory;

FIG. 9A illustrates a matrix representation of operations of a neural network of three-layer perceptron type applied to the neural network arithmetic apparatus of the first embodiment, FIG. 9B illustrates an example of a method of splitting the connections to be computed, represented in an area I within the matrix of FIG. 9A, and FIG. 9C illustrates an example of a method of splitting the connections to be computed, represented in an area II within the matrix of FIG. 9A;

FIG. 24 illustrates a matrix representation of operations of a neural network of cyclic coupling type applied to the neural network arithmetic apparatus of the third embodiment;

FIG. 25 illustrates an example of a method of splitting all connections to be computed within the matrix shown in FIG. 24;

FIG. 27 illustrates a matrix representation of operations of a neural network of cyclic coupling type applied to the neural network arithmetic apparatus of the fourth embodiment;

DESCRIPTION OF THE PREFERRED EMBODIMENTS (First Embodiment)

Figure 1:
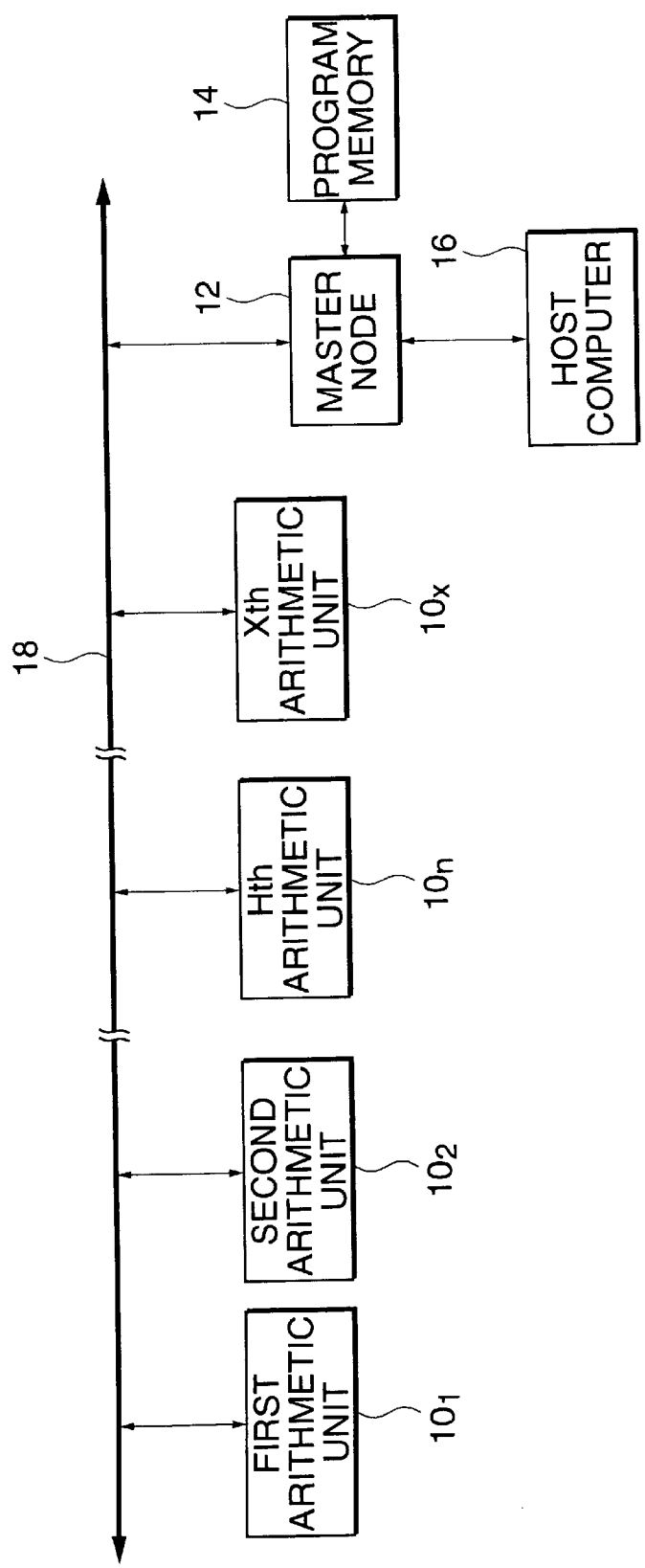
FIG. 1 is a block diagram showing an outline of the configuration of a neural network arithmetic apparatus of a first embodiment of the present invention.

A neural network arithmetic apparatus of a first embodiment, as shown in FIG. 1, primarily has plural arithmetic units $10_1$ to $10_x$ (1<x where x is a positive integer), a master node 12, a program memory 14, and a host computer 16, and performs neuron operations and learning by the Hebb Rule in a neural network of perceptron of three layers, an input layer, a hidden layer, and an output layer.

Figure 3:
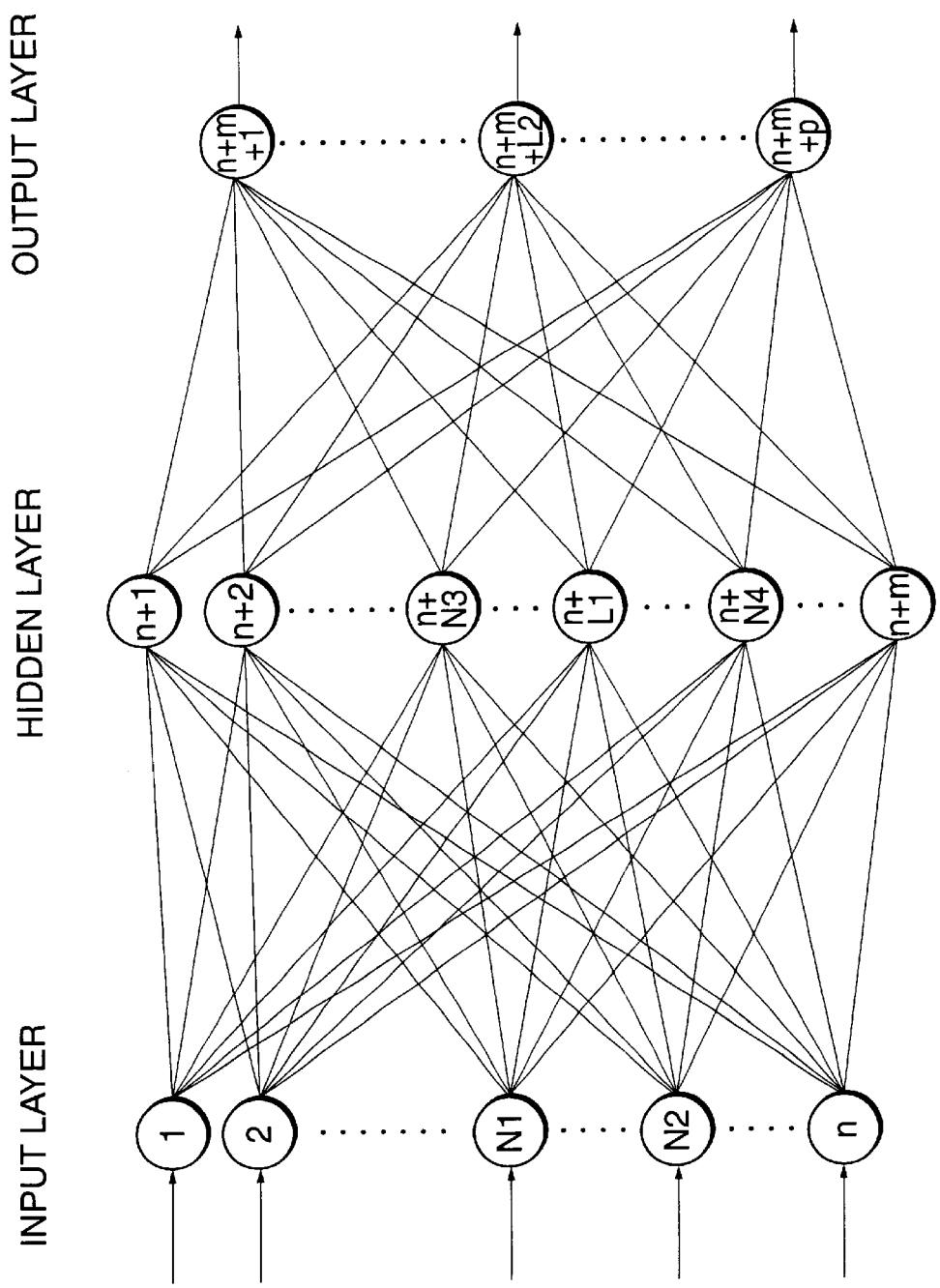
FIG. 3 is a conceptual diagram of a neural network to which the neural network arithmetic apparatus of the first embodiment of the present invention is applied.

The three-layer perceptron forms full coupling between the input layer and the hidden layer and between the hidden layer and the output layer. In FIG. 3, for purposes of description, neurons in the input layer are consecutively assigned neuron numbers 1 to n; neurons in the hidden layer, neuron numbers n+1 to n+m; and neurons in the output layer, neuron numbers n+m+1 to n+m+p (N1<N2<n, N3<L1<N4<m, L2<p, where n, m, p, N1, N2, N3, N4, L1, and L2 are positive integers).

First, a description is made of the configuration of the neural network arithmetic apparatus of the first embodiment. As shown in FIG. 1, the arithmetic units $10_1$ to $10_x$ and the master node 12 are connected by a local bus 18, operation results from the arithmetic unit $10_1$ to $10_x$ are passed to the master node 12 through the local bus 18, and control information from the master node 12 is transmitted to the arithmetic units $10_1$ to $10_x$.

The master node 12, which is configured by a programmable arithmetic processing unit such as a CPU, controls the arithmetic units $10_1$ to $10_x$ described in detail later; during neuron operations, reads neuron output values required by the arithmetic units $10_1$ to $10_x$ from the program memory 14, outputs them to the local bus 18, accumulates, on a group basis, partial sums $y\alpha_j$ of neuron operation values outputted from the arithmetic units $10_1$ to $10_x$ (described in detail later), applies a nonlinear operation to the obtained value to generate a neuron output value $Y_j$, and then outputs it to the program memory 14; and during learning, sends the products of the neuron output values and learning coefficients to the arithmetic units $10_1$ to $10_x$ (described in detail later). For nonlinear operations, sigmoid function, threshold logical function, and other functions can be used.

The program memory 14 is locally connected to the master node 12. In the program memory 14 are stored a program for operation control described later, neuron output values $Y_1$ to $Y_{n+m+p}$ outputted from the master node 12, and others. The neuron output values $Y_1$ to $Y_{n+m+p}$ are continuously stored in ascending order by neuron number as shown in FIG. 4, for example.

The master node 12 is connected with the host computer 16 through a host bus 19 to exchange data with the host computer 16. The host computer 16 writes a program describing the operation of the master node 12 to the program memory 14 to control the operation of the master node 12.

More specifically, after writing the program describing the operation of the master node 12 to the program memory 14, the host computer 16 sends a neuron operation start signal to the master node 12 to start neuron operations by plural arithmetic units $10_1$ to $10_x$, and receives an obtained operation result from the master node 12. The host computer 16 sends a learning start signal to the master node 12 to start learning.

The arithmetic units $10_1$ to $10_x$ each are formed into one semiconductor element independent of each other, and perform two types of operations in parallel based on control data from the master node 12: the operation of partial sum yα$_j$ during neuron operation (to be described in detail) and the updating of synapse connection weights.

More specifically, the arithmetic units $10_1$ to $10_x$ multiply, during neuron operations, a neuron output value received from a preceding stage by a synapse connection weight for each of assigned synapses (here, N synapses) of a specific neuron, accumulates the multiplication result for the N synapses, and outputs an obtained result. The operation is performed for all assigned neurons (here, M neurons), sequentially from a specified neuron.

Accumulation results outputted from the individual arithmetic units are hereinafter referred to as partial sums yα$_j$ of neuron operation values, which are added for one neuron and transformed to a neuron output by nonlinear transformation. The arithmetic units $10_1$ to $10_x$, during learning, updates assigned synapse connection weights according to a learning algorithm.

Figure 2:
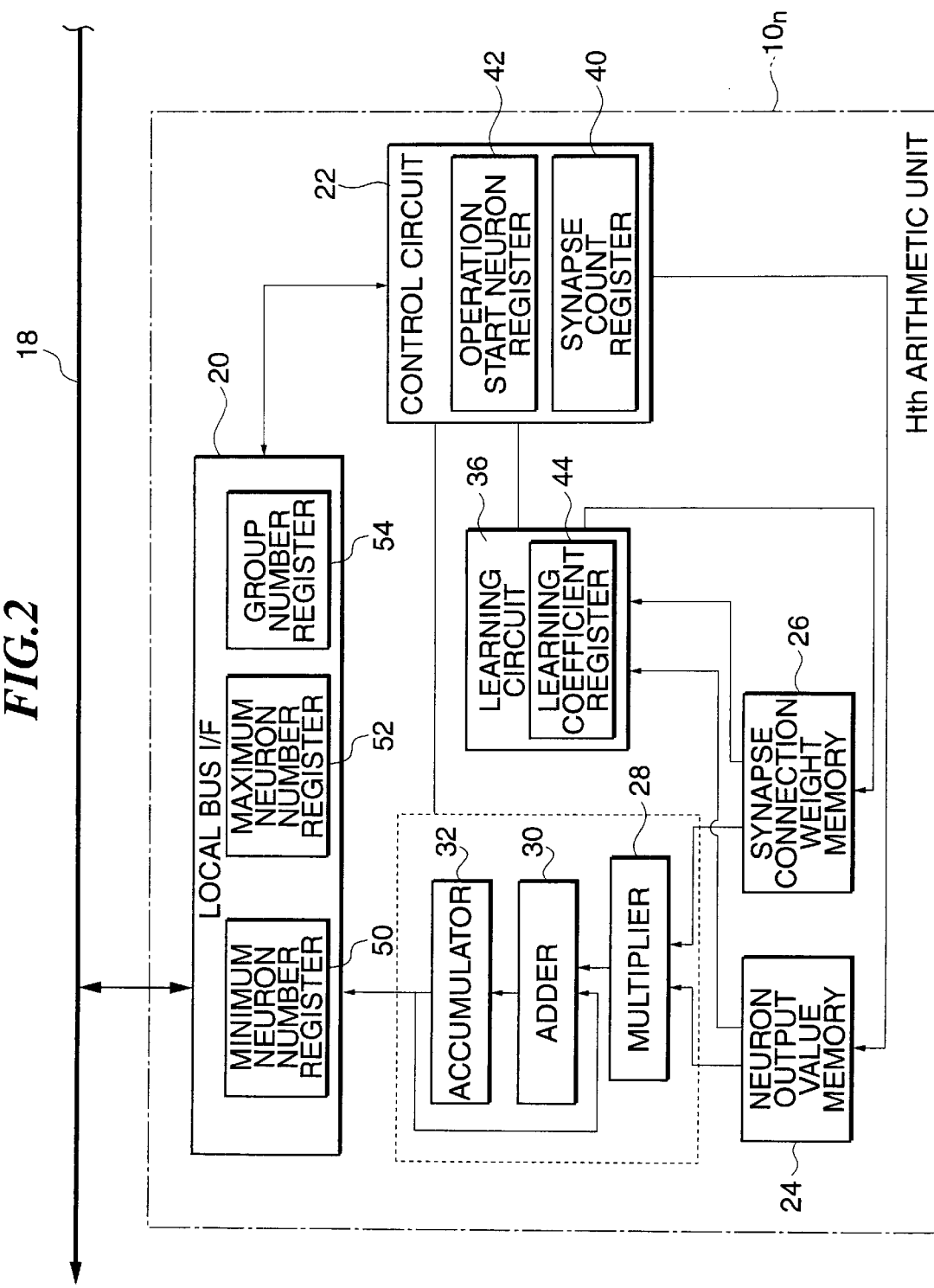
FIG. 2 is a block diagram showing an outline of the configuration of an arithmetic unit making up the neural network arithmetic apparatus shown in FIG. 1.

The configuration of the arithmetic units $10_1$ to $10_x$ is described below. The arithmetic units $10_1$ to $10_x$ each have, as shown in FIG. 2 (in FIG. 2, for purposes of description, only an H arithmetic unit $10_h$ is shown, where H>1 and H is any integer), a local bus interface 20, a control circuit 22, a neuron output value memory 24, a synapse connection weight memory 26, a multiplier 28, an adder 30, an accumulator 32, and a learning circuit 36.

The local bus interface 20, which includes a minimum neuron number register 50, a maximum neuron number register 52, and a group number register 54, outputs a partial sum yα$_j$ of neuron operation values outputted from its own accumulator 32 to the local bus 18, and receives output values of other neurons and control data from the master node 12.

The minimum neuron number register 50 has, the smallest number of neurons, whose neuron output values are stored in the neuron output memory 24 to be described later, and the maximum neuron number register 52 has the maximum number of neurons corresponding to the stored values. The group number register 54 is set to a group number to which an arithmetic unit to be described later belongs.

The control circuit 22, which includes an operation synapse count register 40 and an operation start neuron register 42, controls the operation of the H arithmetic unit $10_h$ by control data from the master node 12, inputted through the local bus interface 20. In the operation synapse count register 40, synapse count N operated on one neuron is stored, and in the operation start neuron register 42, the address NADR of the neuron output value memory 24, where neuron output value is read out at the start of a partial sum operation on a neuron operation value, is stored.

Moreover, the control circuit 22 has plural address counters not shown, which specifies addresses for accessing the synapse connection weight memory 26 and the neuron output value memory 24 under control by the master node 12 through the local bus interface 20. The address counters are incremented for each memory access but can also be set to a specific value through the local bus 18.

The neuron output value memory 24 stores the neuron output values of plural neurons necessary for the operations of assigned synapses, and the neuron output values are updated by the master node 12 through the local bus 18.

The synapse connection weight memory 26 stores part of synapse connection weights of plural assigned neurons, that is, synapse connection weights of N synapses, for the M number of neurons. These are stored in the following order. N synapse connection weights of a first neuron having the smallest neuron number are successively stored from the start address, followed by N synapse connection weights of a second neuron successively stored, and thus ended by N synapse connection weights of an Mth neuron successively stored.

The multiplier 28, according to an indication from the control circuit, successively reads data from the neuron output value memory 24 and the synapse connection weight memory 26 to perform multiplication.

The adder 30 adds a multiplication result inputted from the multiplier 28 and an accumulated value temporarily stored in the accumulator 32 and temporarily stores an obtained accumulated value in the accumulator 32. This operation, in the case of neuron operation, is repeated the number of times stored in the operation synapse count register 40.

The accumulator 32 temporarily stores the accumulated value outputted from the adder 30 and provides to the adder 30 until accumulative additions are repeated by the adder 30 the above-described number of times. After accumulative additions have been repeated by the adder 30 the above-described number of times, the accumulator 32 outputs the stored accumulated value to the local bus interface 20.

The learning circuit 36 include a learning coefficient register 44 which holds the product of a neuron error signal δ and a learning coefficient sent from the master node 12. The learning circuit 36 reads a synapse connection weight from the synapse connection weight memory 26, changes the synapse connection weight according to the algorithm of the learning rules, and writes the changed synapse connection weight to the memory 26. Like the control circuit 22, the learning circuit 36 also includes address counters LADR.

A description is made of a partial sum operation routine for neuron operation values and the updating of synapse connection weights by learning, which are performed independently in each of the arithmetic units making up the neural network arithmetic apparatus of the above configuration. For purposes of description, the partial sum operation routine for neuron operation values and the updating of synapse connection weights by learning in any Hth arithmetic unit $10h$ are described with reference to the flowcharts of FIGS. 7 and 8. To the Hth arithmetic unit $10h$ are assigned partial sum operations of M neuron operation values from neuron number n+1 to neuron number n+N3 in FIG. 3; N (S>N) synapses numbered from 1 to N1, of all synapses (S synapses) of each neuron, are assigned.

Figure 6:
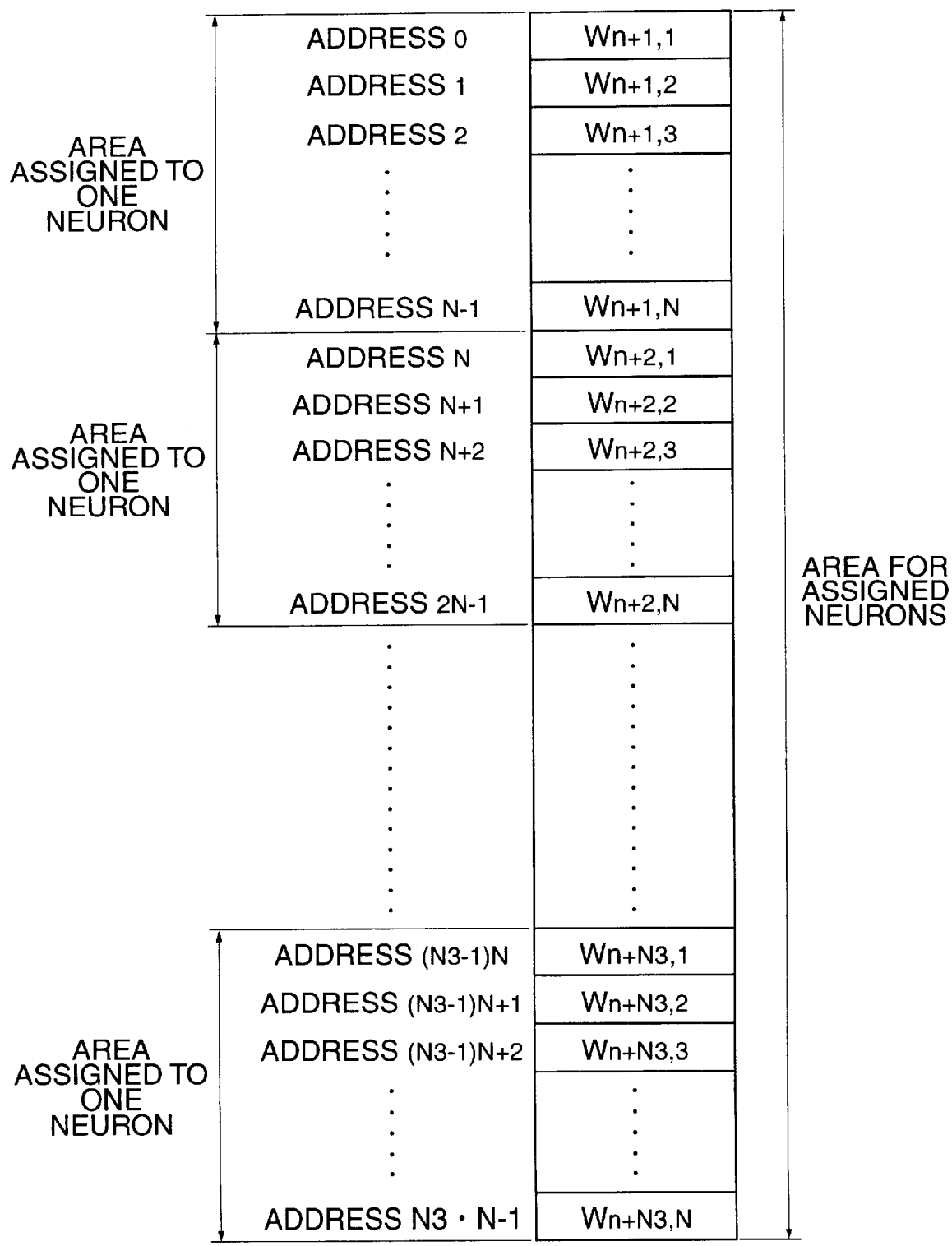
FIG. 6 is a memory map of synapse connection weights stored in a synapse connection weight memory.

First the operation start neuron register 42 of the Hth arithmetic unit $10h$ is set to address 0 and the operation synapse count register 40 is set to N. In the synapse connection weight memory 26, as shown in FIG. 6, connection weights $w_{n+1,1}$ to $W_{n+1,N1}$ of N synapses of neuron n+1 are sequentially stored at addresses 0 to N−1, connection weights $W_{n+2,1}$ to $W_{n+2,N1}$ of N synapses of neuron n+2 are sequentially stored at the following addresses N to 2N−1, followed in the same way, and finally, connection weights $W_{n+N3,1}$ to $W_{n+N3,N1}$ of N synapses of neuron n+N3 are sequentially stored at addresses (N3−1)N to N3·N−1.

Figure 5:
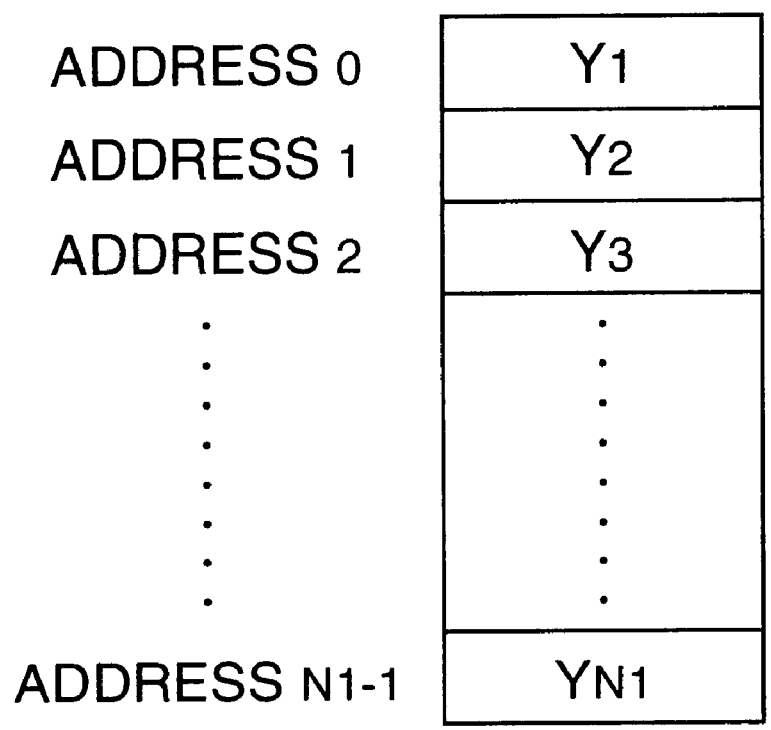
FIG. 5 is a memory map of neuron output values stored in a neuron output value memory of an arithmetic unit.

In the neuron output value memory 24, as shown in FIG. 5, the neuron output values $Y_1$ to $Y_{N1}$ of N neurons from neuron 1 to neuron N1, which are neuron output values necessary for neuron operations, are successively stored at addresses 0 to N−1. The master node 12 writes the neuron output values $Y_1$ to $Y_{N1}$ selecting among neuron output values $Y_1$ to $Y_{n+m+p}$ stored in the program memory 14 to the neuron output value memory 24 of the Hth arithmetic unit $10h$.

Data values such as these synapse connection weights and neuron output values are set by, e.g., an assignment method to be described later, according to the configuration of a neural network. As the initial values of connection weights, random values, values determined by learning in advance, and other values can be freely afforded.

Figure 7:
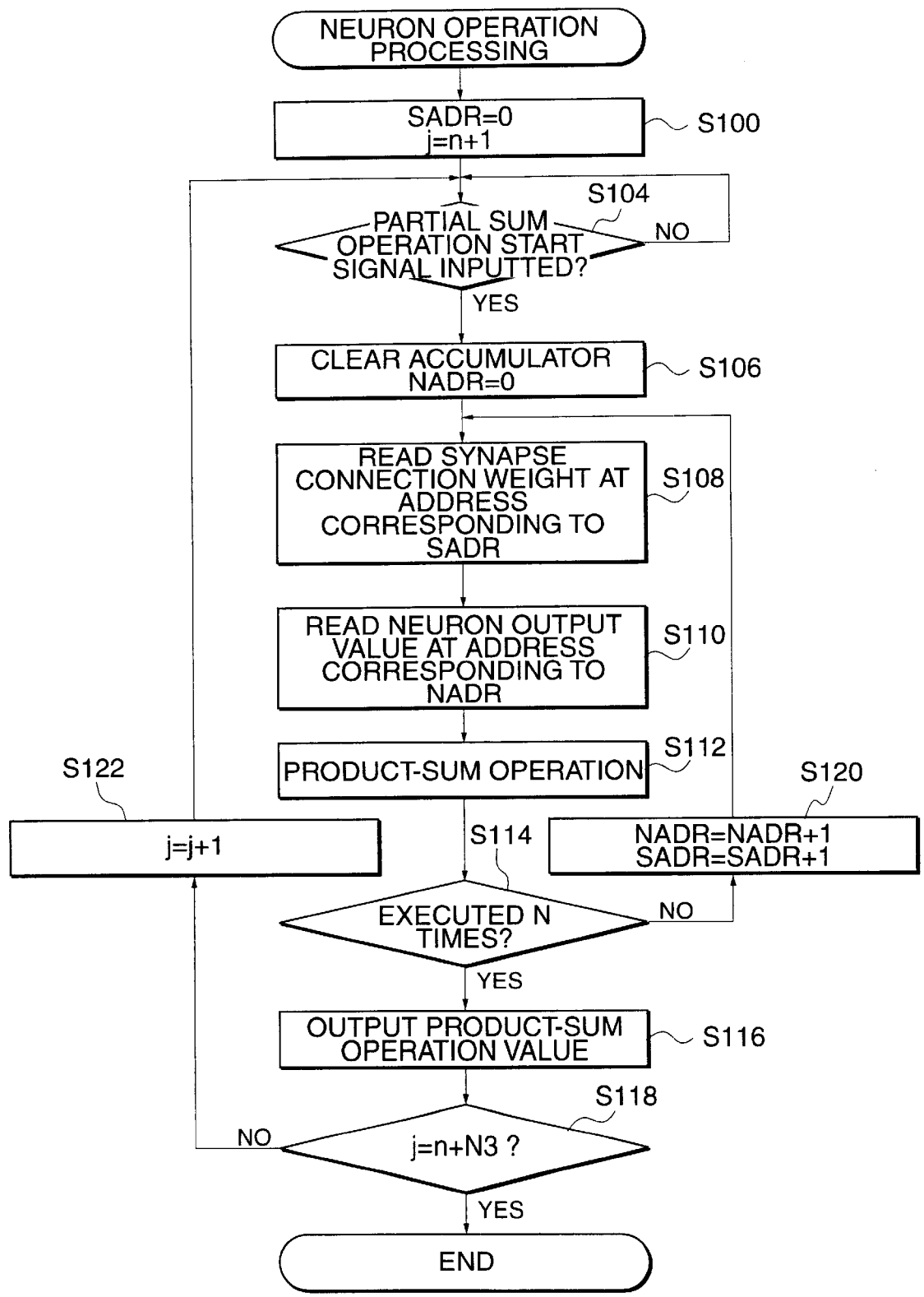
FIG. 7 is a routine for computing a partial sum of neuron operation values by the neural network arithmetic apparatus of the first embodiment.

Referring to the flowchart of FIG. 7, a partial sum operation routine for neuron operation values is described. In step 100, the read address SADR of the synapse connection weight 26 is cleared, a neuron number j to operate on is set to the minimum number n+1, and control goes to step 104.

In the next step 104, it is judged whether a signal to start a partial sum operation on a neuron operation value has been received from the master node 12. If received, control goes to step 106.

In step 106, the value of the accumulator 32 is cleared and the read address NADR of the neuron output value memory 24 is set to 0. In the next step 108, a synapse connection weight $W_{ji}$ stored at current address SADR is read from the synapse connection weight memory 26, and in the next step 110, a neuron output value $Y_i$ stored at current address NADR is read from the neuron output value memory 24.

In step 112, the read synapse connection weight $W_{ji}$ and the neuron output value $Y_i$ are multiplied by the multiplier 28. An obtained multiplication result is added by the adder 30 to a value currently stored in the accumulator 32 and the addition result is stored in the accumulator 32.

In the next step 114, it is judged whether the multiplication operation has been performed N times, the number of times equal to the number of assigned synapses. If it is judged that the multiplication operation has not yet been performed N times, control goes to step 120 to increment the read address NADR of the neuron output value memory 24 and the read address SADR of the synapse connection weight memory 26, and then control returns to step 108 to repeat the above processing.

If it is judged that the multiplication operation has been performed N times, control goes to step 116, where the data stored in the accumulator 32 is outputted, as a partial sum $y\alpha_j$ of neuron operation values, to the local bus 18 via the local bus interface 20. The partial sum $y\alpha_j$ of neuron operation values outputted to the local bus 18 is accumulated on a group basis by the master node 12 to be described later, and then is subjected to a nonlinear operation to produce a neuron output value $Y_j$.

In the next step 118, it is judged whether operations terminate on the number M of neurons assigned to the arithmetic unit. That is, it is judged whether the neuron number of a neuron to operate on is equal to n+N3. If it is judged that the neuron number is not equal to n+N3, control goes to step 122 to increment neuron number j, and then control returns to step 100 to repeat the above processing.

If it is judged that neuron number j is equal to n+N3, since operations on the number M of assigned neurons terminate, this routine terminates.

When the number of synapses of the next neuron is different from that of a neuron operated previously, or when an operation start number in a partial sum operation on the next neuron operation value is different from that in a partial sum operation on a neuron operation value operated previously, before starting a partial sum operation on the next neuron operation value, the number of synapses stored in the operation synapse count register 40 can be changed to the number of synapses of a neuron to operate on this time, or a neuron operation start number stored in the operation start neuron register 42 can be changed to the operation start number of a neuron to operate on this time.

In this way, the arithmetic units $10_1$ to $10_x$ perform operations sequentially from a neuron whose weight is stored in the start address SADR of the synapse connection weight memory 26, and terminate after performing neuron operations on as many neurons as M indicated by the neuron count register 42.

Although the above description is made of the case where an arithmetic unit has one adder and one multiplier, arithmetic units each having plural adders and plural multipliers may be provided so that neuron operations on plural neurons are performed at the same time by plural multipliers within one arithmetic unit.

Figure 8:
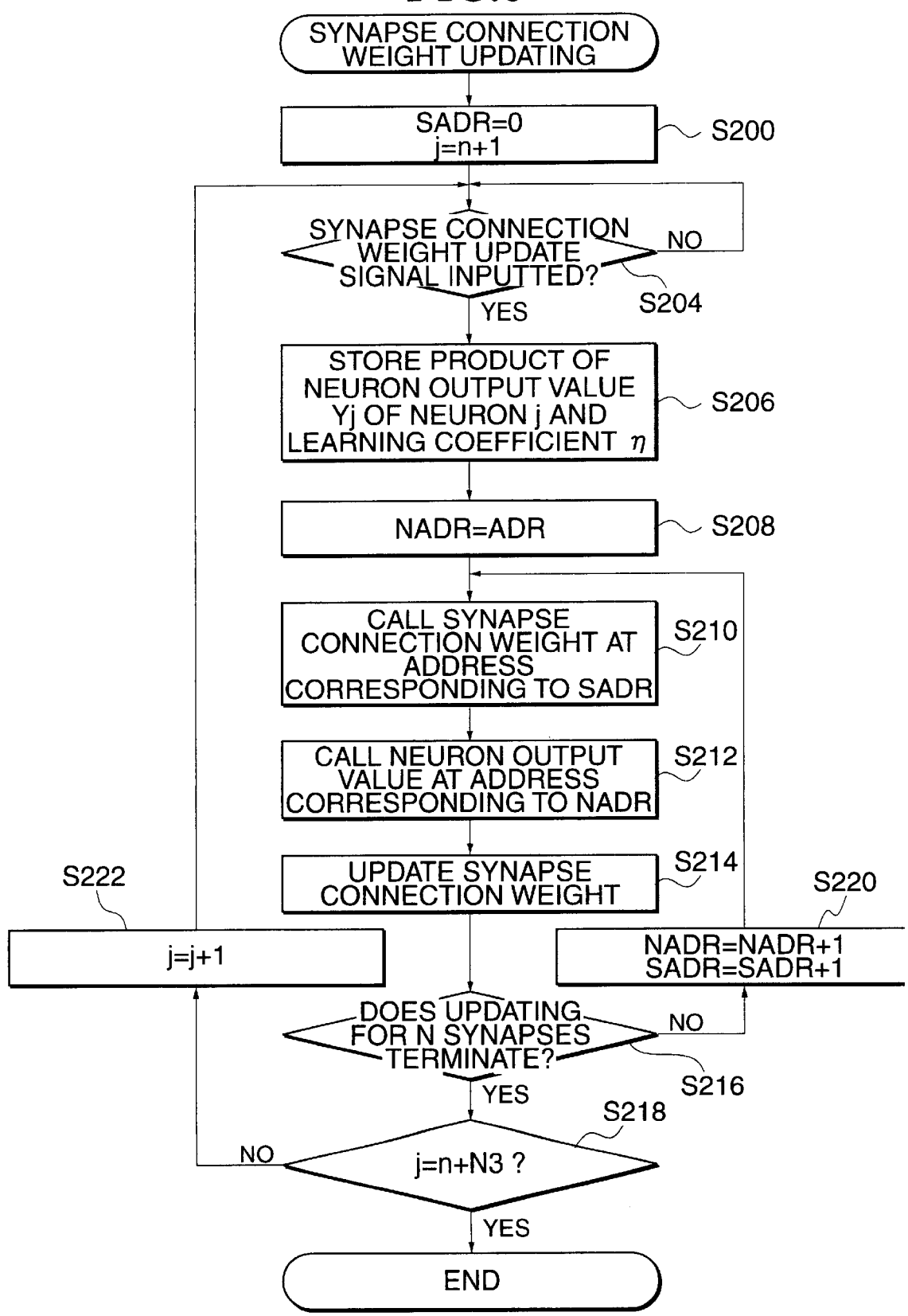
FIG. 8 is a routine for updating synapse connection weights by the neural network arithmetic apparatus of the first embodiment.

Next, a description is made of the updating of synapse connection weights by learning with reference to the flowchart of FIG. 8. Here, learning by the Hebb Rule is described. In step 200, the synapse connection weight memory update address LADR of the learning circuit 36 is cleared, the value (a neuron number) of variable j is set to the smallest number, n+1, and control goes to step 204.

In the next step 204, it is judged whether a synapse connection weight update signal has been sent from the master node 12. If it is judged in step 204 whether a synapse connection weight update signal has been sent from the master node 12, control goes to the next step 206.

In step 206, the product of a neuron output value $Y_j$ of neuron number j afforded from the master node and a learning coefficient η is stored in the learning coefficient register 44, and control goes to the next step 208. In step 208, the read address NADR of the neuron output value memory is set to an address ADR, which is set in the operation start neuron register 42.

In the next step 210, a synapse connection weight $W_{j,i}$ is read from the address SADR of the synapse connection weight memory 26, and in the next step 212, a neuron output value $Y_i$ is read from the address NADR of the neuron output value memory 24.

In step 214, the read neuron output value $Y_i$ and the value stored in the learning coefficient register 44 are multiplied, the multiplication result is added to the read synapse connection weight $W_{j,i}$, and an obtained value is overwritten, as a new synapse connection weight, to the address SADR of the synapse connection weight memory 26, whereby a synapse connection weight at the address SADR of the synapse connection weight memory 26 is updated.

In the next step 216, it is judged whether the connection weights of all assigned synapses have been updated, that is, connection weight updating on N synapses has terminated. If it is judged that the connection weight updating on N synapses has not yet terminated, control goes to step 220 to increment the address SADR of the synapse connection weight memory 26 and the read address NADR of the neuron output value memory 24, and then control returns to step 210 to repeat the above processing.

If it is judged that the connection weight updating on N synapses has terminated, control goes to step 218, where it is judged whether synapse connection weight updating on all assigned neurons has terminated, that is, whether the neuron number j is equal to n+N3. If it is judged that the neuron number j is not equal to n+N3, control goes to step 222 to increment the neuron number j, and then control returns to step 200 to repeat the above processing. If it is judged that the neuron number j is equal to n+N3, the routine terminates.

In this way, each time the arithmetic units $10_1$ to $10_x$ receive a synapse connection weight update signal from the master node 12, they update synapse connection weights sequentially from a neuron of the smallest number of assigned neurons.

If a signal to start a partial sum operation on a neuron operation value is received from the master node 12 before the synapse connection weight updating operation terminates, a partial sum operation on the next neuron operation value is started after the connection weight updating terminates. Also, for example, each of the synapse connection weight memory 26 and the neuron output memory 24 used for neuron operations and learning may have a bank to prevent competition for memory access so that connection weight updating and a partial sum operation on a neuron operation value can be performed in parallel.

Access, from the outside world, to the synapse connection weight memory 26 and the neuron output value memory 24 within the arithmetic units $10_1$ to $10_x$ is made through the local bus 18. To read data from the synapse connection weight memory 26 and the neuron output value memory 24, the master node 12 supplies a signal for selecting specific units of the arithmetic units $10_1$ to $10_x$, an address for reading the data stored in the selected arithmetic units, and a read control signal through the local bus 18. The read data is outputted to the local bus 18 and received in the master node 12.

In a similar way, data is written to the synapse connection weight memory 26 by supplying a signal for selecting units of the arithmetic units $10_1$ to $10_x$, the address of the data to be written to the selected arithmetic units, a write control signal, and the data to be written, through the local bus 18.

On the other hand, a neuron output value $Y_i$ is written to the neuron output value memory 24 within the arithmetic units $10_1$ to $10_x$ at the same time. The writing is performed by supplying the neuron number i whose output is written, a write control signal, and the neuron output value $Y_i$ to be written, through the local bus 18. At this time, the arithmetic units $10_1$ to $10_x$ each receives write data (neuron output value $Y_i$) if the neuron number i whose output is written is between the value stored in the minimum neuron number register 50 and the value stored in the maximum neuron number register 52.

Upon receiving the neuron output value data, the arithmetic units writes the received neuron output value data to the neuron output value memory 24, whose address is calculated by subtracting the value stored in the minimum neuron number register 50 from the specified neuron number.

Next, a description is made of a method for assigning operations of a neural network of three-layer perceptron type having an input layer, a hidden layer, and an output layer, as shown in FIG. 3, to the x arithmetic units, from the first arithmetic unit $10_1$ to the xth arithmetic unit $10_x$, in the neural network arithmetic apparatus of the above configuration. In the interests of simplicity, a description is made of a case where operations of the neural network are assigned to six arithmetic units, from the first arithmetic unit $10_1$ to the sixth arithmetic unit $10_6$.

If the neuron output values of all neurons 1 to n+m+p shown in FIG. 3 are represented as $Y_1$ to $Y_{n+m+p}$ respectively and a synapse connection weight from neuron i to neuron j is represented as $W_{ji}$, operations of a neural network of three-layer perceptron type can be represented as a matrix having 3 by 3 blocks by using $W_{ji}$ as shown in FIG. 9A.

The area indicated by I in FIG. 9A represents connections (that is, $1 \leq i \leq n$, $n+1 \leq j \leq n+m$) from the input layer to the hidden layer, the area indicated by II in FIG. 9A represents connections (that is, $n+1 \leq i \leq n+m$, $n+m+1 \leq j \leq n+m+p$) from the hidden layer to the output layer, and other areas have no connections ($W_{ji}=0$) and need not be computed.

A computation method of a neural network in the first embodiment splits the connections to be computed, represented in the areas I and II, into at least plural segments horizontally, and assigns them to all or part of the x arithmetic units so that they are processed in distributed form.

As an example, as shown in FIGS. 9B and 9C, the connections to be computed, represented in each of the areas I and II, are split into three segments horizontally and two segments vertically, and the six split segments are assigned equally to six arithmetic units $10_1$ to $10_6$ so that they are processed in distributed form.

The first to third arithmetic units $10_1$ to $10_3$ of the six arithmetic units $10_1$ to $10_6$ are classified as a first group G1 with a group number register 54 set to 1, and the fourth to sixth arithmetic units $10_4$ to $10_6$ are classified as a second group G2 with the group number register 54 set to 2, thereby splitting plural neurons making up one operation layer into two groups (in this example, the hidden layer is split into a group of neurons n+1 to n+L1, and a group of neurons n+L1+1 to n+m, and the output layer is split into a group of neurons n+m+1 to n+m+L2, and a group of neurons n+m+L2+1 to n+m+p), and assigning them to the two groups G1 and G2, respectively, while neuron operations by one neuron are split into three segments, which are assigned equally to three arithmetic units making up one group.

Accordingly, in the synapse connection weight memory 26 of the first arithmetic unit $10_1$ of the first group G1, connection weights $W_{ji}(1 \leq i \leq N1, n+1 \leq j \leq n+L1)$ of area I-1 and connection weights $W_{ji}(n+1 \leq i \leq n+N3, n+m+1 \leq j \leq n+m+L2)$ of area II-1 are stored; in the synapse connection weight memory 26 of the second arithmetic unit $10_2$, connection weights $W_{ji}(N1+1 \leq i \leq N2, n+1 \leq j \leq n+L1)$ of area I-2 and connection weights $W_{ji}(n+N3+1 \leq i \leq n+N4, n+m+1 \leq j \leq n+m+L2)$ of area II-2 are stored; and in the synapse connection weight memory 26 of the third arithmetic unit $10_3$, connection weights $W_{ji}(N2+1 \leq i \leq n, n+1 \leq j \leq n+L1)$ of area I-3 and connection weights $W_{ji}(n+N4+1 \leq i \leq n+m, n+m+1 \leq j \leq n+m+L2)$ of area II-3 are stored.

In the synapse connection weight memory 26 of the fourth arithmetic unit $10_4$ of the second group G2, connection weights $W_{ji}(1 \leq i \leq N1, n+L1+1 \leq j \leq n+m)$ of area I-4 and connection weights $W_{ji}(n+1 \leq i \leq n+N3, n+m+L2+1 \leq j \leq n+m+p)$ of area II-4 stored; in the synapse connection weight memory 26 of the fifth arithmetic unit $10_5$, connection weights $W_{ji}(N1+1 \leq i \leq N2, n+L1+1 \leq j \leq n+m)$ of area I-5 and connection weights $W_{ji}(n+N3+1 \leq i \leq n+N4, n+m+L2+1 \leq j \leq n+m+p)$ of area II-5 are the synapse connection weight memory 26 of the sixth arithmetic unit $10_6$, connection weights $W_{ji}(N2+1 \leq i \leq n, n+L1+1 \leq j \leq n+m)$ of area I-6 and connection weights $W_{ji}$ $(n+N4+1 \leq i \leq n+m, n+m+L2+1 \leq j \leq n+m+p)$ of area II-6 are stored.

In the neuron output value memory 24 of the first arithmetic unit $10_1$ of the first group G1, for operations of connection from the input layer to the output layer, neuron output values $Y_i(1 \leq i \leq N1)$ corresponding to column numbers of area I-1 are stored, while the minimum value 1 of column numbers of area I-1 is stored in the minimum neuron number register 50 and the maximum value N1 of column numbers of area I-1 is stored in the maximum neuron number register 52. For operations of connection from the hidden layer to the output layer, $Y_i(n+1 \leq i \leq n+N3)$ corresponding to column numbers of area II-1 are stored, while the minimum value n+1 of column numbers of area II-1 is stored in the minimum neuron number register 50 and the maximum value n+N3 of column numbers of area I-1 is stored in the maximum neuron number register 52. Also in the second to sixth arithmetic units $10_2$ to $10_6$, connection weights and neuron output values are stored similarly.

Since the first to third arithmetic units $10_1$ to $10_3$ form the first group G1 to perform neuron operations in parallel, the respective group number registers 54 are set to the group number 1. Similarly, since the fourth to sixth arithmetic units $10_4$ to $10_6$ form the second group G2 to perform neuron operations in parallel, the respective group number registers 54 are set to the group number 2. A control signal from the master node 12 is sent at the same time to arithmetic units having an identical group number.

Figure 10:
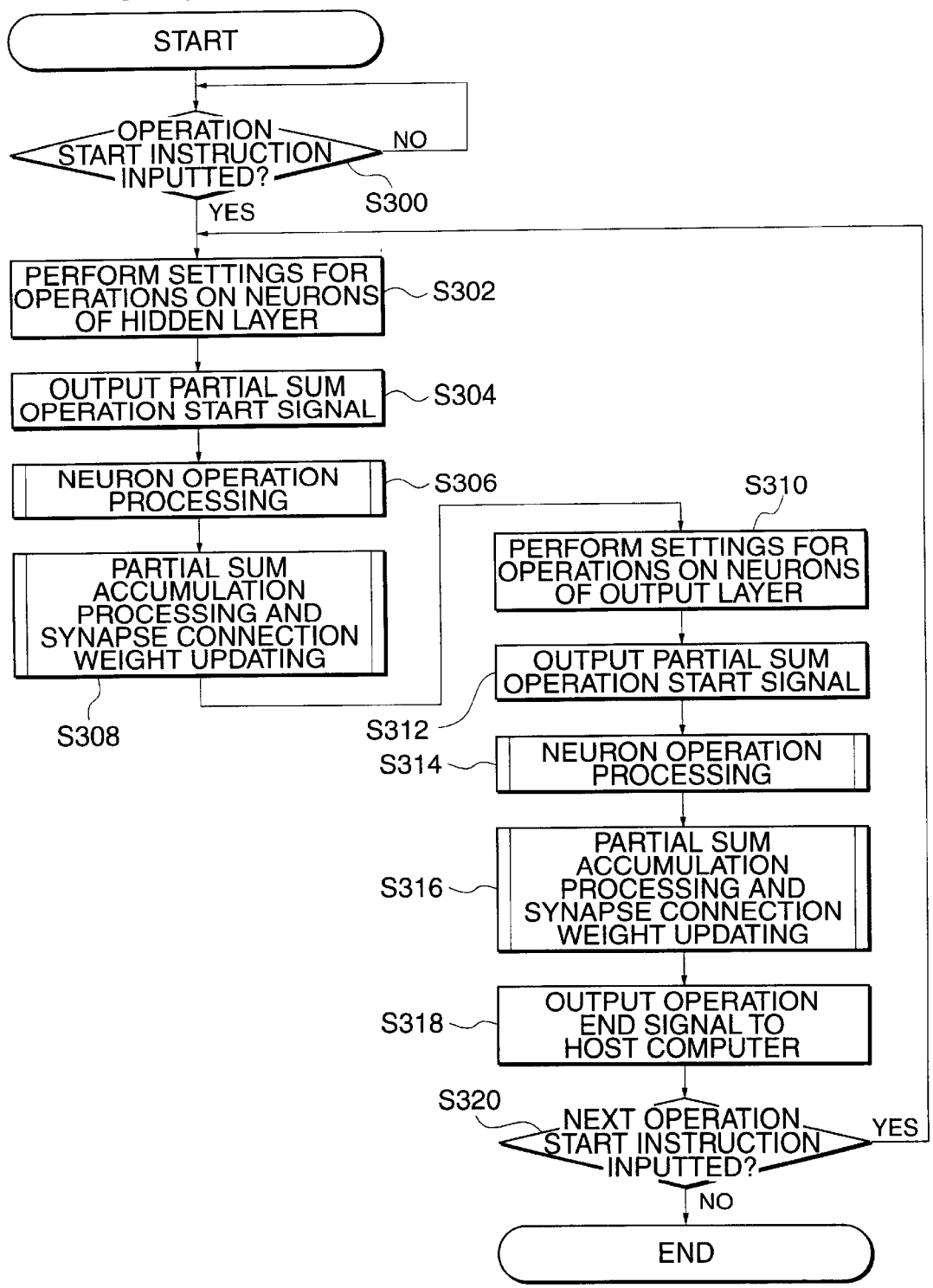
FIG. 10 is a control routine for a master node shown in FIG. 1.

Referring to the flowchart of FIG. 10, a description is made of a control routine of the master node 12 to control the arithmetic units $10_1$ to $10_6$ to which neuron operations are assigned as described above. The master node 12 reads the program to describe the operation of the master node 12, written to the program memory 14 by the host computer 16, and starts operation according to the program. The host computer 16 writes the program to describe the operation of the master node 12 to the program memory 14 and initializes the arithmetic units $10_1$ to $10_x$. In the initialization, initial data is written to the synapse connection weight memory 26 and the setting of the group number register 54 is performed. The values of the group number comply with the configuration of a neural network and are set as described in the description on the method of assigning operations, and input values $Y_1$ to $Y_n$ to the input layer are written to the program memory 14.

In step 300, it is judged whether a neuron operation start instruction is outputted from the host computer 16. If it is judged that a neuron operation start instruction is outputted, the control program of the master node 12 is read from the program memory 14 and control goes to the next step 302. In step 302, various types of data required to perform neuron operations of the hidden layer are outputted along with a write indication.

The master node 12 performs the following settings for each of arithmetic units with the group number register 54 set to 1, that is, the arithmetic units $10_1$, $10_2$, and $10_3$ belonging to the first group G1. That is, the minimum neuron number register 50 of the first arithmetic unit $10_1$ is set to 1, the minimum neuron number register 50 of the second arithmetic unit $10_2$ is set to N1+1, and the minimum neuron number register 50 of the third arithmetic unit $10_3$ is set to N2+1, while the maximum neuron number register 52 of the first arithmetic unit $10_1$ is set to N1, the maximum neuron number register 52 of the second arithmetic unit $10_2$ is set to N2, and the maximum neuron number register 52 of the third arithmetic unit $10_3$ is set to n.

Similarly, the master node 12 performs the following settings for each of arithmetic units with the group number register 54 set to 2, that is, the arithmetic units $10_4$, $10_5$, and $10_6$ belonging to the second group G2. That is, the minimum neuron number register 50 of the fourth arithmetic unit $10_4$ is set to 1, the minimum neuron number register 50 of the fifth arithmetic unit $10_4$ is set to N1+1, and the minimum neuron number register 50 of the sixth arithmetic unit $10_6$ is set to N2+1, while the maximum neuron number register 52 of the fourth arithmetic unit $10_4$ is set to N1, the maximum neuron number register 52 of the fifth arithmetic unit $10_5$ is set to N2, and the maximum neuron number register 52 of the sixth arithmetic unit $10_6$ is set to n.

The master node 12 reads the neuron output values $Y_1$ to $Y_n$ of the input layer from the program memory 14 to which they are written by the host computer 16, and outputs the read neuron output values $Y_1$ to $Y_n$ to the local bus 18 along with a neuron number i and a write control signal.

Writing to the arithmetic units $10_1$ to $10_6$ is performed by the previously described method. Specifically, in order for the arithmetic units $10_1$ to $10_6$ each to receive neuron output values $Y_i$ of neuron number i between a value set in the minimum neuron number register 50 and a value set in the maximum neuron number register 52, neuron output values $Y_1$ to $Y_{N1}$ are stored sequentially from addresses 0 to N−1 of the neuron output value memory 24 of the first arithmetic unit $10_1$ and the fourth arithmetic unit $10_4$; neuron output values $Y_{N1+1}$ to $Y_{N2}$ are stored sequentially from addresses 0 to N−1 of the neuron output value memory 24 of the second arithmetic unit $10_2$ and the fifth arithmetic unit $10_5$; and neuron output values $Y_{N2+1}$ to $Y_n$ are stored sequentially from addresses 0 to N−1 of the neuron output value memory 24 of the third arithmetic unit $10_3$ and the sixth arithmetic unit $10_6$.

The master node 12 sets the respective operation start neuron registers 42 and operation synapse count registers 40 of the arithmetic units $10_1$, $10_2$, and $10_3$ belonging to the first group G1. That is, for all the three arithmetic units $10_1$, $10_2$, and $10_3$, the operation start neuron register 42 is set to 0, the operation synapse count register 40 of the first arithmetic unit $10_1$ is set to N1, the operation synapse count register 40 of the second arithmetic unit $10_2$ is set to N2−N1, and the operation synapse count register 40 of the third arithmetic unit $10_3$ is set to n−N2. At this time, the same values can be set at the same time in registers within a group by specifying a group number.

Also, for the arithmetic units $10_4$, $10_5$, and $10_6$ belonging to the second group G2, similarly, the respective operation start neuron registers 42 and operation synapse count registers 40 are set. That is, for all the three arithmetic units $10_4$, $10_5$, and $10_6$, the operation start neuron register 42 is set to 0, the operation synapse count register 40 of the fourth arithmetic unit $10_4$ is set to N1, the operation synapse count register 40 of the fifth arithmetic unit $10_5$ is set to N2−N1, and the operation synapse count register 40 of the sixth arithmetic unit $10_6$ is set to n−N2.

Upon termination of all settings, control goes to the next step 304, where a signal to start partial sum operations on neuron operation values are outputted to the local bus 18, and then control goes to step 306, where partial sum operations on neuron operation values of neurons (neuron numbers n+1 to n+m) of the hidden layer are started.

As described in the flowchart of FIG. 7, upon receipt of the operation start signal, the arithmetic units $10_1$ to $10_x$ each start a partial sum operation on a neuron operation value in ascending order of the neuron numbers of neurons assigned to them. Thereby, partial sum operations on individual neuron operation values making up the hidden layer are performed in parallel and neuron operations of the hidden layer are performed in parallel on a group basis.

For example, the first to third arithmetic units $10_1$ to $10_3$ of the first group G1 start partial sum operations of neuron operation values of neuron n+1, and the arithmetic units $10_4$ to $10_6$ of the second group G2 start partial sum operations of neuron operation values of neuron n+L1+1. On starting the operations, the arithmetic units $10_1$ to $10_x$ each successively perform partial sum operations on assigned neuron operation values as described in the above-described partial sum operation routine of neuron operation values, and output an obtained operation result (partial sum $y\alpha_j$ of neuron operation values) to the master node 12 through the local bus 18 along with a group number.

Figure 11:
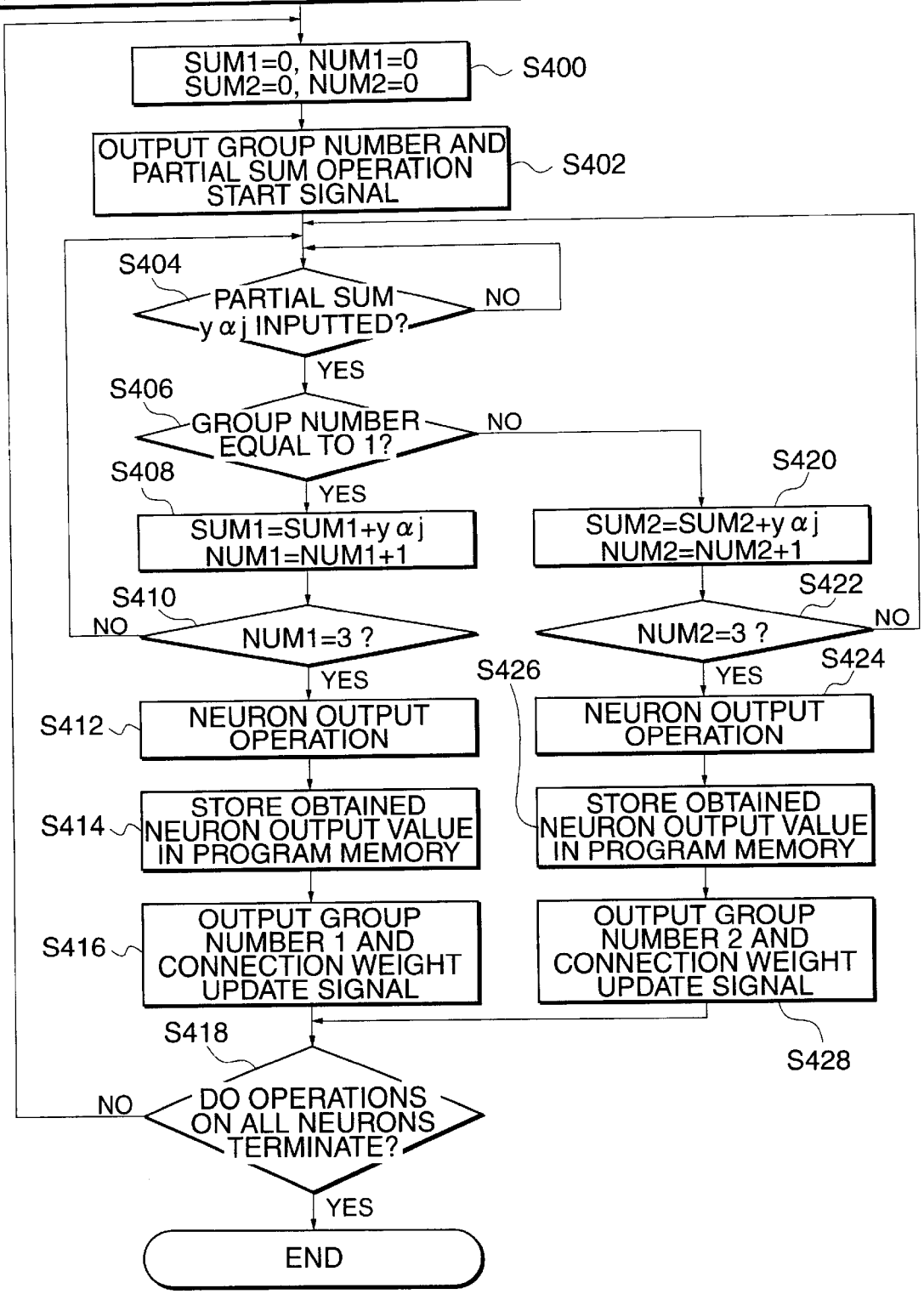
FIG. 11 is a flowchart of partial sum accumulation processing for neuron operation values of a hidden layer of step 308 of FIG. 10 and synapse connection weight updating.

In the next step 308, accumulation processing for partial sums $y\alpha_j$ of neuron operation values and the updating of connection weights are performed. The accumulation processing and the updating of connection weights are described with reference to the flowchart of FIG. 11. In step 400, a variable SUM1 to accumulate partial sums $y\alpha_j$ of neuron operation values received from the arithmetic units $10_1$ to $10_3$ of the first group G1 and a variable NUM1 to denote the number of partial sums $y\alpha_j$ of inputted neuron operation values are initialized to 0, while, for the second group G2, similarly, a variable SUM2 to accumulate partial sums $y\alpha_j$ of neuron operation values inputted from the arithmetic units $10_4$ to $10_6$ of the second group G2 and a variable NUM2 to denote the number of partial sums $y\alpha_j$ of inputted neuron operation values are initialized to 0.

In step 402, a group number and a signal to start partial sum operations are outputted to the local bus 18 to direct the arithmetic units $10_1$ to $10_3$ of the first group G1 and the arithmetic units $10_4$ to $10_6$ of the second group G2 to start neuron operations. On starting the operations, the arithmetic units each calculate a partial sum $y\alpha_j$ of assigned neuron operation values as described in the above-described partial sum operation routine of neuron operation values, and send the obtained partial sum $y\alpha_j$ of neuron operation values to the master node 12 along with a group number (1 or 2 in the case of this example) to which they belong.

In the next step 404, it is judged whether the partial sum $y\alpha_j$ of neuron operation value is inputted to the master node 12. If it is judged that it is inputted, control goes to the next step 406, where it is judged whether the group number inputted along with the partial sum $y\alpha_j$ of neuron operation value is 1.

If it is judged that the group number is 1, since the inputted partial sum is a partial sum of neuron operation value of the first group G1, control goes to step 408, where the partial sum $y\alpha_j$ of neuron operation value is accumulated in SUM1 and the variable NUM1 is incremented, and control goes to the next step 410.

In step 410, if it is judged whether the number of inputted partial sums of neuron operation value is 3, that is, NUM1 is equal to 3, and if NUM1 is not equal to 3, control returns to step 404 to repeat the above processing. If NUM1 is equal to 3, control goes to step 412, where an accumulated value is subjected to nonlinear transformation by, e.g., a sigmoid function to produce a neuron output value $Y_{n+1}$ of neuron n+1. Parameters of the sigmoid function can be changed for each neuron. Threshold logic is also possible as a function to perform nonlinear transformation. In the next step 414, the obtained neuron output value $Y_{n+1}$ is stored in an area allocated in the program memory 14.

In step 416, a group number 1 and the product of the neuron output value $Y_{n+1}$ of neuron n+1 and a predetermined learning coefficient η are sent and set in the learning coefficient register 44 of the arithmetic units $10_1$ to $10_3$ of the first group G1. Next, the master node 12 outputs the group number 1 and a connection weight update signal to direct the arithmetic units $10_1$ to $10_3$ of the first group G1 to start updating synapse connection weights, and control goes to step 418. A description of the updating of synapse connection weights in the arithmetic units $10_1$ to $10_3$ is omitted because it was described previously.

On the other hand, if it is judged in the step 406 that the group number inputted along with the partial sum $y\alpha_j$ of neuron operation value is not 1, since the inputted partial sum is a partial sum of neuron operation value of the second group G2, control goes to step 420, where the partial sum $y\alpha_j$ of neuron operation value is accumulated in SUM2 and the variable NUM2 is incremented, and control goes to the next step 422.

In step 422, if it is judged whether the number of received partial sums of neuron operation value is 3, that is, NUM2 is equal to 3, and if NUM2 is not equal to 3, control returns to step 404 to repeat the above processing. If NUM2 is equal to 3, control goes to step 424, where an accumulated value is subjected to nonlinear transformation by, e.g., a sigmoid function to produce a neuron output value $Y_{n+L1+1}$ of neuron n+L1+1. Parameters of the sigmoid function can be changed for each neuron. Threshold logic is also possible as a function to perform nonlinear transformation. In the next step 426, the obtained neuron output value $Y_{n+L1+1}$ is stored in an area allocated in the program memory 14.

In the next step 428, a group number 2 and the product of the neuron output value $Y_{n+L1+1}$ of neuron n+L1+1 and a predetermined learning coefficient η are sent and set in the learning coefficient register 44 of the arithmetic units $10_4$ to $10_6$ of the second group G2. Next, the master node 12 outputs the group number 2 and a connection weight update signal to direct the arithmetic units $10_4$ to $10_6$ of the second group G2 to start updating synapse connection weights, and control goes to step 418. A description of the updating of synapse connection weights in the arithmetic units $10_3$ to $10_6$ is omitted because it was described previously.

In step 418, it is judged whether operations on all neurons assigned to the first group G1 and the second group G2 terminate. It is judged that operations on all neurons assigned to the first group G1 and the second group G2 do not terminate, control returns to step 400 to repeat the above processing. At this time, to calculate the next neuron, processing of steps 400 and 402 is performed for the arithmetic units with a group number for which neuron operations terminate. The routine terminates when it is judged that operations on all neurons assigned to the first group G1 and the second group G2 terminate.

After accumulation processing for partial sums $y\alpha_j$ of neuron operation values and the updating of connection weights terminate, partial sum operations on neurons n+m to n+m+p of the output layer are performed. First, in step 310, various types of data required to perform neuron operations of the output layer are sent along with a write indication.

The master node 12 performs the following settings for each of arithmetic units with the group number register 54 set to 1, that is, the arithmetic units $10_1$, $10_2$, and $10_3$ belonging to the first group G1. That is, the minimum neuron number register 50 of the first arithmetic unit $10_1$ is set to n+1, the minimum neuron number register 50 of the second arithmetic unit $10_2$ is set to n+N3+1, and the minimum neuron number register 50 of the third arithmetic unit $10_3$ is set to n+N4+1, while the maximum neuron number register 52 of the first arithmetic unit $10_1$, is set to n+N3, the maximum neuron number register 52 of the second arithmetic unit $10_2$ is set to n+N4, and the maximum neuron number register 52 of the third arithmetic unit $10_3$ is set to n+m.

Similarly, the master node 12 performs the following settings for each of arithmetic units with the group number register 54 set to 2, that is, the arithmetic units $10_4$, $10_5$, and $10_6$ belonging to the second group G2. That is, the minimum neuron number register 50 of the fourth arithmetic unit $10_4$ is set to n+1, the minimum neuron number register 50 of the fifth arithmetic unit $10_5$ is set to n+N3+1, and the minimum neuron number register 50 of the sixth arithmetic unit $10_6$ is set to n+N4+1, while the maximum neuron number register 52 of the fourth arithmetic unit $10_4$ is set to n+N3, the maximum neuron number register 52 of the fifth arithmetic unit $10_5$ is set to n+N4, and the maximum neuron number register 52 of the sixth arithmetic unit $10_6$ is set to n+m.

The master node 12 reads the neuron output values $Y_{n+1}$ to $Y_{n+m}$ of the input layer from the program memory 14 to which they are written by the host computer 16, and outputs the read neuron output values $Y_{n+1}$ to $Y_{n+m}$ to the arithmetic units $10_1$ to $10_6$ through the local bus 18 along with a neuron number i and a write control signal.

Writing to the arithmetic units $10_1$ to $10_6$ is performed by the previously described method. Specifically, neuron output values $Y_{n+1}$ to $Y_{n+N3}$ are stored sequentially from addresses 0 to N−1 of the neuron output value memory 24 of the first arithmetic unit $10_1$ and the fourth arithmetic unit $10_4$; neuron output values $Y_{n+N3+1}$ to $Y_{n+N4}$ are stored sequentially from addresses 0 to N−1 of the neuron output value memory 24 of the second arithmetic unit $10_2$ and the fifth arithmetic unit $10_5$; and neuron output values $Y_{n+N4+1}$ to $Y_{n+m}$ are stored sequentially from addresses 0 to N−1 of the neuron output value memory 24 of the third arithmetic unit $10_3$ and the sixth arithmetic unit $10_6$.

The master node 12 sets the respective operation start neuron registers 42 and operation synapse count registers 40 of the arithmetic units $10_1$, $10_2$, and $10_3$ belonging to the first group G1. For all the three arithmetic units $10_1$, $10_2$, and $10_3$, the operation start neuron registers 42 are set to 0, the operation synapse count register 40 of the first arithmetic unit $10_1$ is set to N3, the operation synapse count register 40 of the second arithmetic unit $10_2$ is set to N4−N3, and the operation synapse count register 40 of the third arithmetic unit $10_3$ is set to m−N4. At this time, the same values can be set at the same time in registers within a group by specifying a group number. The address counter of the control circuit 22 is set to the start address of synapse connection weights of neuron n+m+1 after the computation of the hidden layer.

Similarly, the operation start neuron registers 42 and operation synapse count registers 40 of the arithmetic units $10_4$, $10_5$, and $10_6$ belonging to the second group G2 are also set. That is, for all the three arithmetic units $10_4$, $10_5$, and $10_6$, the operation start neuron registers 42 are set to 0, the operation synapse count register 40 of the fourth arithmetic unit $10_4$ is set to N3, the operation synapse count register 40 of the fifth arithmetic unit $10_5$ is set to N4−N3, and the operation synapse count register 40 of the sixth arithmetic unit $10_6$ is set to m−N4.

Upon termination of all settings, control goes to the next step 312, where a signal to start partial sum operations on neuron operation values are outputted to the local bus 18, and then control goes to step 314, where partial sum operations on neuron operation values of neurons (neuron numbers n+m+1 to n+m+p) of the output layer are started.

As described in the flowchart of FIG. 7, upon receipt of the operation start signal, the arithmetic units $10_1$ to $10_x$ each start a partial sum operation on a neuron operation value in ascending order of the neuron numbers of neurons assigned to them. Thereby, partial sum operations on neuron operation values making up the output layer are performed in parallel and neuron operations of the hidden layer are performed in parallel on a group basis. A description of the neuron operations is omitted because it is the same as the above description, except that assigned neurons are different.

In the next step 316, accumulation processing for partial sums $y\alpha_j$ of neuron operation values and the updating of connection weights are performed. The accumulation processing for the output layer and the updating of connection weights are described with reference to the flowchart of FIG. 12. Since processing in the flowchart of FIG. 12 is almost the same as the accumulation processing for the hidden layer and the updating of connection weights described using the flowchart of FIG. 11, the same reference numerals are used in the flowchart and the flowchart is not described except only different steps.

Figure 12:
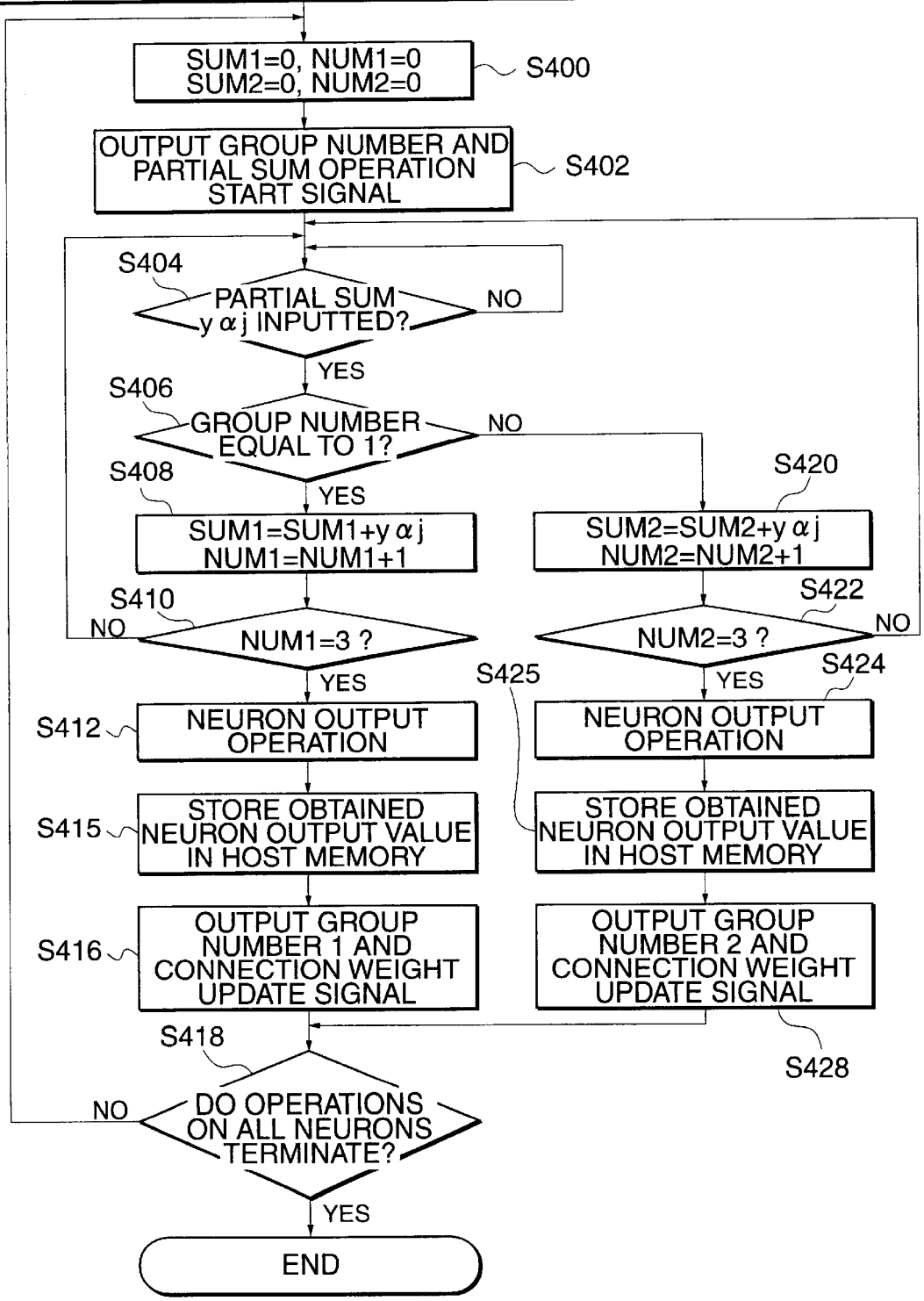
FIG. 12 is a flowchart of partial sum accumulation processing for neuron operation values of an input layer of step 316 of FIG. 11 and synapse connection weight updating.

In step 415 of the flowchart of FIG. 12, a neuron output value $Y_j$ obtained by the first group G1 is sent to the host computer 16. Likewise, in step 425 of the flowchart of FIG. 12, a neuron output value $Y_j$ obtained by the second group G2 is sent to the host computer 16. Thereby, neuron output values $Y_{n+m+1}$ to $Y_{n+m+p}$ of the output layer are stored in the host computer 16.

Upon termination of the accumulation processing of the output layer and the updating of connection weights, control goes to step 318, where a termination signal is outputted to the host computer 16, and then control goes to step 320, where it is judged whether the next operation start instruction is inputted from the host computer. If it is judged that the next operation start instruction is inputted from the host computer, control goes to step 302 to repeat the above processing. If it is judged that the next operation start instruction is not inputted, the routine terminates. The host computer 16, upon receipt of a termination signal from the master node 12, affords new input to the neural network to enable the master node 12 to open the routine to perform the above operations, as soon as an operation start instruction is inputted from the host computer 16.

(Second Embodiment)

The neural network arithmetic apparatus of the second embodiment, which is an application of the first embodiment, employs back propagation instead of the Hebb Rule as a learning algorithm of a neural network.

Figure 13:
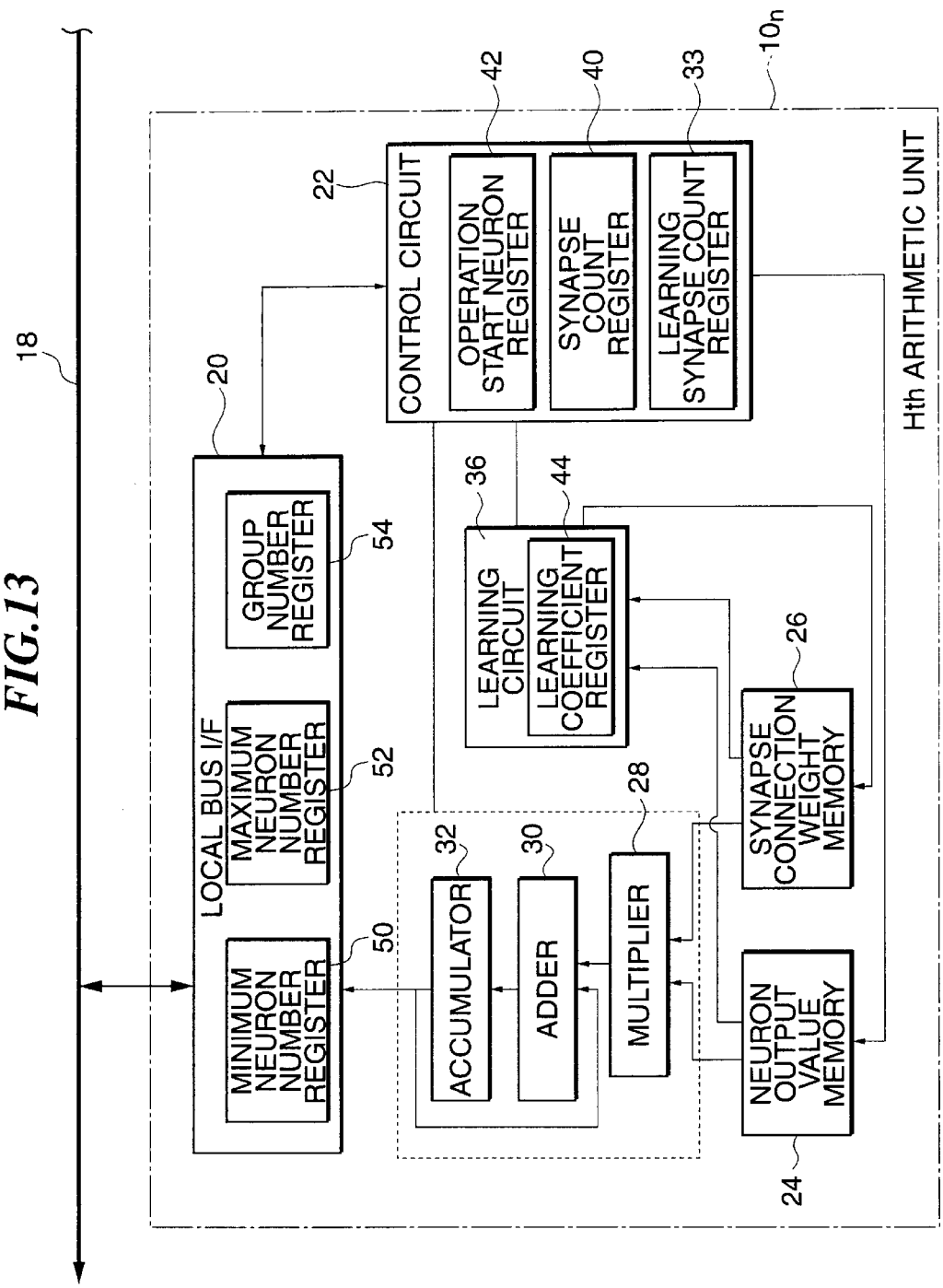
FIG. 13 is a block diagram showing an outline of the configuration of an arithmetic unit making up the neural network arithmetic apparatus of the second embodiment of the present invention.

The neural network arithmetic apparatus of the second embodiment is provided with a learning synapse count register 33 in the control circuit 22 within individual arithmetic units, as shown in FIG. 13. The learning synapse count register 33 stores the number S of synapses one neuron has. The host computer 16 writes a teacher signal d to the program memory 14 and sends a learning start signal to the master node 12 to start learning by back propagation.

The neuron output value memory 24 stores, during neuron operations and synapse connection weight updating, neuron output values $Y_i$ to $Y_{i+N}$ of an operation layer at a preceding stage used for operations, and during error signal operations, stores error signals $\delta_{j1}$ to $\delta_{jM}$ of relevant neurons. A description of others is omitted because they are the same as those of the above-described first embodiment.

Each of the arithmetic units $10_1$ to $10_x$ in the neural network arithmetic apparatus of the second embodiment is formed on one semiconductor element independent of each other, and according to control data from the master node 12, performs partial sum operations on neuron operation values and learning operations by back propagation. A description of partial sum operations on neuron operation values is omitted because they are the same as those in the above-described first embodiment, and learning by back propagation is described below.

For learning by back propagation, the arithmetic units $10_1$ to $10_x$ perform two types of operations: partial sum operations on error signals $\delta$ by back propagation as shown in the equation (4), and the updating of synapse connection weights as shown in the equation (2).

Specifically, in the learning by back propagation, for the output layer, operations are performed on neurons of the output layer to which error signals $\delta_{n+m+1}$ to $\delta_{n+m+p}$ are assigned based on the differences between the teacher signals d inputted from the host computer 16 and the neuron output values $Y_{n+m+1}$ to $Y_{n+m+p}$ of neurons of the output layer obtained by neuron operations. For the hidden layer, after error signals of the output layer and the connection weights of synapses of the output layer, connected with a specific neuron, are multiplied to produce a partial sum $\delta\alpha_j$ of error signal $\delta$ for each arithmetic unit, the master node 12 accumulates the partial sums $\delta\alpha_j$ and calculates an error signal $\delta$ of a neuron of the hidden layer. This is performed for all neurons of the hidden layer. Moreover, each arithmetic unit updates synapse connection weights of its own.

A description is made of partial sum operations of error signals δ of the hidden layer and the updating of synapse connection weights that are performed independently in each of plural arithmetic units making up the neural network arithmetic apparatus of the above configuration. For purposes of description, partial sum operations of error signal δ and the updating of synapse connection weights in the Hth arithmetic unit $10h$ are described with reference to the flowcharts of FIGS. 14 and 15.

The Hth arithmetic unit $10h$ is assigned partial sum operations on M neuron operation values of consecutive neuron numbers n+m+1 to n+m+L2 in FIG. 3, and N (S>N) synapses of synapses numbered from n+1 to n+N of all synapses (S synapses) of each neuron. In error signal operations, a partial sum of error signal of N neurons numbered from n+1 to n+N3 is calculated using the values of M synapses connected to each neuron among the same synapses used in neuron operation. In partial sum operation processing for error signals δ, error signals $δ_{n+m+1}$ to $δ_{n+m++L2}$ are stored in the neuron output value memory 24.

Figure 14:
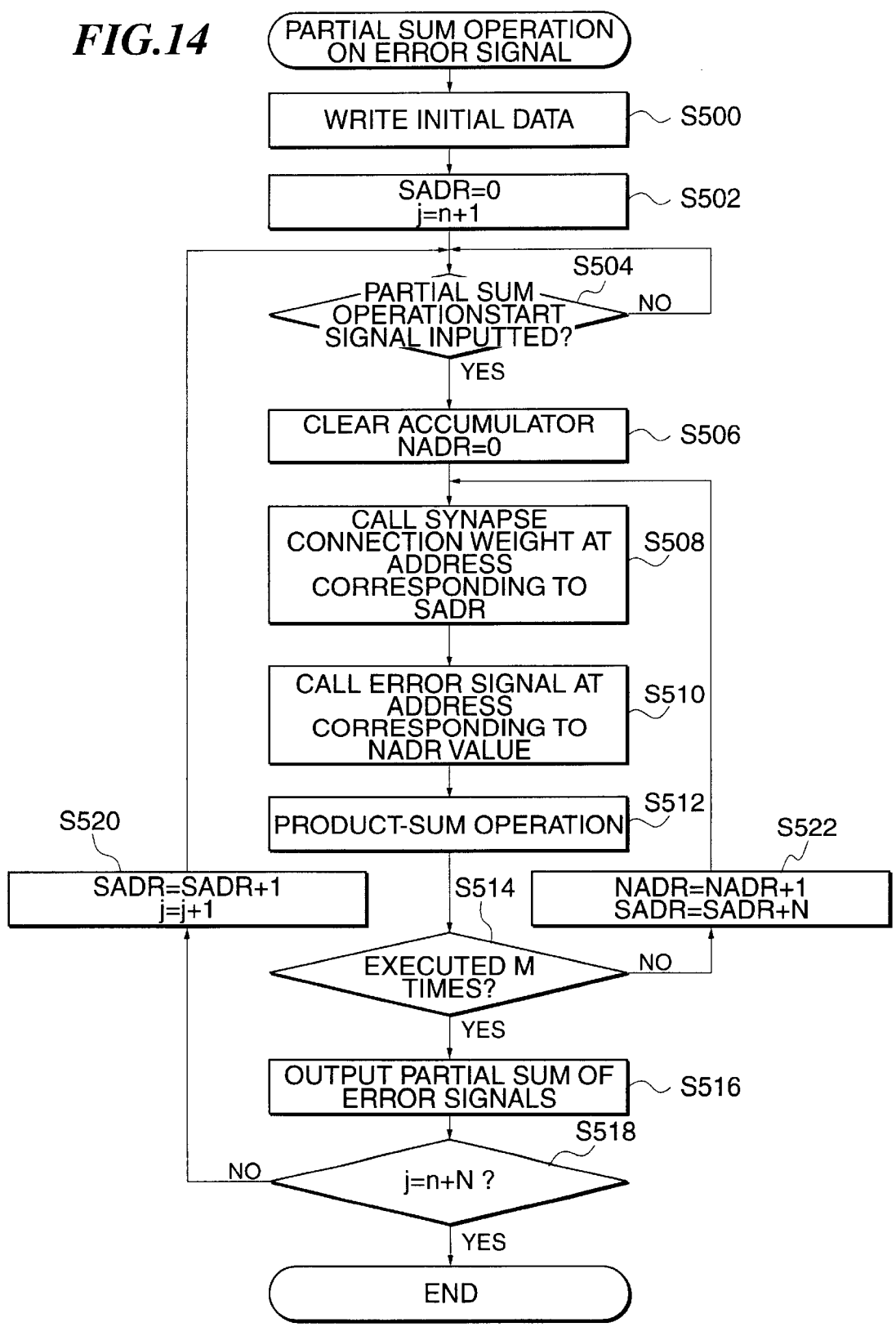
FIG. 14 is a partial sum operation processing routine for error signal by the neural network arithmetic apparatus of the second embodiment of the present invention.

In step 500 of FIG. 14, initial data is written to the synapse connection weight memories 26 of all arithmetic units $10_1$ to $10_x$. In the next step 502, the read addresses SADR of the synapse connection weight memories 26 are cleared, the value (a neuron number to operate on an error signal) of the variable j is set to the smallest number n+1 (initial value) of all neurons to which error signal operations are assigned, and control goes to step 504.

In step 502, it is judged whether a signal to start partial sums on error signals δ is inputted from the master node 12, and if it is judged that it is inputted, control goes to step 506.

In step 506, the value of the accumulator 32 is cleared and the read address NADR of the neuron output value memory 24 is set to 0. In the next step 508, a synapse connection weight $W_{ji}$ stored in the current read address SADR of a synapse connection weight memory 26 is read, and in the next step 510, an error signal $δ_j$ stored in a current read address NADR is read from a neuron output value memory 24.

In step 512, the read synapse connection weight $W_{ji}$ and the error signal $δ_j$ are multiplied by the multiplier 28. The obtained multiplication result is added to a current value stored in a accumulator 32 by the adder 30 and the result is stored in the accumulator 32.

In the next step 514, it is judged whether product-sum operations have been performed M times, the number of synapses, stored in the synapse connection weight memory 26 and connected to the neuron to operate on the error signal. If it is judged that product-sum operations have not been performed M times, control goes to step 522, where the read address SADR of the synapse connection weight memory 26 is added by N, a value stored in the synapse count register 40, and the read address NADR of the neuron output value memory 24 is incremented, and then control returns to step 508 to repeat the above processing.

In step 514, if it is judged that product-sum operations have been performed M times, control goes to step 516, where the data stored in the accumulator 32 is outputted to the local bus interface, which goes to the master node 12 through the local bus 18.

In the next step 518, it is judged whether error signal operations on the N neurons terminate, that is, the variable j is equal to n+N. If it is judged that the variable j is equal to n+N, control goes to step 520. In step 520, the read address SADR of the synapse connection weight memory 26 and the variable j are incremented, and then control returns to 502 to repeat the above processing. On the other hand, if it is judged in step 518 that the variable j is equal to n+N, the routine terminates.

As described above, the arithmetic units $10_1$ to $10_x$ perform a partial sum operation on an error signal δ each time they receive a signal to start the partial sum operation on the error signal δ from the master node 12.

Figure 15:
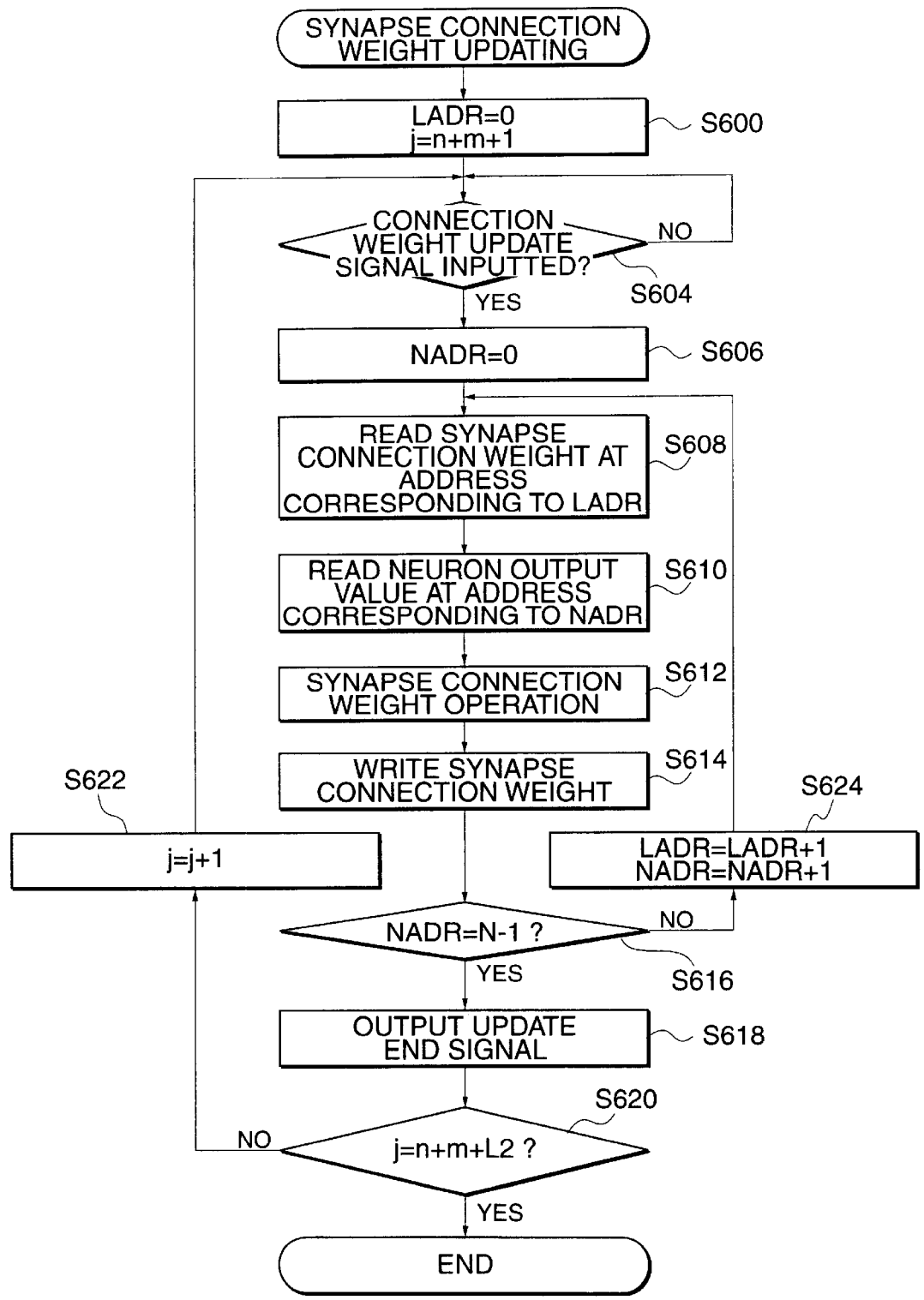
FIG. 15 is a routine for updating synapse connection weights by the neural network arithmetic apparatus of the second embodiment of the present invention.

Next, the updating of synapse connection weights is described with reference to the flowchart of FIG. 15. In the updating of synapse connection weights, in the neuron output value memory 24, neuron output values $Y_i$ to $Y_{i+N}$ of an operation layer of a preceding stage used for operations are stored. In the learning coefficient register 44, the product of a learning coefficient η predetermined by the master node 12 and the error signal $δ_j$ of neuron j whose weight is updated is set.

In the neuron output value memory 24 of the Hth arithmetic unit $10h$, the neuron output values $Y_{n+1}$ to $Y_{n+N3}$ of N neurons numbered from n+1 to n+N3 are continuously stored in addresses 0 to N−1. In the learning coefficient register 44, the respective products of a learning coefficient η and the error signals $δ_{n+m+1}$ to $δ_{n+m+L2}$ of neurons n+m+1 to n+m+L2 whose weight are updated are sequentially stored.

In step 600, update address LADR of the synapse connection weight memory, which is in the learning circuit 36, is cleared, the value (neuron number) of the variable j is set to the smallest value, and control goes to step 604.

In the next step 604, it is judged whether a connection weight update signal is sent from the master node 12. If it is judged that a connection weight update signal is sent from the master node 12, control goes to the next step 606, where the read address NADR of the neuron output value memory 24 is set to 0.

In the next step 608, a synapse connection weight $W_{ij}$ is read from an address corresponding to a update address LADR of the synapse connection weight memory, and in step 610, a neuron output value $Y_j$ is read from an address corresponding to the read address NADR of the neuron output value memory 24.

In step 612, the read neuron output value $Y_j$ is multiplied by a value (the product of the error signal δ of neuron j and a learning coefficient η) stored in the learning coefficient register 44, the multiplication result is added to the read synapse connection weight $W_{ji}$ to get new connection weight, and in the next step 614, the new connection weight is written to an address corresponding to the update address LADR of the synapse connection weight memory.

In the next step 616, it is judged whether connection weight updating has been performed by the number of assigned synapses (N times), that is it is judged whether the read address NADR of the neuron output value memory 24 is equal to N−1. If it is judged that the read address NADR is not equal to N−1, control goes to step 624, where the read address NADR of the neuron output value memory 24 and the update address LADR of the synapse connection weight memory of the learning circuit 36 are incremented, and then control goes to step 608 to repeat the above processing.

If it is judged that the read address NADR is equal to N−1, control goes to step 618 to output an update end signal, and then in step 620, it is judged whether the variable j is equal to n+m+L2. If it is judged whether the variable j is not equal to n+m+L2, control goes to step 622 to increment the variable j and returns to step 604 to repeat the above processing. If it is judged in step 620 that the variable j is equal to n+m+L2, the routine terminates.

In this way, each time the arithmetic unit $10_1$ to $10_x$ receive a synapse connection weight update signal from the master node 12, they update connection weights for N neurons sequentially from neuron j. If a neuron operation start signal is received before the connection weight updating operation terminates, the next neuron operation is started after the connection weight updating terminates.

Also, for example, each of the synapse connection weight memory 26 and the neuron output memory 24 used for neuron operations and connection weight updating may have a separate bank to prevent competition for memory access so that a partial sum operation on a neuron operation value, error signal operations, connection weight updating can be performed in parallel.

Figure 16:
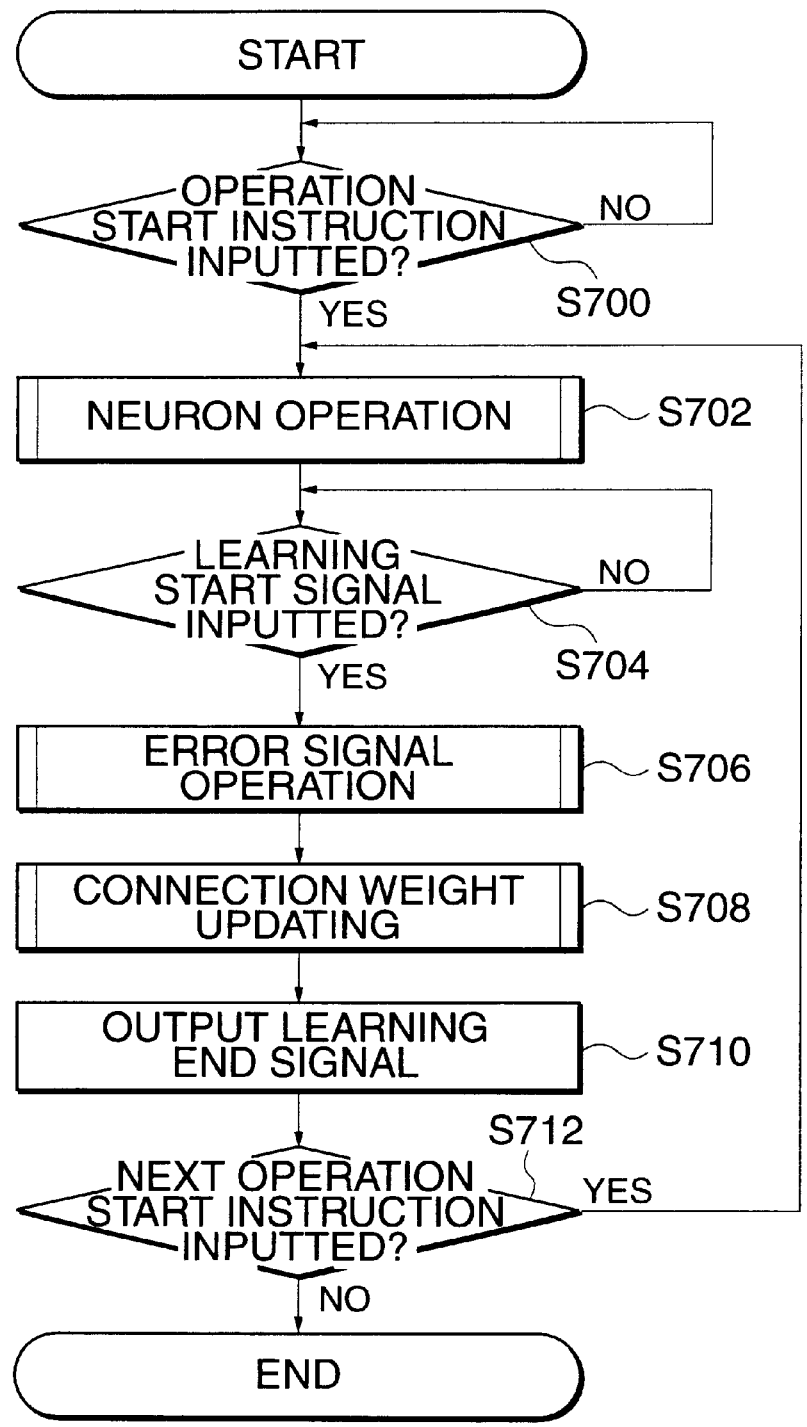
FIG. 16 is a control routine of the master node of the second embodiment of the present invention.

Referring to the flowchart of FIG. 16, a description is made of a control routine of the master node 12 to control the arithmetic units $10_1$ to $10_6$ to which neuron operations are assigned as in the above-described first embodiment. In step 700, it is judged whether a neuron operation start instruction is outputted from the host computer 16. If it is judged that a neuron operation start instruction is outputted, the control program of the master node 12 is read from the program memory 14 and control goes to the next step 702. In step 702, neuron operations are performed.

The neuron operations are described with reference to the flowchart of FIG. 17. The flowchart for the neuron operations of the second embodiment is not described here because it is almost the same as the flowchart of FIG. 10; the same reference numerals are used and only different steps are described.

Figure 17:
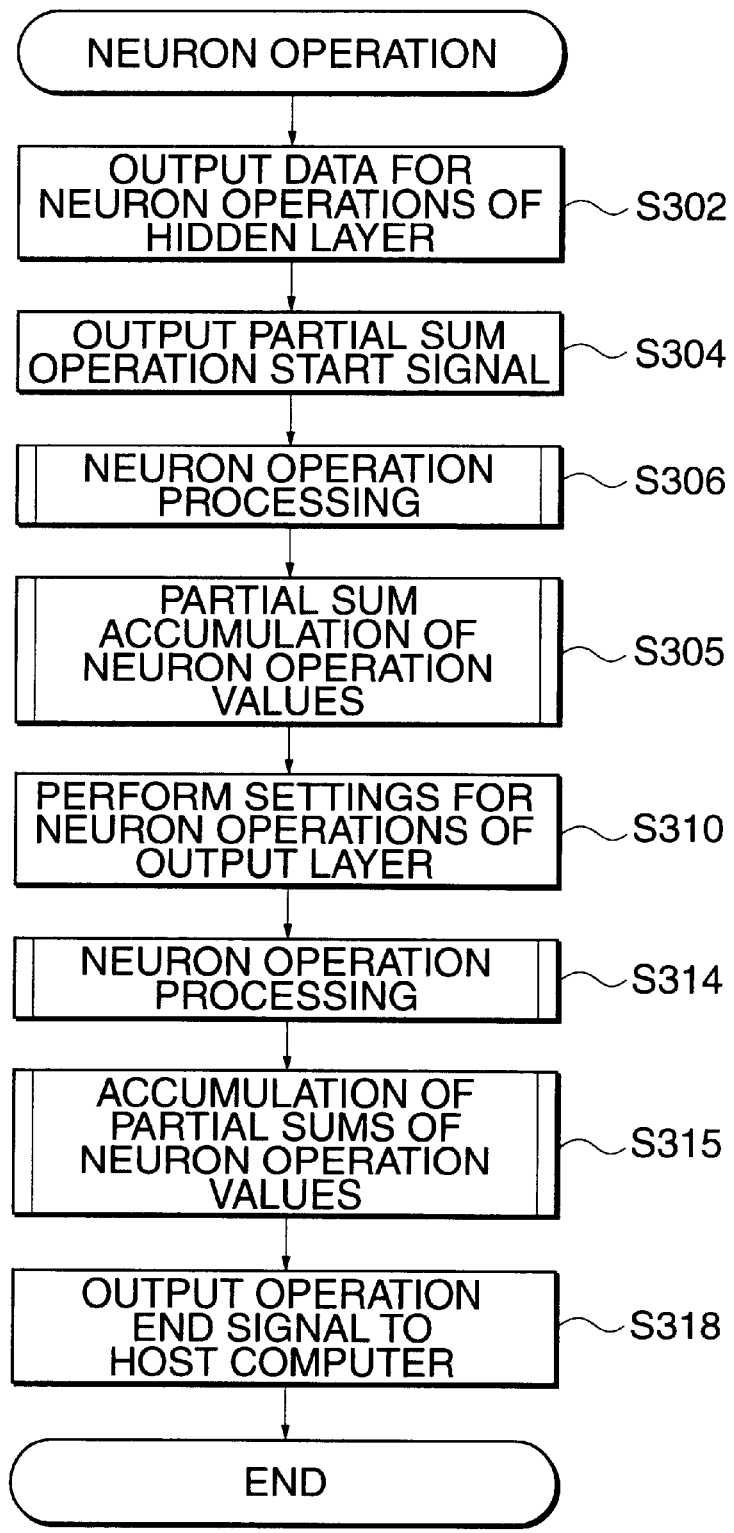
FIG. 17 is a flowchart of neuron operations of the second embodiment of the present invention.

That is, in step 305 of FIG. 17, accumulation processing for partial sums $y\alpha_j$ of neuron operation values of neurons of the hidden layer, and in step 315, accumulation processing for partial sums $y\alpha_j$ of neuron operation values of neurons of the output layer, are performed.

Figure 18:
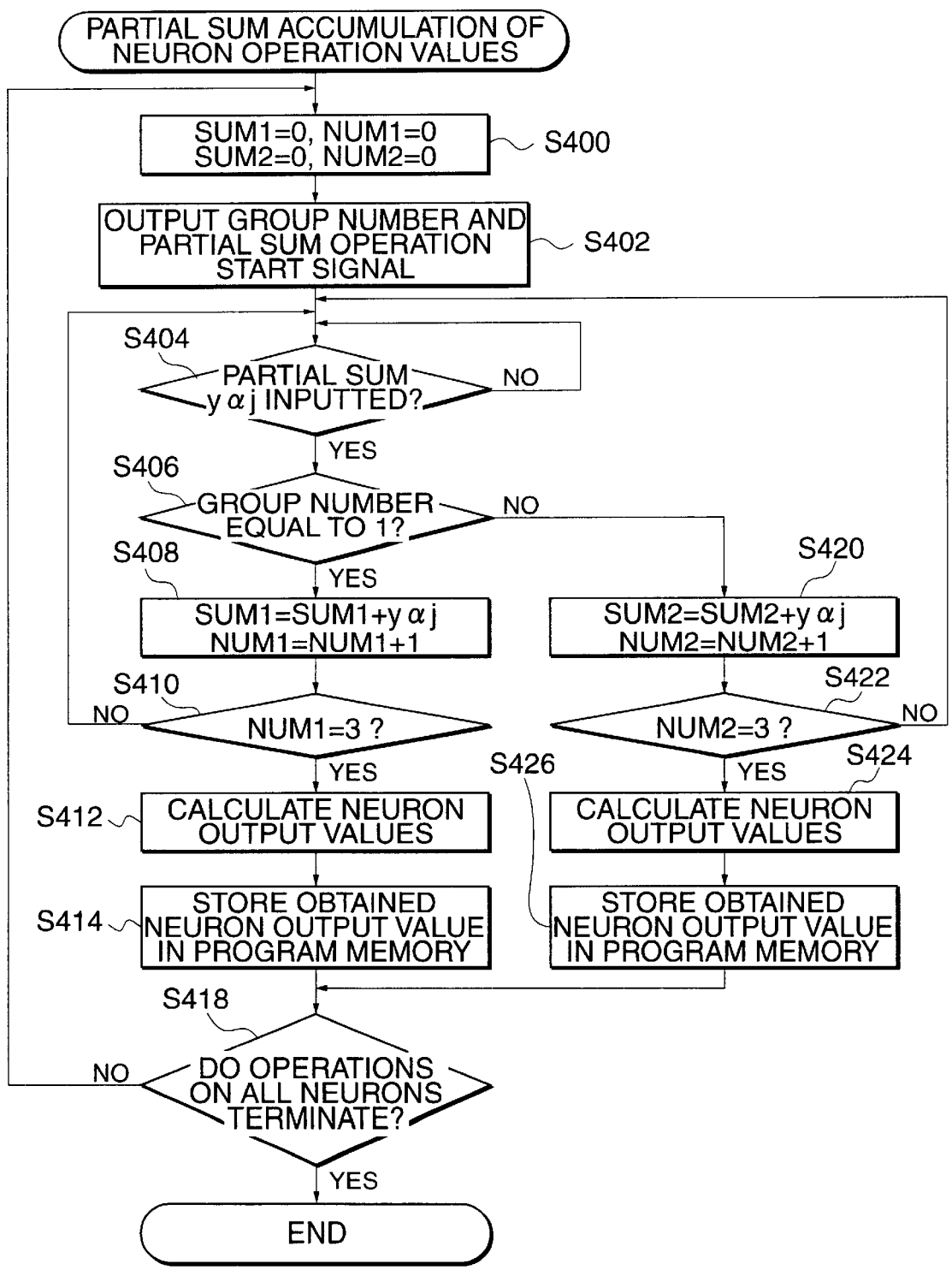
FIG. 18 is a flowchart of partial sum accumulation processing for neuron operation values of neurons of a hidden layer of step 307 of FIG. 17.

Referring to the flowchart of FIG. 18, a description is made of the accumulation processing for partial sums $y\alpha_j$ of neuron operation values of neurons of the hidden layer. Since the flowchart of the accumulation processing for partial sums $y\alpha_j$ of neuron operation values of neurons of the hidden layer of the second embodiment is almost the same as the flowchart of FIG. 11, the same reference numerals are used in the flowchart and the flowchart is not described except different steps.

That is, in FIG. 18, in step 414, after an obtained neuron output value is stored in the program memory 24, control goes to step 418, where it is judged whether operations on all neurons assigned to the first and second groups G1 and G2 terminate. Likewise, in step 426, after an obtained neuron output value is stored in an area allocated in the program memory 14, control goes to step 418, where it is judged whether operations on all neurons assigned to the first and second groups G1 and G2 terminate.

Figure 19:
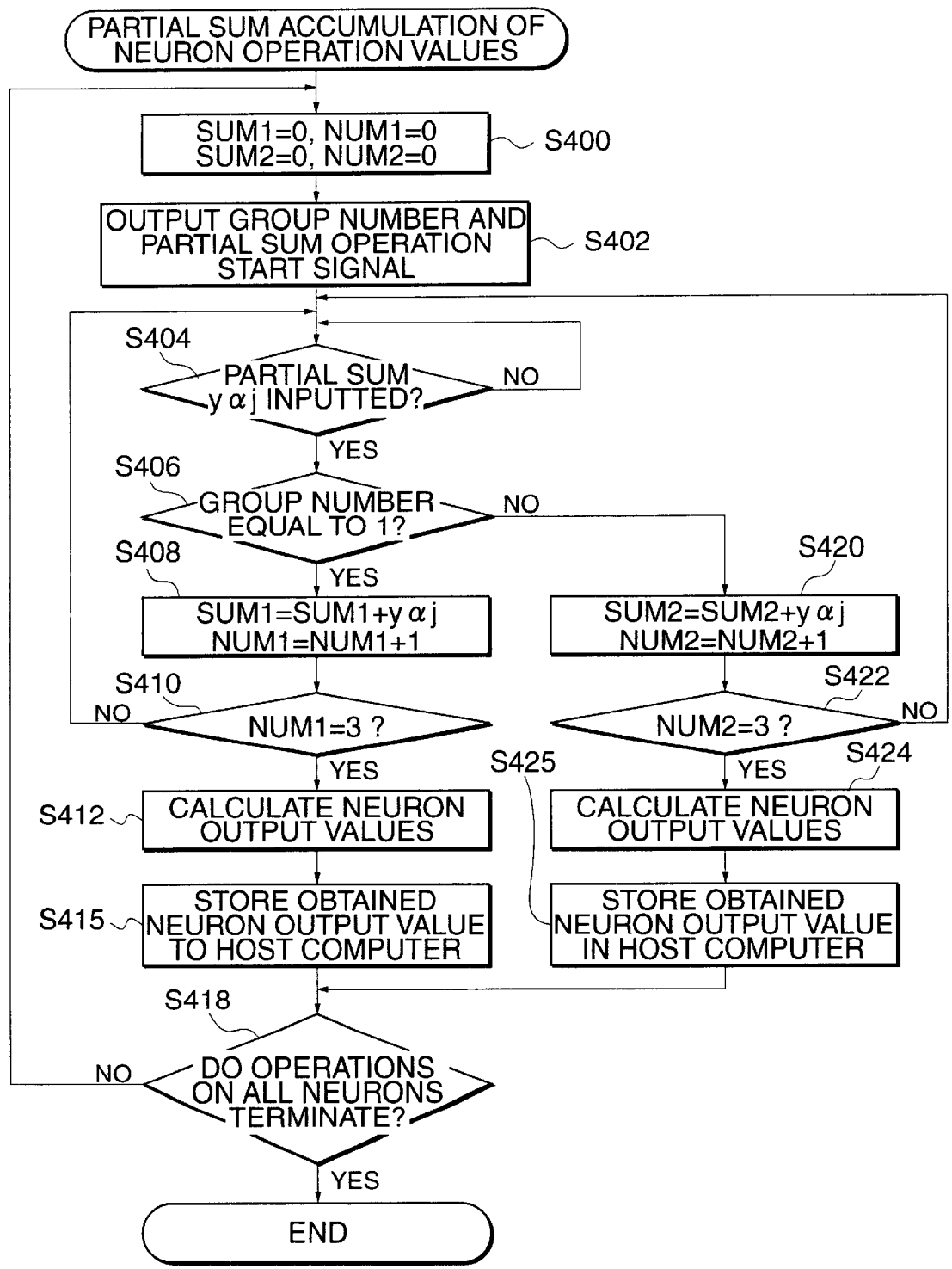
FIG. 19 is a flowchart of partial sum accumulation processing for neuron operation values of neurons of an input layer of step 315 of FIG. 17.

Referring to the flowchart of FIG. 19, a description is made of the accumulation processing for partial sums $y\alpha_j$ of neuron operation values of neurons of the output layer in step 315 of FIG. 17. Since the flowchart of FIG. 19 above is almost the same as the flowchart of FIG. 18, the same reference numerals are used in the flowchart and the flowchart is not described except different steps.

That is, in FIG. 19, in step 415, after an obtained neuron output value is outputted to the host computer 16, control goes to step 418, where it is judged whether operations on all neurons assigned to the first and second groups G1 and G2 terminate. Likewise, in step 425, after an obtained neuron output value is outputted to the host computer 16, control goes to step 418, where it is judged whether operations on all neurons assigned to the first and second groups G1 and G2 terminate.

Upon termination of neuron operations in step 702 of FIG. 16, learning by back propagation is performed. The learning by back propagation is performed by two processing: error signal operation processing and connection weight updating. In step 704, it is judged whether a learning start signal is inputted from the host computer 16, and if it is judged that a learning start signal is inputted, control goes to the next step 706.

In step 706, operations on error signals δ are performed. Operations on error signals δ are described with reference to the flowchart of FIG. 20. The operations on error signals δ are different from neuron operation processing in the grouping of the arithmetic units. The first and fourth arithmetic units $10_1$ and $10_4$ are classified as a first group G1; the second and fifth arithmetic units $10_2$ and $10_5$ as a second group G2; and the third and sixth arithmetic units $10_3$ and $10_6$ as a third group G3.

Figure 20:
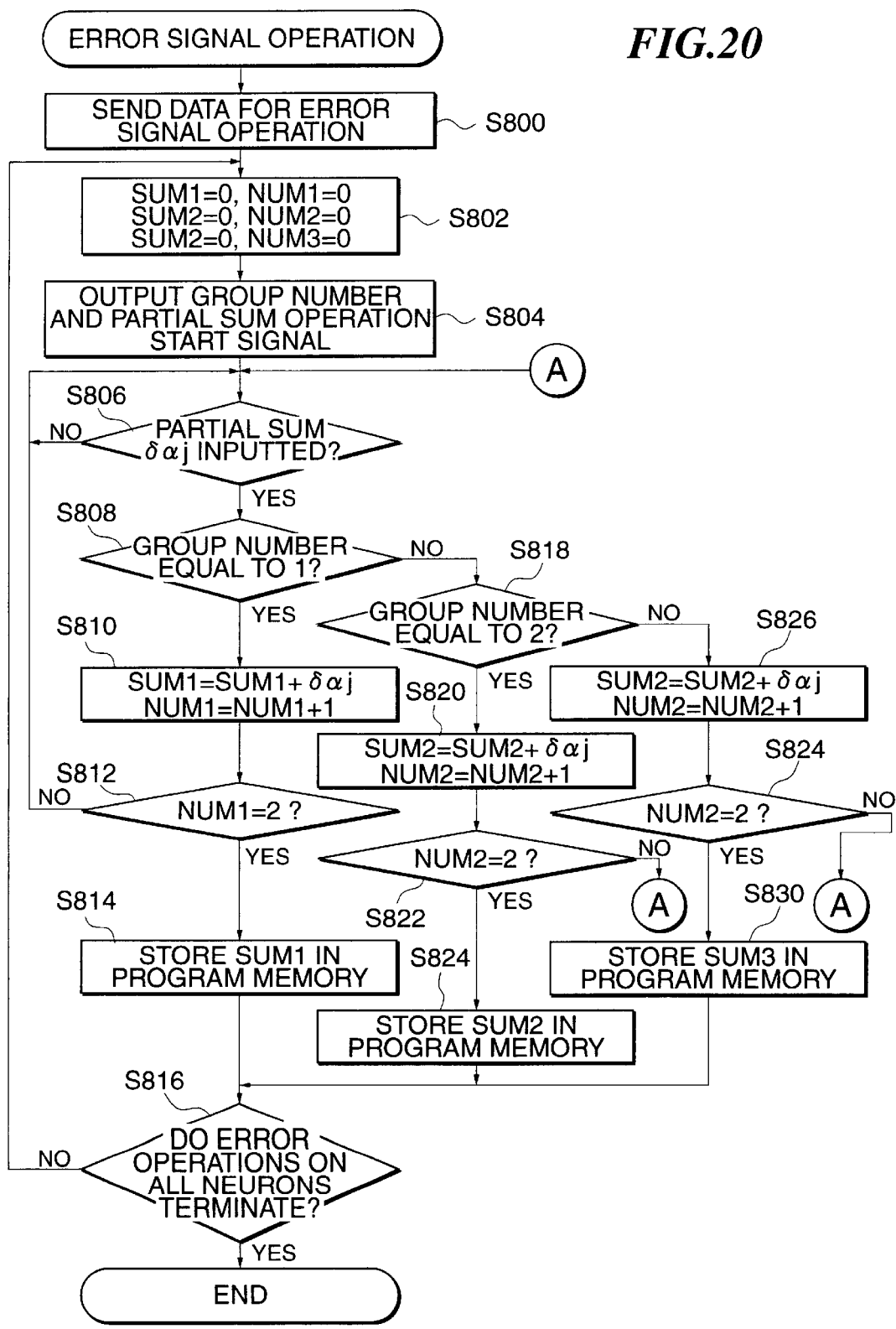
FIG. 20 is a flowchart of operations on error signal of step 706 of FIG. 16.

In step 800 of FIG. 20, various types of data necessary for operations on error signals $\delta_{n+1}$ to $\delta_{n+m}$ of the hidden layer are outputted along with a write indication.

That is, the master node 12 reads teacher signals $d_{n+m+1}$ to $d_{n+m+p}$ written to the program memory 14 by the host computer 16, and outputs the differences between the neuron output values $Y_{n+m+1}$ to $Y_{n+m+p}$ obtained by the above-described neuron operations of the output layer and the teacher signals $d_{n+m+1}$ to $d_{n+m+p}$ (that is, $d_{n+m+1}-Y_{n+m+1}$ to $d_{n+m+p}-Y_{n+m+p}$), as error signals $\delta_{n+m+1}$ to $\delta_{n+m+p}$ of the output layer, to the neuron output value memories 24 of the arithmetic units $10_1$ to $10_6$.

This is achieved by the master node 12 setting the minimum neuron number registers 50 of the arithmetic units $10_1$ and $10_4$ belonging to the first group G1 to n+m and n+m+L2+1, respectively, the maximum neuron number registers 52 to n+m+L2 and n+m+p, respectively, while for the arithmetic units $10_2$ and $10_5$ belonging to the second group G2 and the arithmetic units $10_3$ and $10_6$ belonging to the third group G3, the minimum neuron number registers 50 to n+m and n+m+L2+1, respectively, and the maximum neuron number registers 52 to n+m+L2 and n+m+p, respectively, and then outputting $\delta_{n+m+1}=d_{n+m+1}-Y_{n+m+1}$ through $\delta_{n+m+p}=d_{n+m+p}-Y_{n+m+p}$ to the local bus 18.

Since the arithmetic units $10_1$ to $10_6$ each to receive error signals δ of neuron numbers between a value set in the minimum neuron number register 50 and a value set in the maximum neuron number register 52, error signals $\delta_{n+m+1}$ to $\delta_{n+m+L2}$ are written to the neuron output value memories 24 of the first to third arithmetic units $10_1$ to $10_3$, and error signals $\delta_{n+m+L1+1}$ to $\delta_{n+m+p}$ are written to the neuron output value memories 24 of the fourth to sixth arithmetic units $10_4$ to $10_6$.

The master node 12 sets the operation start neuron register 42 and operation synapse count register 40 of the two arithmetic units $10_1$ and $10_4$ of the first group G1 to 0 and N3, respectively. The learning synapse count register 33 of the first arithmetic units $10_1$ is set to L2, the address counter of the control circuit 22 is set to the start address of connection weights of neuron n+m+1, the learning synapse count register 33 of the fourth arithmetic unit $10_4$ is set to p–L2, and the address counter of the control circuit 22 is set to the start address of connection weights of neuron n+m+L2+1.

Also, for the two arithmetic units $10_2$ and $10_5$ of the second group G2, similarly, the operation start neuron register 42 is set to 0 and the operation synapse count register 40 is set to N4–N3. The learning synapse count register 33 of the second arithmetic units $10_2$ is set to L2, the address counter of the control circuit 22 is set to the start address of connection weights of neuron n+m+1, the learning synapse count register 33 of the fifth arithmetic unit $10_5$ is set to p−L2, and the address counter of the control circuit 22 is set to the start address of connection weights of neuron n+m+L2+1.

Furthermore, for the two arithmetic units $10_3$ and $10_6$ of the third group G3, the operation start neuron register 42 is set to 0 and the operation synapse count register 40 is set to m−N4. The learning synapse count register 33 of the second arithmetic units $10_2$ is set to L2, the address counter of the control circuit 22 is set to the start address of connection weights of neuron n+m+1, the learning synapse count register 33 of the fifth arithmetic unit $10_5$ is set to p−L2, and the address counter of the control circuit 22 is set to the start address of connection weights of neuron n+m+L2+1.

Upon termination of all settings, control goes to step 802, where a variable SUM1 to accumulate partial sums $\delta\alpha_j$ of error signals δ from the arithmetic units $10_1$ to $10_4$ of the first group G1 and a variable NUM1 to denote the number of partial sums $\delta\alpha_j$ of error signals δ are initialized to 0. For the second and third groups G2 and G3, similarly, a variable SUM2 to accumulate partial sums $\delta\alpha_j$ of error signals δ from the arithmetic units $10_2$ to $10_5$ of the second group G2 and a variable NUM2 to denote the number of partial sums $\delta\alpha_j$ of error signals δ are initialized to 0, while a variable SUM3 to accumulate partial sums $\delta\alpha_j$ of error signals δ from the arithmetic units $10_3$ to $10_6$ of the third group G3 and a variable NUM3 to denote the number of partial sums $\delta\alpha_j$ of error signals δ are initialized to 0.

In step 804, a group number and a signal to start partial sum operations are outputted to the local bus 18 to direct the arithmetic units $10_1$ and $10_4$ of the first group G1, the arithmetic units $10_2$ to $10_5$ of the second group G2, and the arithmetic units $10_3$ and $10_6$ of the third group G3 to start operations on error signals. On starting the operations, the arithmetic units each calculate a partial sum $\delta\alpha_j$ of error signals δ of assigned neurons as described in the above-described partial sum operations on error signals δ, and send the obtained partial sum $\delta\alpha_j$ of error signals δ to the master node 12 along with a group number (1, 2, or 3 in the case of this example) to which they belong.

In the next step 806, it is judged whether the partial sum $\delta\alpha_j$ of error signals δ is inputted to the master node 12. If it is judged that it is inputted, control goes to the next step 808, where it is judged whether the group number inputted along with the partial sum $\delta\alpha_j$ of error signals δ is 1.

If it is judged that the group number is 1, since the inputted partial sum is the partial sum $\delta\alpha_j$ of error signals δ of the first group G1, control goes to step 810, where the partial sum $\delta\alpha_j$ of error signals δ is accumulated in SUM1 (SUM1=SUM1+$\delta\alpha_j$) and the variable NUM1 is incremented (NUM1=NUM1+1), and control goes to the next step 812.

In the next step 812, if it is judged whether the number of the inputted partial sums $\delta\alpha_j$ of error signals δ is 2, that is, NUM1 is equal to 2, and if NUM1 is not equal to 2, control returns to step 806 to repeat the above processing. If NUM1 is equal to 2, control goes to step 814, where SUM1 is stored in an area allocated in the program memory 14, and then control goes to step 816.

On the other hand, if it is judged in step 808 that the group number inputted along with the partial sum $\delta\alpha_j$ of error signals δ is not 1, control goes to step 818, where it is judged whether the group number is 2. If it is judged that the group number is 2, since the inputted partial sum $\delta\alpha_j$ of error signals δ is the partial sum $\delta\alpha_j$ of error signals δ of the second group G2, control goes to step 820, where the partial sum $\delta\alpha_j$ of error signals δ is accumulated in SUM2 (SUM2=SUM2+$\delta\alpha_j$) and the variable NUM2 is incremented (NUM2=NUM2+1), and control goes to the next step 822.

In the next step 822, if it is judged whether the number of the inputted partial sums $\delta\alpha_j$ of error signals δ is 2, that is, NUM2 is equal to 2, and if NUM2 is not equal to 2, control returns to step 806 to repeat the above processing. If NUM2 is equal to 2, control goes to step 824, where SUM2 is stored in an area allocated in the program memory 14, and then control goes to step 816.

On the other hand, if it is judged in step 818 that the group number inputted along with the partial sum $\delta\alpha_j$ of error signals δ is not 2, since the inputted partial sum $\delta\alpha_j$ of error signals δ is the partial sum $\delta\alpha_j$ of error signals δ of the third group G3, control goes to step 826, where the partial sum $\delta\alpha_j$ of error signals δ is accumulated in SUM3 (SUM3=SUM3+$\delta\alpha_j$) and the variable NUM3 is incremented (NUM3=NUM3+1), and control goes to the next step 822.

In the next step 828, if it is judged whether the number of the inputted partial sums $\delta\alpha_j$ of error signals δ is 2, that is, NUM3 is equal to 2, and if NUM3 is not equal to 2, control returns to step 806 to repeat the above processing. If NUM3 is equal to 2, control goes to step 830, where SUM3 is stored in an area allocated in the program memory 14, and then control goes to step 816.

In step 816, it is judged whether operations on error signals δ of all neurons of the hidden layer terminate. If it is judged that the operations do not terminate, control returns to step 802, where the values of SUMs and NUMs of groups that received partial sums are cleared to calculate the next error signal, and the above processing is repeated. If it is judged that the operations terminate, the routine terminates.

Upon termination of error signal operations, control goes to step 708 of FIG. 16 to continue to update synapse connection weights. The updating of synapse connection weights is described referring to the flowchart of FIG. 21. Group setting is made in the same way as during partial sum operations on neuron operation values; that is, the first to third arithmetic units $10_1$ to $10_3$ are classified as a first group G1, and the fourth to sixth arithmetic units $10_4$ to $10_6$ are classified as a second group G2, thereby splitting plural neurons making up one operation layer into two groups.

The master node 12 performs the following settings for each of arithmetic units with the group number register 54 set to 1, that is, the arithmetic units $10_1$, $10_2$, and $10_3$ belonging to the first group G1. That is, the minimum neuron number register 50 of the first arithmetic unit $10_1$ is set to 1, the minimum neuron number register 50 of the second arithmetic unit $10_2$ is set to N1+1, and the minimum neuron number register 50 of the third arithmetic unit $10_3$ is set to N2+1, while the maximum neuron number register 52 of the first arithmetic unit $10_1$ is set to N1, the maximum neuron number register 52 of the second arithmetic unit $10_2$ is set to N2, and the maximum neuron number register 52 of the third arithmetic unit $10_3$ is set to n.

Similarly, the master node 12 performs the following settings for each of arithmetic units with the group number register 54 set to 2, that is, the arithmetic units $10_4$, $10_5$, and $10_6$ belonging to the first group G2. That is, the minimum neuron number register 50 of the fourth arithmetic unit $10_4$ is set to 1, the minimum neuron number register 50 of the fifth arithmetic unit $10_5$ is set to N1+1, and the minimum neuron number register 50 of the sixth arithmetic unit $10_6$ is set to N2+1, while the maximum neuron number register 52 of the fourth arithmetic unit $10_4$ is set to N1, the maximum neuron number register 52 of the fifth arithmetic unit $10_5$ is set to N2, and the maximum neuron number register 52 of the sixth arithmetic unit 10₆ is set to n.

Figure 21A:
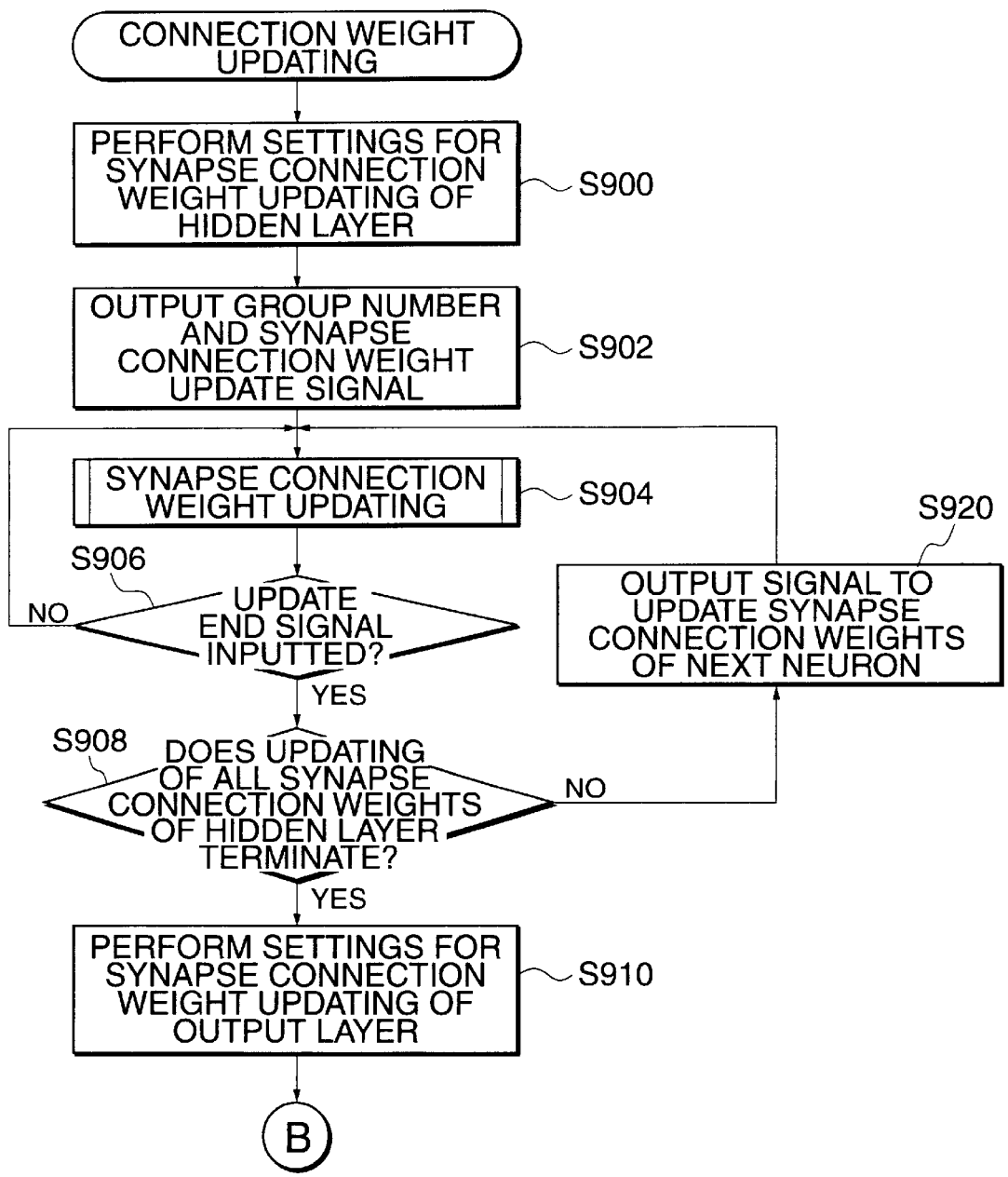
FIG. 21 is a flowchart of synapse connection weight updating of step 708 of FIG. 16.
Figure 21B:
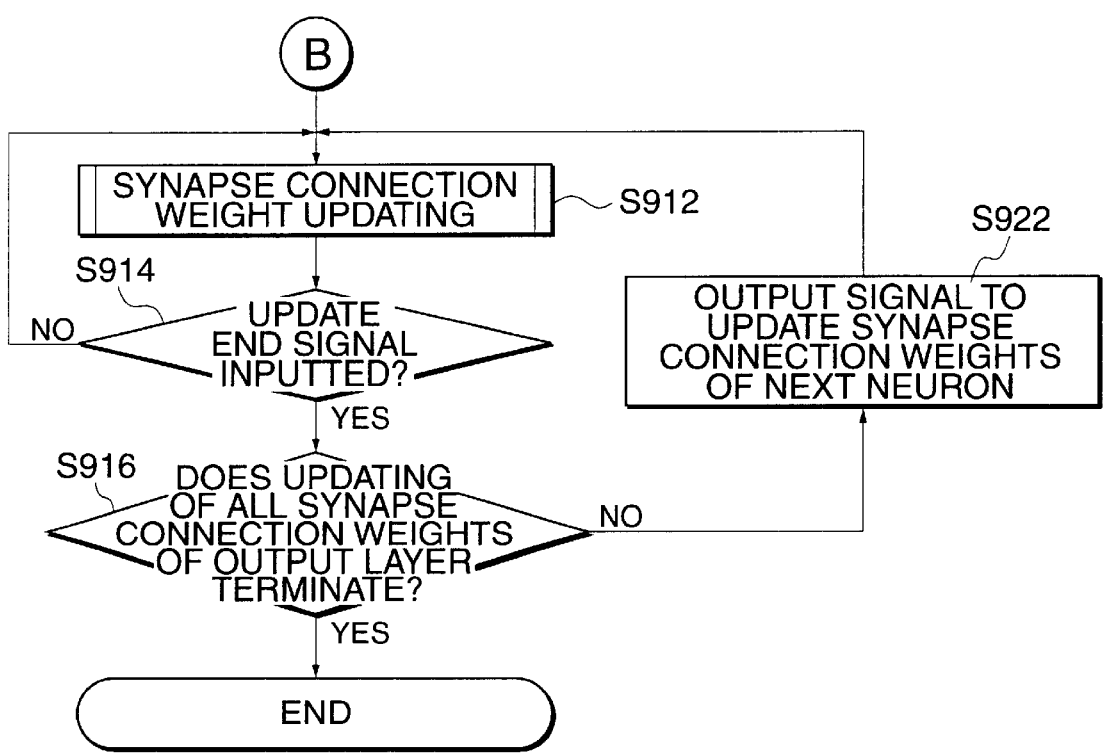

In step 900 of FIG. 21, various types of data required to update synapse connection weights of the hidden layer are outputted along with a write indication. The various types of data required to update synapse connection weights of the hidden layer are not described because they are the same as those required to perform neuron operations of the hidden layer described in step 302 of FIG. 10. The address counter of the control circuit 22 of the arithmetic units 10₁, 10₂, and 10₃ belonging to the first group G1 is set to the start address of connection weights of neuron n+1, and the address counter of the control circuit 22 of the arithmetic units 10₄, 10₅, and 10₆ belonging to the second group G2 is set to the start address of connection weights of neuron n+L1+1.

To update the synapse connection weights of neuron n+1, the product of the error signal $\delta_{n+1}$ of neuron n+1 stored in the program memory 14 and a predetermined learning coefficient $\eta$ is set in the learning coefficient register 44 of the arithmetic units 10₁ to 10₃ of the first group G1. Also, to update the synapse connection weights of neuron n+L1+1, the product of the error signal $\delta_{n+L1+1}$ of neuron n+L1+1 stored in the program memory 14 and a predetermined learning coefficient $\eta$ is set in the learning coefficient register 44 of the arithmetic units 10₄ to 10₆ of the second group G2. These operations are performed through the local bus 18.

Upon termination of all settings, control goes to the next step 902, where a neuron number j, a group number, and a signal to update connection weights are outputted to the local bus 18 to start the updating of connection weights of neurons (neuron numbers n+1 to n+m) of the hidden layer.

In the next step 904, the updating of synapse connection weights is performed. The updating of synapse connection weights is performed as shown in FIG. 15. Upon receipt of the synapse connection weight signal, the arithmetic units 10₁ to 10ₓ each start connection weight updating processing in ascending order of the neuron numbers of neurons assigned to them. Thereby, connection weight updating processing for neurons of the hidden layer is performed in parallel.

For example, each of the arithmetic units 10₁, 10₂, and 10₃ belonging to the first group G1 performs connection weight updating processing in parallel for assigned synapses of neuron n+1, and each of the arithmetic units 10₄, 10₅, and 10₆ belonging to the second group G2 performs connection weight updating processing in parallel for assigned synapses of neuron n+L1+1.

On starting connection weight updating, the arithmetic units 10₁ to 10₆ each successively perform connection weight updating processing for assigned neuron j, as described in the above-described connection updating processing routine. That is, the updating is performed in a way that, for synapse connection weight $W_{ji}$ of a specified neuron, multiplies a neuron output value $Y_j$ by a value (that is, the product of error signal $\delta$ of neuron j and learning coefficient $\eta$) stored in the learning coefficient register 44 and overwrites a value resulting from adding the obtained value as a new connection weight in the address SADR of the synapse connection weight memory 26.

In the next step 906, it is judged whether an update end signal is inputted, and if it is judged that it is not inputted, control returns to step 904 to continue synapse connection weight updating. If it is judged that an update end signal is inputted, it is judged in the next step 908 whether synapse connection weight updating for all neurons of the hidden layer terminates.

If it is judged that synapse connection weight updating for all neurons of the hidden layer does not terminate, the product $\eta$ of error signal $\delta_{j+1}$ of the next neuron and learning coefficient is stored in the learning coefficient register 44, and control goes to step 920, where the variable j is incremented, and the neuron number j of the next neuron, group number G, and a connection weight update signal are outputted to the local bus 18, and control returns to step 904 to repeat the above processing.

If it is judged that synapse connection weight updating for all neurons of the hidden layer terminates, control goes to step 910, where various types of data required to update synapse connection weights of the output layer are sent along with a write indication. A description of various types of data required to update synapse connection weights of the output layer is omitted because they are the same as those required to perform neuron operations of the output layer described in step 310 of FIG. 10.

The address counter of the control circuit 22 of the arithmetic units 10₁, 10₂, and 10₃ belonging to the first group G1 is set to the start address of connection weights of neuron n+m+1, and the address counter of the control circuit 22 of the arithmetic units 10₄, 10₅, and 10₆ belonging to the second group G2 is set to the start address of connection weights of neuron n+m+L2+1.

To update the synapse connection weights of neuron n+m+1, the product of the error signal $\delta_{n+m+1}$ of neuron n+m+1 stored in the program memory 14 and a predetermined learning coefficient $\eta$ is set in the learning coefficient register 44 of the arithmetic units 10₁ to 10₃ of the first group G1. Also, to update the synapse connection weights of neuron n+m+L2+1, the product of the error signal $\delta_{n+m+L2+1}$ of neuron n+L1+1 stored in the program memory 14 and a predetermined learning coefficient $\eta$ is set in the learning coefficient register 44 of the arithmetic units 10₄ to 10₆ of the second group G2. These operations are performed through the local bus 18.

Upon termination of all settings, control goes to the next step 912, where a group number and a signal to update connection weights are outputted to the local bus 18 to start the updating of connection weights of neurons (neuron numbers n+m+1 to n+m+p) of the output layer. A description of the synapse connection weight updating processing is omitted because it is the same as the above-described synapse connection weight updating processing of the hidden layer.

In the next step 914, it is judged whether an update end signal is inputted, and if it is judged that it is not inputted, control returns to step 912 to continue synapse connection weight updating. If it is judged that an update end signal is inputted, it is judged in the next step 916 whether synapse connection weight updating for all neurons of the output layer terminates.

If it is judged that synapse connection weight updating for all neurons of the output layer does not terminate, the product $\eta$ of error signal $\delta_{j+1}$ of the next neuron and learning coefficient is stored in the learning coefficient register 44, and control goes to step 922, where the variable j is incremented, and the neuron number j of the next neuron, group number G, and a connection weight update signal are outputted to the local bus 18, and control returns to step 912 to repeat the above processing. If it is judged that synapse connection weight updating for all neurons of the output layer terminates, the routine terminates.

Upon termination of the synapse connection weight updating, control goes to step 710 of FIG. 16, where an end signal is outputted to the host computer 16. This terminates neuron operations and back propagation learning for one input.

In the next step 712, it is judged whether new input is made from the host computer 16, and if new input is made, control returns to step 702 to perform neuron operations and back propagation learning for the new input and the above processing is repeated. If no new input is made, the routine closes to terminate neuron operations and back propagation learning.

The above operations can be rapidly performed because neuron operations and operations on error signals of the hidden layer in the arithmetic units $10_1$ to $10_x$ are performed using only values stored in memories within the arithmetic units $10_1$ to $10_x$. The amount of data sent to the local bus 18 from the arithmetic units $10_1$ to $10_x$ is such that one neuron operation can be achieved with one transfer, or one error operation can be achieved with partial sum transfers equal to the number of arithmetic units to which the error operation is assigned. Therefore, this helps to minimize the possibility that operation performance may be reduced because of the probable rate-limited band of the local bus 18.

In the first and second embodiments, for purposes of description, although a neural network of perceptron of three layers including one hidden layer is used, it goes without saying that the present invention is also applicable to a neural network of perceptron of four or more layers including two or more hidden layers.

(Third Embodiment)

A neural network arithmetic apparatus of a third embodiment is an application of the first embodiment and employs a network of cyclic coupling type as a neural network. The Hebb Rule is used as a learning rule.

Figure 22:
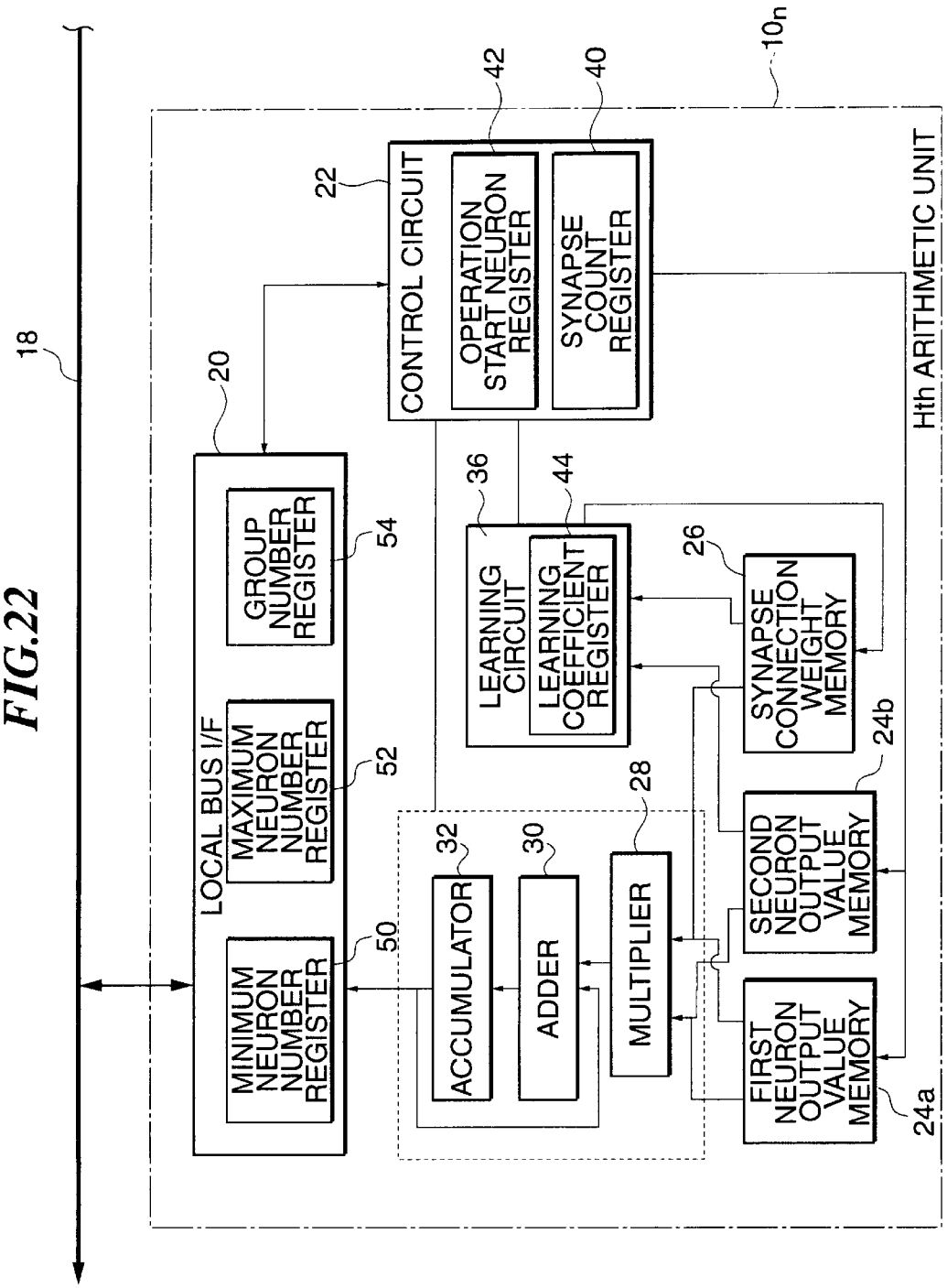
FIG. 22 is a block diagram showing an outline of the configuration of an arithmetic unit making up the neural network arithmetic apparatus of a third embodiment.

The neural network arithmetic apparatus of the third embodiment, as shown in FIG. 22, is different from that of the first embodiment in that two neuron memories (that is, a first neuron output memory 24a and a second neuron output memory 24b) are provided. The others are the same as those of the neural network arithmetic apparatus of the first embodiment.

In a network of cyclic coupling type, even if the same input is presented to the network, the output of neurons in the network changes with time. To compute such a network, the state of the network at time t+1 must be computed using neuron output of time t. Accordingly, a neural network arithmetic apparatus of the third embodiment has the arithmetic units 10 each provided with two memories (that is, the first neuron output memory 24a and the second neuron output memory 24b), one for storing a neuron output value of time t and the other for storing a neuron output value of time t+1.

That is, when computing a partial sum at a certain time, each arithmetic unit reads a neuron output value at time t from one of the first neuron output memory 24a and the second neuron output memory 24b to compute a partial sum. At the next time, it reads a neuron output value of time t+1 from the other of the first neuron output memory 24a and the second neuron output memory 24b to compute a partial sum. A description of others is omitted because they are the same as those in the neural network arithmetic apparatus of the first embodiment.

Figure 23:
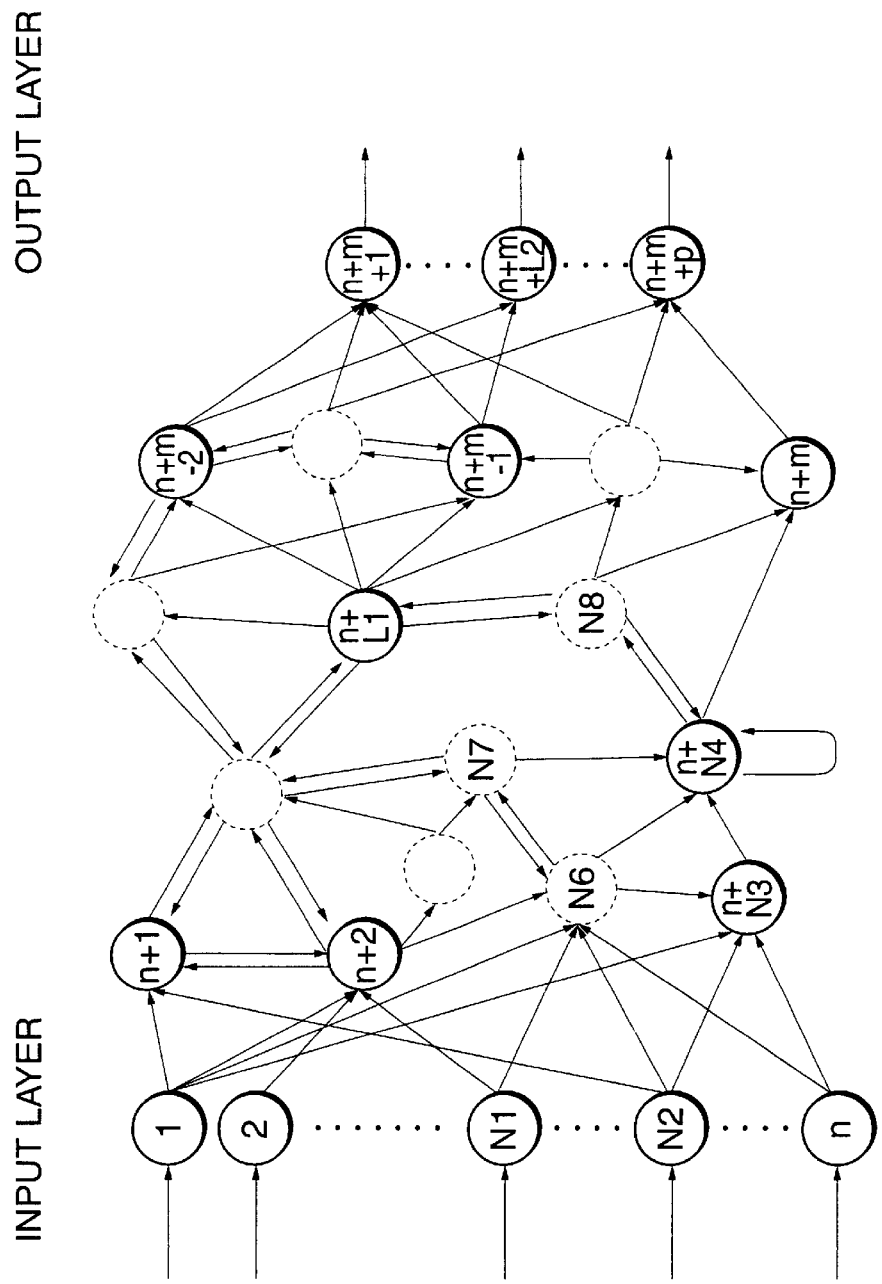
FIG. 23 is a conceptual diagram of a neural network to which the neural network arithmetic apparatus of the third embodiment of the present invention is applied.

FIG. 23 shows the structure of a neural network of cyclic coupling type used in the neural network arithmetic apparatus of the third embodiment. For purposes of description, numbers from 1 to n+m+p are assigned to neurons in the neural network. Neurons 1 to n in the network are neurons of an input layer, neurons n+m+1 to n+m+p are neurons of an output layer, and the remaining neurons n+1 to n+m are permitted for free interconnection.

A description is made of a method of assigning the neurons to the arithmetic units $10_1$ to $10_6$ in the network. If the neuron output values of all neurons 1 to n+m+p shown in FIG. 23 are represented as $Y_1$ to $Y_{n+m+p}$ respectively and a synapse connection weight from neuron i to neuron j is represented as $W_{ji}$, operations of a neural network of cyclic coupling type can be represented as a matrix with n+m+p rows and n+m+p columns, and synapse connection weights $W_{ji}$ can be divided into four areas I, II, III, and IV as shown in FIG. 24.

The area indicated by I represents connections (that is, $1 \leq i \leq n$, $n+1 \leq j \leq n+m$) from the input layer to the hidden layer, the area indicated by II represents connections (that is, $n+1 \leq i \leq n+m$, $n+m+1 \leq j \leq n+m+p$) from the hidden layer to the output layer, and the area indicated by IV represents interconnections (that is, $n+1 \leq i \leq n+m$, $n+1 \leq j \leq n+m$) between neurons of the hidden layer. Although the area indicated by III represents connections ($1 \leq i \leq n$, $n+m+1 \leq j \leq n+m+p$) from the input layer to the output layer, in this example, the area has no connection ($W_{ji}=0$) and need not be computed. Other areas have no connections ($W_{ji}=0$) and need not be computed.

A computation method in the neural network of the third embodiment splits all connections to be computed, represented in the areas I, II, and IV, into at least plural segments horizontally, and assigns them to all or part of the x arithmetic units so that they are processed in distributed form.

As an example, all the connections to be computed, represented in the areas I, II, and IV, as shown in FIG. 25, are split into six segments A-1 to A-6 horizontally, and the six split segments are assigned equally to six arithmetic units $10_1$ to $10_6$ so that they are processed in distributed form.

The six arithmetic units $10_1$ to $10_6$ are grouped in the same way as during partial sum operations on neuron operation values of the above-described first embodiment. Specifically, the first to third arithmetic units $10_1$ to $10_3$ are classified as a first group G1 with the group number register 54 set to 1, and the fourth to sixth arithmetic units $10_4$ to $10_6$ are classified as a second group G2 with the group number register 54 set to 2, thereby splitting plural neurons making up one operation layer into two groups and assigning them to the first group G1 and the second group G2. A description of the neuron assignment is omitted because it is the same as that during partial sum operations on neuron operation values of the above-described first embodiment.

In the synapse connection weight memory 26 of the first arithmetic unit $10_1$ of the first group G1, connection weights $W_{ji}(1 \leq i \leq T, n+1 \leq j \leq n+L1)$ of area A-1 are stored; in the synapse connection weight memory 26 of the second arithmetic unit $10_2$, connection weights $W_{ji}(T+1 \leq i \leq 2T, n+1 \leq j \leq n+L1)$ of area A-2 are stored; and in the synapse connection weight memory 26 of the third arithmetic unit $10_3$, connection weights $W_{ji}(2T+1 \leq i \leq n+m, n+1 \leq j \leq n+L1)$ of area A-3 are stored. (T is a positive integer for dividing n+m equally to three pieces.)

In the synapse connection weight memory 26 of the fourth arithmetic unit $10_4$ of the second group G2, connection weights $W_{ji}(1 \leq i \leq T, n+L1+1 \leq j \leq n+m)$ of area A-4 are stored; in the synapse connection weight memory 26 of the fifth arithmetic unit $10_5$, connection weights $W_{ji}(T+1 \leq i \leq 2T, n+L1+1 \leq j \leq n+m)$ of area A-5 are stored; and in the synapse connection weight memory 26 of the sixth arithmetic unit $10_6$, connection weights $W_{ji}(2T+1 \leq i \leq n+m, n+L1+1 \leq j \leq n+m)$ and $W_{ji}(n+1 \leq ivn+m, n+m+1 \leq j \leq n+m+q)$ of area A-6 are stored.

In the first neuron output value memory 24a, $Y_i(1 \leq i \leq T)$ corresponding to column numbers of area A-1 is stored, while the first neuron number 1 of area A-1 is set in the minimum neuron number register 50 and the last neuron number T of area A-1 is set in the maximum neuron number register 52. Also in the second to sixth arithmetic units 10₂ to 10₆, connection weights and corresponding neuron output values of areas A-2, A-3, A-4, A-5, and A-6 are stored, respectively.

A control routine of the master node 12 to control the arithmetic units 10₁ to 10₆ to which neuron operations are assigned as described above is almost the same as that in the above-described first embodiment; operations for different time are repeated while alternately changing the roles of the first neuron output value memory 24a and the second neuron output value memory 24b in a way that stores neuron operation values obtained during an operation of the hidden layer in the first neuron output value memory 24a and stores neuron operation values obtained during the next operation of the hidden layer in the second neuron output value memory 24b. A description of others is omitted because they are the same as those of the above-described first embodiment.

Thus, in the first to third embodiments, the amount of data transferred to the master node 12 from the arithmetic units 10₁ to 10ₓ is such that one neuron operation can be achieved with partial sum transfers equal to the number of arithmetic units within one group. Therefore, this helps to minimize the possibility that operation performance may be reduced because of the probable rate-limited band of the local bus 18.

To perform operations of a larger-scale neural network, it is desirable to reduce the number of arithmetic units within a group and reduce the amount of data transferred from the arithmetic units to the master node 12. The capacity of the neuron output value memory 24 is fixed to, e.g., a capacity to store $N_{max}$ neurons. Therefore, since the number of neuron operations that can be performed in one arithmetic unit is no more than the $N_{max}$ number of synapses, it is desirable to set the number of arithmetic units within a group to the smallest integer greater than or equal to $n \div N_{max}$ for the hidden layer and $m \div N_{max}$ for the output layer.

In the first to third embodiments, to simplify descriptions, operations of the neural network are assigned to the six arithmetic units, the first to sixth arithmetic units 10₁ to 10₆. Of course, however, the present invention, without being limited to assignment to the six arithmetic units, may be configured for assignment to all or part of two to x arithmetic units.

In the above-described first, second, and third embodiments, each of the arithmetic units 10₁ to 10ₓ is formed on an independent semiconductor element and plural semiconductor elements are mounted on one substrate. However, plural areas may be provided within one semiconductor element so that each of the arithmetic units 10₁ to 10ₓ is formed in each of the areas, or each of the arithmetic units 10₁ to 10ₓ may be individually formed on an independent substrate so that plural substrates are coupled through a bus.

(Fourth Embodiment)

A neural network arithmetic apparatus of a fourth embodiment is an application of the first embodiment and employs a network of cyclic coupling type as a neural network as in the third embodiment. The Hebb Rule is used as a learning rule.

Figure 26:
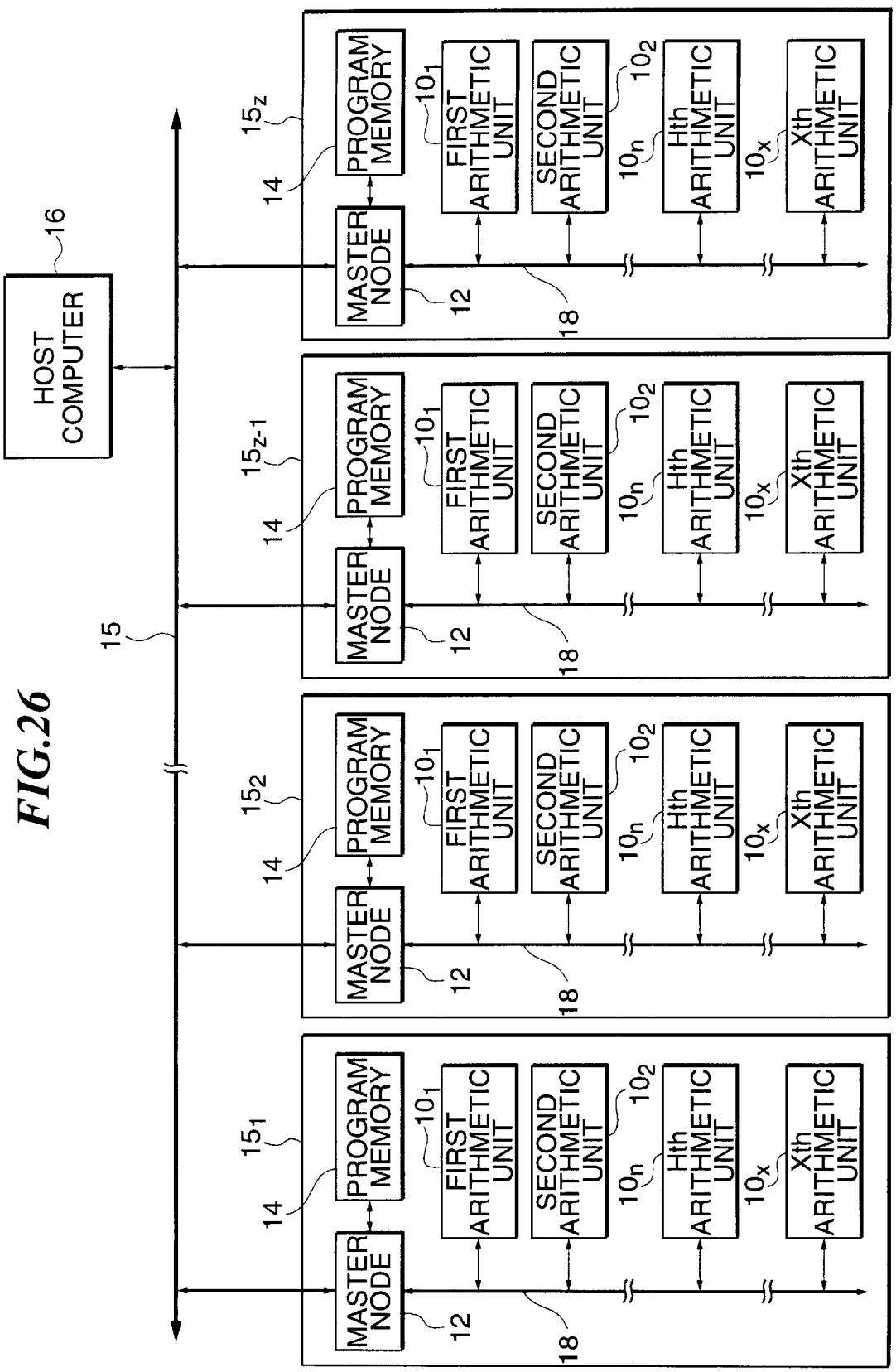
FIG. 26 is a block diagram showing an outline of the configuration of a neural network arithmetic apparatus of a fourth embodiment of the present invention.

In the neural network arithmetic apparatus of the fourth embodiment, as shown in FIG. 26, plural arithmetic units 10₁ to 10ₓ (1<x; x is a positive integer and H satisfies a relation of 1≦H≦x) making up the neural network arithmetic apparatus of the first embodiment, a master node 12, a program memory 14 are provided on one processor board 15, plural processor boards 15₁ to 15_z and a host computer 16 are connected through a system bus 17, control information from the host computer 16 is outputted through the system bus 17 to the master nodes 12 provided on the processor boards 15₁ to 15_z, and operation values obtained for each of the processor boards 15₁ to 15_z are outputted to the host computer 16 through the system bus 17.

The master nodes 12 provided on the processor boards 15₁ to 15_z, which include a programmable central processing unit such as a CPU, control the plural arithmetic units 10₁ to 10ₓ connected through the local bus 18 and accumulate first partial sums (described later) outputted from the arithmetic units 10₁ to 10ₓ on a processor board of its own.

The master node 12 on a specific processor board 15 specified in advance by the host computer 16 controls the master nodes 12 on other processor boards 15, adds an accumulation of first partial sums outputted to the local bus 18 from the arithmetic units 10₁ to 10ₓ and second partial sums (to be described later) outputted from the master nodes 12 of other processor boards to which neuron operations of the same neuron are assigned, and performs a nonlinear transformation on an obtained value to produce a neuron output value. A description of the configuration and operation of the master nodes 12 and the program memories 14 of the arithmetic units 10₁ to 10ₓ on the processor boards 15₁ to 15_z is omitted because they are the same as those of the first embodiment.

Next, a description is made of a method of assigning operations of a network of cyclic coupling type described in the above-described third embodiment to Z (any positive integer) processor boards from the first processor board 15₁ to the Zth processor board 15_z in the neural network arithmetic apparatus of the above configuration. To simplify the description, it is assumed that the neural network arithmetic apparatus has four processor boards from the first processor board 15₁ to the fourth processor board 15₄, each with six arithmetic units from the first to sixth arithmetic units 10₁ to 10₆.

Operations of a network of cyclic coupling type can be represented by a matrix as shown in FIG. 27. A computation method in the neural network of the fourth embodiment splits synapse connection weights to be split into two segments horizontally and two segments vertically, corresponding to the four processor boards, to produce four areas VI, VII, VIII, and IX so that the area VI is assigned to the first processor board 15₁, the area VII to the second processor board 15₂, the area VIII to the third processor board 15₃, and the area IX to the fourth processor board 15₄.

Figure 28:
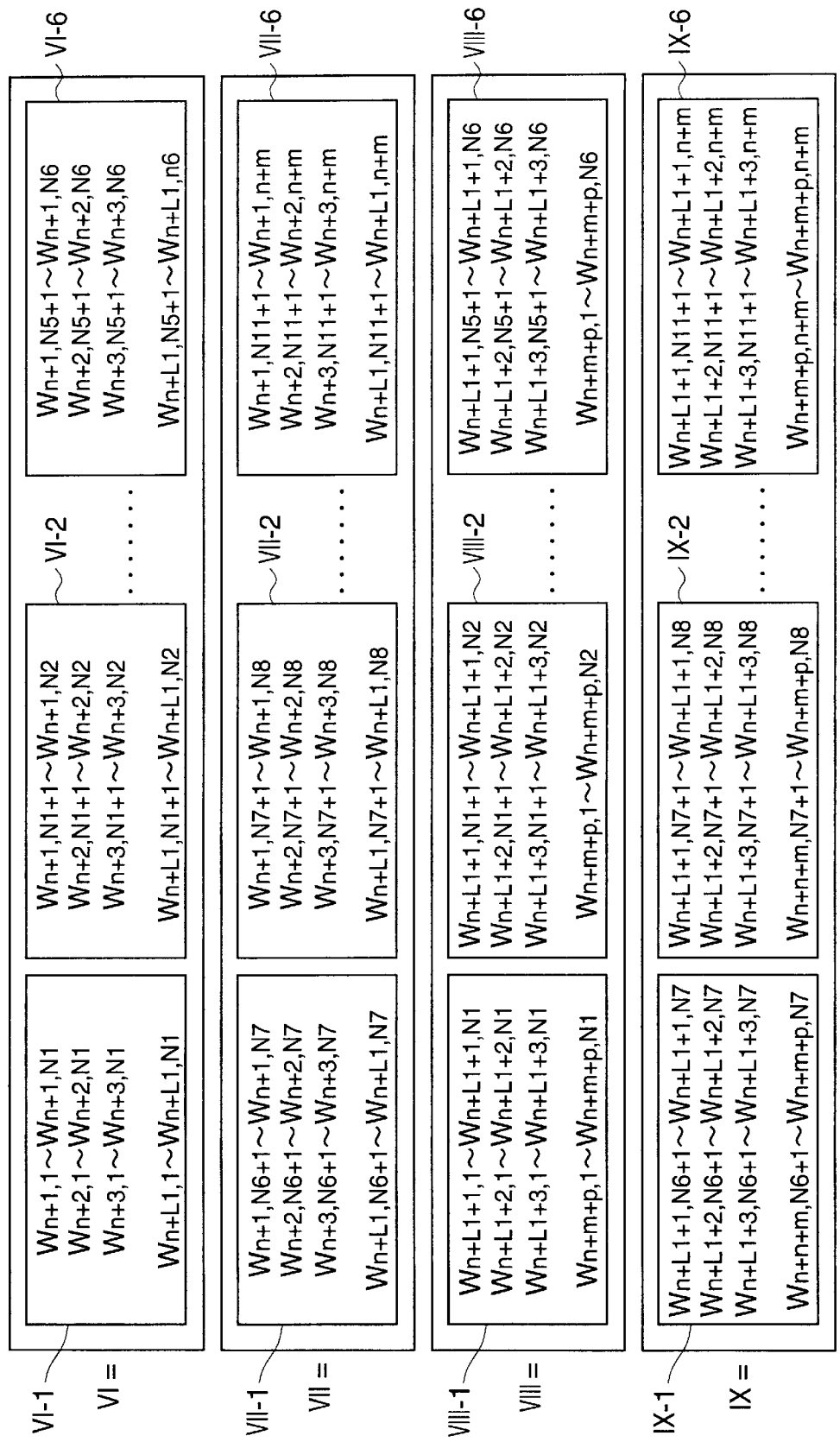
FIG. 28A illustrates an example of a method of splitting the connections to be computed, represented in an area VI within the matrix of FIG. 27.
FIG. 28B illustrates an example of a method of splitting the connections to be computed, represented in an area VII within the matrix of FIG. 27.
FIG. 28C illustrates an example of a method of splitting the connections to be computed, represented in an area VIII within the matrix of FIG. 27.
FIG. 28D illustrates an example of a method of splitting the connections to be computed, represented in an area IX within the matrix of FIG. 27.
Figure 29:
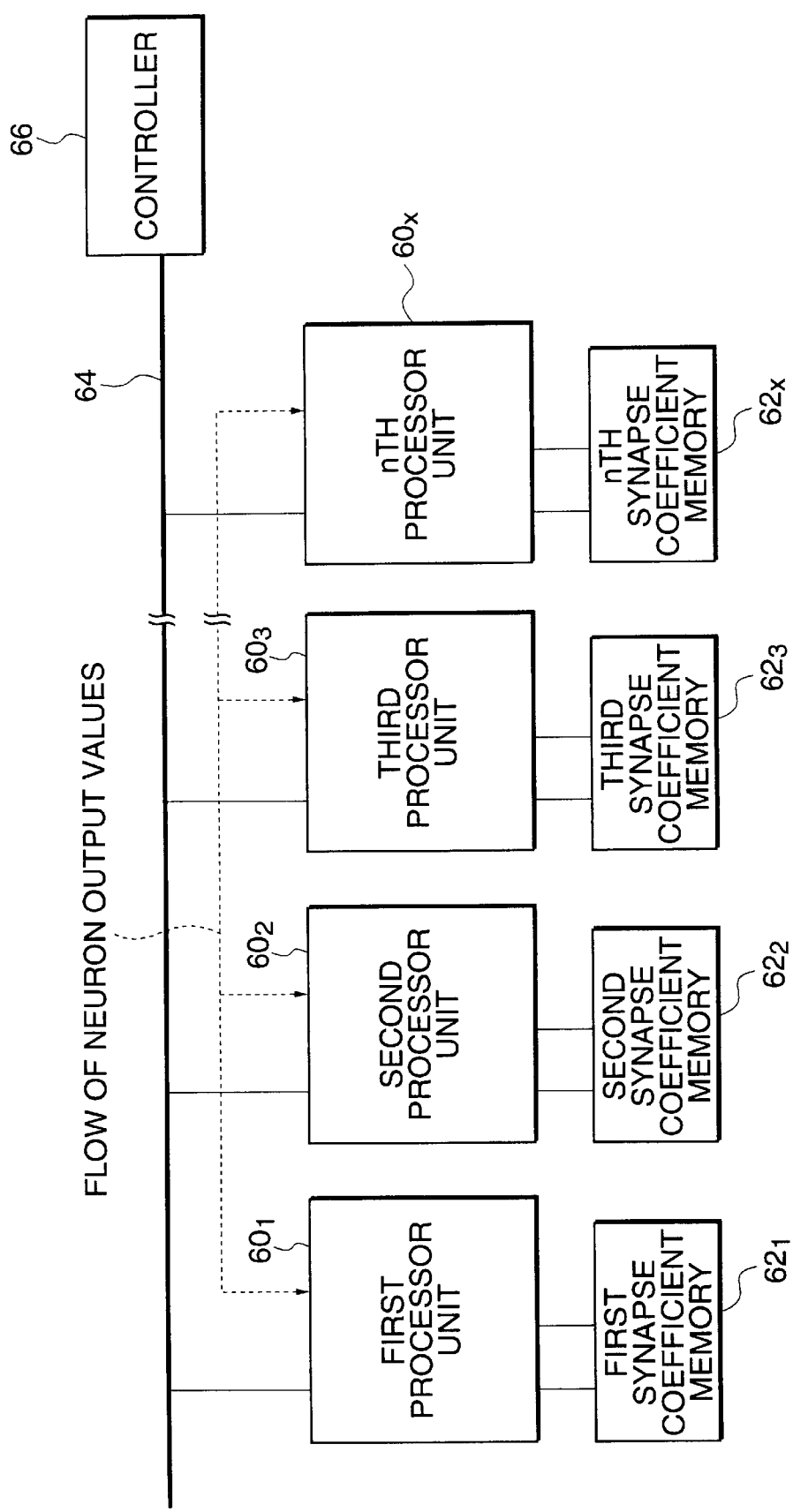
FIG. 29 is a block diagram showing an outline of the configuration of a conventional information processing system.

Furthermore, as shown in FIG. 28, each of the four areas VI, VII, VIII, and IX respectively assigned to the processor boards is split into six segments horizontally which are assigned equally to the six arithmetic units 10₁ to 10₆ so that they are processed in distributed form.

An arithmetic unit on the first processor board 15₁ and an arithmetic unit on the second processor board 15₂ are classified as a first group G1 and an arithmetic unit on the third processor board 15₃ and an arithmetic unit on the fourth processor board 15₄ are classified as a second group G2 so that the first group G1 and the second group G2 can perform operations on different neurons in parallel.

In the fourth embodiment, synapses of one neuron are divided and assigned to two processor boards, that is, the first processor board 15₁ and the second processor board 15₂, or the third processor board 15₃ and the fourth processor board 15₄. Accordingly, an accumulation of values outputted by the arithmetic units 10₁ to 10₆ within the first processor board 15₁ is referred to as a first partial sum $y\alpha_{j1}$, and an accumulation of values outputted for the same neuron by the arithmetic units $10_1$ to $10_6$ within the second processor board $15_2$ is referred to as a second partial sum $y\alpha_{j2}$. Likewise, an accumulation of values outputted by the arithmetic units $10_1$ to $10_6$ within the third processor board $15_3$ is referred to as a first partial sum $y\alpha_{j1}$, and an accumulation of values outputted for the same neuron by the arithmetic units $10_1$ to $10_6$ within the fourth processor board $15_4$ is referred to as a second partial sum $y\alpha_{j2}$.

In the fourth embodiment, the master node 12 on the first processor board $15_1$ and the master node 12 on the third processor board $15_3$ are specified as master nodes 12 that add second partial sums $y\alpha_{j2}$.

That is, the master node 12 of the first processor board $15_1$ receives first partial sums $y\alpha_{j1}$ outputted from the arithmetic units $10_1$ to $10_6$ within the first processor board $15_1$ and second partial sums $y\alpha_{j2}$ outputted from the master node 12 of the second processor board $15_2$, adds the six first partial sums $y\alpha_{j1}$ and one second partial sum $y\alpha_{j2}$ on a group basis, and performs nonlinear transformation on an obtained value by, e.g., a sigmoid function to produce a neuron output value $Y_j$. In the same way, the master node 12 of the third processor board $15_3$ receives first partial sums $y\alpha_{j1}$ outputted from the arithmetic units $10_1$ to $10_6$ within the third processor board $15_3$ and second partial sums $y\alpha_{j2}$ outputted from the master node 12 of the fourth processor board $15_4$, adds the six first partial sums $y\alpha_{j1}$ and one second partial sum $y\alpha_{j2}$ on a group basis, and performs nonlinear transformation on an obtained value by, e.g., a sigmoid function to produce a neuron output value $Y_j$. Parameters of the sigmoid function can be changed for each neuron. Threshold logic is also possible as a function to perform nonlinear transformation.

The produced neuron output value $Y_j$ is outputted to the local bus 18 along with a neuron number j. Thereby, arithmetic units $10_1$ to $10_6$ on a processor board having the master node that computed the neuron output value receive the output value $Y_j$ of neuron j and writes it to the second neuron output value memory 24b. The master node 12 outputs the produced neuron output value $Y_j$ along with the neuron number j to the system bus 17 also. The neuron number j and the neuron output value $Y_j$ outputted to the system bus 17 are received by the master nodes 12 on other processor boards and relayed to the local bus within each board. Thereby, when the neuron number j is between a value set in the minimum neuron number register 50 and a value set in the maximum neuron number register 52, the arithmetic units $10_1$ to $10_6$ on the other processor boards receive the neuron output value $Y_j$ and writes it to the second neuron output value memory 24b. A description of other neural network operations is omitted because they are the same as those in the first embodiment.

The operation results of neurons n+m+1 to n+m+p of the output layer are outputted to the host computer 16 through the system bus 17. Each of the master nodes 12 of specified first and third processor boards $15_1$ and $15_3$ informs the host computer 16 of operation end upon termination of operations on neurons assigned respectively.

Upon receipt of an end signal from the respective master nodes 12 of the first processor board $15_1$ and the third processor board $15_3$, the host computer 16 affords a new input to the neural network and starts computations for the next time. In this case, the arithmetic units $10_1$ to $10_6$ within the first to fourth processor boards $15_1$ to $15_4$ perform an operation using the neuron output value $Y_i$ stored in the second neuron output memory 24b and stores a neuron output value obtained by the operation in the first neuron output memory 24a. Thus, the neural network arithmetic apparatus of the fourth embodiment repeats operations for different time while alternately changing the roles of the first neuron output value memory 24a and the second neuron output value memory 24b.

Since operations in neural network learning are also the same as those in the above-described first embodiment and control of the processor boards $15_1$ to $15_4$ is the same as that during the above-described neuron operations, a description of these is omitted.

Thus, in the fourth embodiment, the amount of data transferred to the master node 12 from the arithmetic units $10_1$ to $10_6$ within each of the processor boards $15_1$ to $15_4$ is such that one neuron operation can be achieved with first partial sum transfers equal to the number of arithmetic units belonging to an identical group within the processor boards $15_1$ to $15_4$. Therefore, this helps to minimize the possibility that operation performance may be reduced because of the probable rate-limited band of the local bus 18. Furthermore, the amount of data transferred between the processor boards $15_1$ to $15_4$ is such that one neuron operation can be achieved with second partial sum transfers equal to the number of processor boards belonging to an identical group. Therefore, this helps to minimize the possibility that operation performance may be reduced because of the probable rate-limited band of the system bus 17.

In the fourth embodiment, to perform operations of a larger-scale neural network, it is desirable to reduce the number of arithmetic units within a group in the processor boards or the number of processor boards belonging to an identical group and reduce the amount of data transferred.

Since the band width of the local bus 18 is usually lower than that of the system bus, it is desirable to reduce the number of processor boards belonging to an identical group. That is, it is desirable to assign all arithmetic units mounted within a processor board to an identical group or increase the number of arithmetic units within a processor board within a range in which the local bus does not limit data transfer.

On the other hand, the capacity of the neuron output value memories 24a and 24b limits a number of synapses within one partial sum to $N_{max}$. Therefore, the number of synapses within partial sums that can be processed is no more than $N_{max} \times$(the number X of arithmetic units mounted) with one processor board. Accordingly, with fixing the number X of arithmetic units mounted on a processor board, the number of processor boards within a group should be to set the number greater than M(the number of synapses per one neuron)$\div N_{max} \div$(the number X of arithmetic units mounted).

In the fourth embodiment, the master node 12 on the first processor board $15_1$ and the master node 12 on the third processor board $15_3$ are specified to add first partial sums $y\alpha_{j1}$ and second partial sums $y\alpha_{j2}$, respectively so that the second partial sums need not be transmitted between boards belonging to different groups and the band of the system bus 17 is further reduced. However, the present invention, without being limited to this configuration, may be configured so that only the master node 12 on the first processor board $15_1$ is specified to add a first partial sum $y\alpha_{j1}$ resulting from accumulating values outputted by the first to third arithmetic units $10_1$ to $10_3$ of the first processor board $15_1$ and a second partial sum $y\alpha_{j2}$ outputted by the master node 12 of the second processor board $15_2$, while a second partial sum $y\alpha_{j2}$ outputted by the master node 12 of the third processor board $15_3$ and a second partial sum $y\alpha_{j2}$ outputted by the master node 12 of the fourth processor $15_4$ are added.

Although, in the fourth embodiment, synapse connection weight $W_{ji}$ are split into four areas, they can also be split into plural areas other than four areas. Preferably, they are split by the number of processors for assignment to each processor board.

In the fourth embodiment, the neural network arithmetic apparatus has four processor boards 15 each having six arithmetic units so that operations of the neural network are assigned to a total of 24 arithmetic units. However, the present invention is not limited to this configuration; two to Z processor boards, each with two to x arithmetic units mounted, may be provided so that operations of the neural network are assigned to all or part of the arithmetic units.

Furthermore, in the fourth embodiment, the arithmetic units $10_1$ to $10_x$ are formed as one semiconductor element, the local bus 18 couples the arithmetic units $10_1$ to $10_x$ on one processor board (substrate) and the system bus 17 couples the processor boards (substrates). However, a configuration is also possible in which the arithmetic units $10_1$ to $10_x$ are one area within a semiconductor element, the local bus 18 couples the arithmetic units $10_1$ to $10_x$ within one semiconductor element, and the system bus 17 couples the semiconductor elements on one processor board. Also, the neural network arithmetic apparatus of the fourth embodiment may be provided with a higher level bus for coupling a processor board group to expand to a relationship of three parties, namely the processor board group, the processor boards, and the semiconductor elements.

In the first to fourth embodiments, in partial sum operations on neuron operation values of the operation layer and the output layer, plural neurons making up the operation layer and the output layer are halved and assigned to two groups. However, plural neurons making up the operation layer and the output layer may also be split into three or more segments so that they are assigned to arithmetic unit groups the number of which is equal to a split number, and conversely, plural neurons making up the operation layer and the output layer may not be split, and without arithmetic units being split, partial sum operations on neuron operation values may be performed.

In the first to fourth embodiments, partial sum $y\alpha_j$ operations in the arithmetic units $10_1$ to $10_x$ can be rapidly performed using synapse connection weights $W_{ji}$ and neuron output values $Y_i$ stored in memories provided for each of the arithmetic units $10_1$ to $10_x$.

Although the first, third, and fourth embodiments use the Hebb Rule as a learning algorithm, they are also easily applicable to other learning rules such as a variant of the Hebb Rule to limit the total of synapse connection weights of one neuron by changing the control program of the learning circuit 36.

Although, in the first, third, and fourth embodiments, the master node 12 and the arithmetic units $10_1$ to $10_x$ are described as different ones, one of the arithmetic units $10_1$ to $10_x$ may also serve as the master node 12. The arithmetic units themselves may autonomously change an arithmetic unit to also serve as the master node 12 for each neuron to operate on.

In the first to fourth embodiments, although operations can be performed in parallel by any number of arithmetic units $10_1$ to $10_x$, operations on one neuron do not terminate until partial sum operations in all arithmetic units within an identical group terminate. However, it is desirable to make the amount of operations shared among the arithmetic units almost identical by assigning neurons or synapses equally to them so as to make the computation time of each arithmetic unit equal.

Moreover, although the arithmetic units $10_1$ to $10_x$ read data from the neuron output value memory 24 by sequential reading from contiguous addresses, the data can also be read in any order. Also, although neuron output values of consecutive neuron numbers are stored in the neuron output value memory 24, neuron output values of inconsecutive neuron numbers randomly selected may be stored.

Although the master node 12 is configured independent of arithmetic units, one of the arithmetic units $10_1$ to $10_x$ may be configured to have the function of the master node 12. Also, the arithmetic units themselves may autonomously change an arithmetic unit to also serve as the master node 12 for each neuron to operate on.

Although, in the first to fourth embodiments, the master node 12 and the host computer 16 are configured in different apparatuses, they may be integrated in one apparatus so that the host computer 16 also serves as the master node 12. Also, although the master node 12 and the program memory 14 are configured separately, the program memory 14 may be included in the master node 12. Although a description was made of a case where an arithmetic unit has one adder 30 and one multiplier 28, a configuration is also possible in which plural computing elements exist and one arithmetic unit performs neuron operations on plural neurons at the same time.

As has been described above, the present invention has the effect that, when a neural network is computed in parallel using a large number of arithmetic units, the arithmetic units can be made to operate independently and rapidly, and the number of arithmetic units increased to meet the scale of a network does not cause reduction in processing speed.

What is claimed is:

1. A neural network arithmetic apparatus that performs neuron operations in parallel, the apparatus comprising:

plural arithmetic elements, connected over at least one transmission line, to each of which a predetermined number of neurons among plural neurons constituting a neural network are assigned, wherein each of the plural arithmetic elements comprises:

a synapse connection weight storage memory that stores synapse connection weights of at least part of all synapses of one neuron for the predetermined number of assigned neurons; and an accumulating part that, during a neuron operation, successively selects the predetermined number of neurons and successively selects synapses of the selected neuron, multiplies the synapse connection weight of the selected synapse by the neuron output value of a neuron of a preceding stage connected with the synapse, accumulates the result for an identical neuron, and outputs an obtained value as a partial sum of neuron operation value; and the apparatus further comprising:

a neuron output value generating part that generates a neuron output value by accumulating partial sums of neuron operation values outputted by the plural arithmetic elements until the values of all synapses of one neuron are added.

2. The neural network arithmetic apparatus according to claim 1, further comprising:

an intermediate partial sum accumulating part that accumulates, for an identical neuron, at least one of the partial sums of neuron operation values and a partial sum obtained by accumulating the partial sums of neuron operation values for an identical neuron, and outputs the result as an intermediate partial sum of neuron operation values, wherein the neuron output value generating part accumulates at least one of the partial sum of neuron operation values and the intermediate partial sum until the values of all synapses of one neuron are added.

3. The neural network arithmetic apparatus according to claim 1, wherein the plural arithmetic elements are split into plural groups each of which contains a predetermined number of arithmetic elements and the neuron output value generating part is provided in each of the groups.

4. The neural network arithmetic apparatus according to claim 3,
wherein a predetermined number of arithmetic elements making up one of the plural groups are split and formed on plural semiconductor elements,
wherein the plural semiconductor elements on which the predetermined number of arithmetic elements are formed are mounted on an identical circuit substrate, and
wherein the intermediate partial sum accumulating part is provided for each of the semiconductor elements on which the predetermined number of arithmetic elements are split and formed.

5. The neural network arithmetic apparatus according to claim 3,
wherein a predetermined number of arithmetic elements making up one of the plural groups are split and formed on plural semiconductor elements on plural circuit substrates,
wherein the plural circuit substrates are mounted on an identical mounting substrate, and
wherein the intermediate partial sum accumulating part is provided at least for each of the semiconductor elements or on the circuit substrates.

6. The neural network arithmetic apparatus according to claim 3, further comprising:
plural first transmission lines that connect a predetermined number of arithmetic elements making up one group; and
at least one second transmission line that is smaller in band than the first transmission lines and connects plural groups,
wherein fewer second transmission lines than the predetermined number of arithmetic elements making up a group of the predetermined number of arithmetic elements are provided.

7. The neural network arithmetic apparatus according to claim 1, wherein each of the arithmetic elements further comprises a data storage memory in which a neuron output value connected with the synapse stored in at least the synapse connection weight storage memory is stored.

8. The neural network arithmetic apparatus according to claim 7,
wherein the data storage memory has at least two memories, one memory storing data to be used for operation while another memory storing a result obtained by the operation.

9. The neural network arithmetic apparatus according to claim 1, further including a connection weight updating part that updates each of the synapse connection weights of the selected neuron, among the synapse connection weights stored in the storage memory.

10. The neural network arithmetic apparatus according to claim 1, wherein the accumulating part further comprises:
an error signal generating part that, during operation on an error signal, successively selects synapses of the predetermined number of neurons connected with a specific neuron, multiplies the connection weight of a selected synapse by the error signal of a neuron having the selected synapse, accumulates the result for the predetermined number of neurons, outputs an obtained value as a partial sum of error signal, accumulates the obtained partial sum of error signal for all neurons connected with the specific neuron, and outputs an obtained value, as the error signal of the specific neuron, to an arithmetic element to which the specific neuron is assigned.

11. The neural network arithmetic apparatus according to claim 10, wherein the connection weight updating part updates synapse connection weights stored in the storage memory, using the error signal generated by the error signal generating part.

12. A neural network operation method that performs neuron operations in parallel for a predetermined number of neurons, among plural neurons making up the neural network, the method comprising the steps of:
storing synapse connection weights of at least part of all synapses of one neuron for a predetermined number of assigned neurons;
successively selecting the predetermined number of neurons during neuron operations;
successively selecting synapses of the selected neuron;
multiplying the synapse connection weight of the selected synapse by the neuron output value of a neuron of a preceding stage connected with the synapse;
accumulating the result for an identical neuron to generate a partial sum of neuron operation value; and
accumulating the partial sum of neuron operation value until the values of all synapses of one neuron are added, to generate a neuron output value.

13. The neural network operation method according to claim 12, wherein the step of accumulating the partial sum of neuron operation value to generate a neuron output value comprises the steps of:
accumulating, for an identical neuron, at least one of the partial sum of neuron operation value and a partial sum obtained by accumulating the partial sum of neuron operation value for an identical neuron to generate an intermediate partial sum of neuron operation value; and
accumulating at least one of the partial sum of neuron operation value and the intermediate partial sum of neuron operation value until the values of all synapses of one neuron are added, to generate a neuron output value.

14. The neural network operation method according to claim 12, the method further comprising the steps of:
splitting the number of synapses to operate on, of neuron operations of an identical neuron into plural groups; and
generating the intermediate partial sum of neuron operation value for each of the groups.

15. The neural network operation method according to claim 14, wherein the number of the synapses to operate on is equally split.

16. The neural network operation method according to claim 12, the method comprising the steps of:
during an error signal operation, successively selecting synapses of the predetermined number of neurons connected with a specific neuron;
multiplying the connection weight of the selected synapse by the error signal of a neuron having the selected synapse;
accumulating the result for the predetermined number of neurons;

outputting an obtained value as a partial sum of error signal;

accumulating the partial sum of error signal for all neurons connected with the specific neuron; and outputting an obtained value as an error signal of the specific neuron to an arithmetic element to which the specific neuron is assigned.

17. The neural network operation method according to claim 16, the method comprising the step of, when updating synapse connection weights, updating the synapse connection weights using the error signal obtained by accumulating the partial sum of error signal.

* * * * *